(12) United States Patent
Usui et al.

(10) Patent No.: US 6,545,818 B2
(45) Date of Patent: *Apr. 8, 2003

(54) ZOOM LENS AND CAMERA SYSTEM

(75) Inventors: Fumiaki Usui, Utsunomiya (JP); Kiyoshi Fukami, Utsunomiya (JP); Takahiro Yoshimi, Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 42 days.

(21) Appl. No.: 09/562,933

(22) Filed: May 2, 2000

(65) Prior Publication Data

US 2003/0007256 A1 Jan. 9, 2003

(30) Foreign Application Priority Data

May 10, 1999 (JP) .......................... 11-128825
Jul. 6, 1999 (JP) .......................... 11-191514

(51) Int. Cl.⁷ ..................................... G02B 15/14
(52) U.S. Cl. .................. 359/686; 359/683; 359/684
(58) Field of Search ................ 359/684, 687–688, 359/683, 676, 708, 713–715

(56) References Cited

U.S. PATENT DOCUMENTS

| | | | | |
|---|---|---|---|---|
| 4,099,845 A | 7/1978 | Takesi et al. | ............... | 359/684 |
| 5,097,360 A | 3/1992 | Fukami et al. | ............... | 359/674 |
| 5,136,431 A | 8/1992 | Terasawa et al. | ............. | 359/684 |
| 5,191,475 A | 3/1993 | Terasawa et al. | ............. | 359/684 |
| 5,579,172 A | 11/1996 | Aoki et al. | ................. | 359/688 |
| 5,737,128 A | 4/1998 | Usui | ............................ | 359/686 |
| 5,745,300 A | 4/1998 | Usui et al. | ................... | 359/684 |
| 5,757,554 A | 5/1998 | Fukami | ....................... | 359/684 |
| 5,986,820 A | 11/1999 | Usui et al. | ................... | 359/684 |
| 5,995,296 A | 11/1999 | Usui | ............................ | 359/684 |
| 5,995,297 A | 11/1999 | Usui | ............................ | 359/684 |
| 6,124,982 A | * 9/2000 | Usui | ............................ | 359/686 |

FOREIGN PATENT DOCUMENTS

| | | |
|---|---|---|
| EP | 0 751 414 | 1/1997 |
| EP | 0 890 861 | 1/1999 |
| EP | 0 893 723 | 1/1999 |
| JP | 59-4686 | 1/1984 |
| JP | 6-242378 | 9/1994 |

OTHER PUBLICATIONS

Patent Abstracts of Japan, vol. 18, No. 627 (P–1834) (JP 6–242378, Sep. 2, 1994), Nov. 29, 1994.

* cited by examiner

*Primary Examiner*—Jordan M. Schwartz
(74) *Attorney, Agent, or Firm*—Fitzpatrick, Cella, Harper & Scinto

(57) ABSTRACT

A zoom lens includes, in order from an object side to an image side, a first lens unit of positive refractive power, a second lens unit of negative refractive power for variation of magnification, a third lens unit for compensating for shift of an image plane caused by the variation of magnification, and a fixed fourth lens unit of positive refractive power, wherein the first lens unit comprises a first lens subunit of negative refractive power fixed during focusing, a second lens subunit having a focusing function, and a third lens subunit of positive refractive power fixed during focusing, and at least one of the first lens subunit and the second lens subunit and the third lens subunit respectively have aspheric lenses.

11 Claims, 26 Drawing Sheets

F$_{NO}$/1.8 e-LINE

-0.40  0.40
SPHERICAL ABERRATION $\omega = 47.7°$ $\Delta M$   $\Delta S$

-0.40  0.40
ASTIGMATISM $\omega = 47.7°$

-10.00  10.00
DISTORTION (%)

F$_{NO}$/1.8 e-LINE

-0.40  0.40
SPHERICAL ABERRATION $\omega = 31.7°$ $\Delta M$   $\Delta S$

-0.40  0.40
ASTIGMATISM $\omega = 31.7°$

-10.00  10.00
DISTORTION (%)

F$_{NO}$/1.8 e-LINE

-0.40  0.40
SPHERICAL ABERRATION $\omega = 23.7°$ $\Delta M$   $\Delta S$

-0.40  0.40
ASTIGMATISM $\omega = 23.7°$

-10.00  10.00
DISTORTION (%)

F$_{NO}$/1.8
e-LINE
-0.40    0.40
SPHERICAL ABERRATION $\omega = 8.3°$
ΔS    ΔM
-0.40    0.40
ASTIGMATISM $\omega = 8.3°$
-10.00    10.00
DISTORTION (%)

F$_{NO}$/2.4
e-LINE
-0.40    0.40
SPHERICAL ABERRATION $\omega = 6.3°$
ΔM    ΔS
-0.40    0.40
ASTIGMATISM $\omega = 6.3°$
-10.00    10.00
DISTORTION (%)

FNO / 1.8

-0.40    0.40
SPHERICAL ABERRATION e-LINE

ω = 45.0°

ΔM    ΔS

-0.40    0.40
ASTIGMATISM

ω = 45.0°

-10.00    10.00
DISTORTION (%)

FNO / 1.8 e-LINE

-0.40    0.40
SPHERICAL ABERRATION

ω = 28.2°

ΔM    ΔS

-0.40    0.40
ASTIGMATISM

ω = 28.2°

-10.00    10.00
DISTORTION (%)

FNO / 1.8 e-LINE

-0.40    0.40
SPHERICAL ABERRATION

ω = 14.0°

ΔS
ΔM

-0.40    0.40
ASTIGMATISM

ω = 14.0°

-10.00    10.00
DISTORTION (%)

Fno / 1.8
e-LINE
SPHERICAL ABERRATION

ω = 6.7°
ΔM
ΔS
ASTIGMATISM

ω = 6.7°
DISTORTION (%)

Fno / 2.5
e-LINE
SPHERICAL ABERRATION

ω = 4.8°
ΔS
ΔM
ASTIGMATISM

ω = 4.8°
DISTORTION (%)

FNO / 1.5 e-LINE

-0.40  0.40
SPHERICAL ABERRATION

ω = 39.4°

ΔM  ΔS

-0.40  0.40
ASTIGMATISM

ω = 39.4°

-10.00  10.00
DISTORTION (%)

FNO / 1.5 e-LINE

-0.40  0.40
SPHERICAL ABERRATION

ω = 19.8°

ΔM  ΔS

-0.40  0.40
ASTIGMATISM

ω = 19.8°

-10.00  10.00
DISTORTION (%)

FNO / 1.5 e-LINE

-0.40  0.40
SPHERICAL ABERRATION

ω = 9.3°

ΔM  ΔS

-0.40  0.40
ASTIGMATISM

ω = 9.3°

-10.00  10.00
DISTORTION (%)

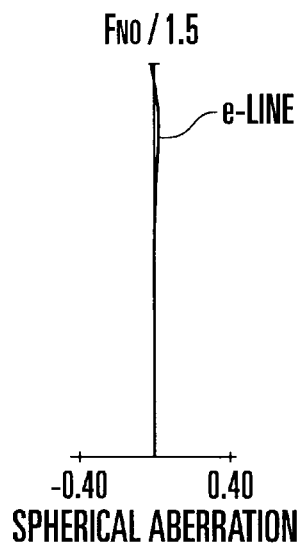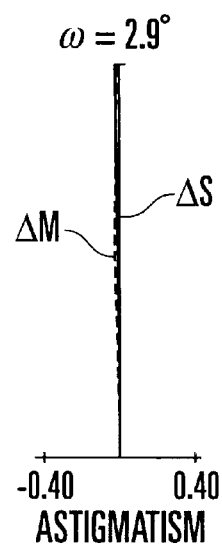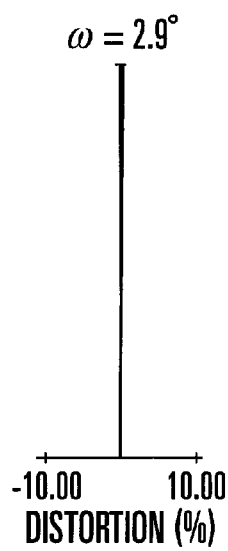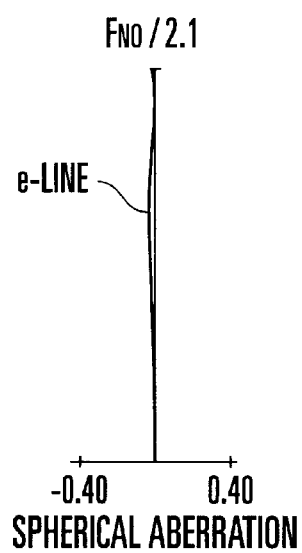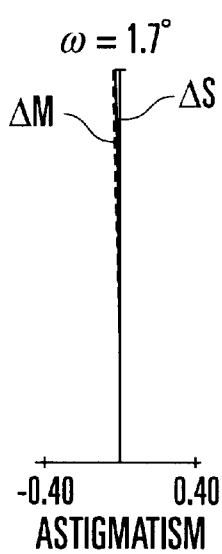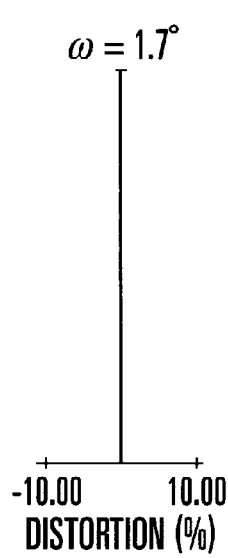

Fno/1.5
e-LINE
-0.40  0.40
SPHERICAL ABERRATION

ω = 39.4°
ΔM  ΔS
-0.40  0.40
ASTIGMATISM

ω = 39.4°
-10.00  10.00
DISTORTION (%)

Fno/1.5
e-LINE
-0.40  0.40
SPHERICAL ABERRATION

ω = 19.8°
ΔS
ΔM
-0.40  0.40
ASTIGMATISM

ω = 19.8°
-10.00  10.00
DISTORTION (%)

Fno/1.5
e-LINE
-0.40  0.40
SPHERICAL ABERRATION

ω = 10.9°
ΔM
ΔS
-0.40  0.40
ASTIGMATISM

ω = 10.9°
-10.00  10.00
DISTORTION (%)

FNO /1.5
e-LINE
-0.40  0.40
SPHERICAL ABERRATION

ω = 4.7°
ΔS  ΔM
-0.40  0.40
ASTIGMATISM

ω = 4.7°
-10.00  10.00
DISTORTION (%)

FNO /2.1
e-LINE
-0.40  0.40
SPHERICAL ABERRATION

ω = 1.7°
ΔS  ΔM
-0.40  0.40
ASTIGMATISM

ω = 1.7°
-10.00  10.00
DISTORTION (%)

$fm = fw \times Z^{1/4}$ $$fd = ft \times \frac{F_{no} \text{ IN WIDE-ANGLE END}}{F_{no} \text{ IN TELEPHOTO END}}$$

ft
(TELEPHOTO END)

f = 5.72mm
FNO. 1 : 1.65

SPHERICAL ABERRATION

IMAGE HEIGHT = 5.50mm

ASTIGMATISM

IMAGE HEIGHT = 5.50mm

DISTORTION (%)

f = 22.88mm
FNO. 1 : 1.65

SPHERICAL ABERRATION

IMAGE HEIGHT = 5.50mm

ASTIGMATISM

IMAGE HEIGHT = 5.50mm

DISTORTION (%)

f = 45.77mm (INFINITELY DISTANT OBJECT)
F$_{NO}$. 1 : 1.65

-0.50    0.50
SPHERICAL ABERRATION

IMAGE HEIGHT = 5.50mm

-0.50    0.50
ASTIGMATISM

IMAGE HEIGHT = 5.50mm

-10    10
DISTORTION (%)

f = 45.77mm (MINIMUM-DISTANCE OBJECT)
F$_{NO}$. 1 : 1.65

-0.50    0.50
SPHERICAL ABERRATION

IMAGE HEIGHT = 5.50mm

-0.50    0.50
ASTIGMATISM

IMAGE HEIGHT = 5.50mm

-10    10
DISTORTION (%)

f = 5.72mm
FNO. 1 : 1.65
e-LINE
-0.50   0.50
SPHERICAL ABERRATION

IMAGE HEIGHT = 5.50mm
ΔS
ΔM
-0.50   0.50
ASTIGMATISM

IMAGE HEIGHT = 5.50mm
-10   10
DISTORTION (%)

f = 22.88mm
FNO. 1 : 1.65
e-LINE
-0.50   0.50
SPHERICAL ABERRATION

IMAGE HEIGHT = 5.50mm
ΔS
ΔM
-0.50   0.50
ASTIGMATISM

IMAGE HEIGHT = 5.50mm
-10   10
DISTORTION (%)

f = 45.77mm (INFINITELY DISTANT OBJECT)
FNO. 1 : 1.65

-0.50　　0.50
SPHERICAL ABERRATION

IMAGE HEIGHT = 5.50mm

-0.50　　0.50
ASTIGMATISM

IMAGE HEIGHT = 5.50mm

-10　　10
DISTORTION (%)

f = 45.77mm (MINIMUM-DISTANCE OBJECT)
FNO. 1 : 1.65

-0.50　　0.50
SPHERICAL ABERRATION

IMAGE HEIGHT = 5.50mm

-0.50　　0.50
ASTIGMATISM

IMAGE HEIGHT = 5.50mm

-10　　10
DISTORTION (%)

f = 6.7mm
FNO. 1:1.6 e-LINE

-0.50  0.50
SPHERICAL ABERRATION

IMAGE HEIGHT = 5.50mm

ΔM  ΔS

-0.50  0.50
ASTIGMATISM

IMAGE HEIGHT = 5.50mm

-10  10
DISTORTION (%)

f = 26.63mm
FNO. 1:1.6 e-LINE

-0.50  0.50
SPHERICAL ABERRATION

IMAGE HEIGHT = 5.50mm

ΔS  ΔM

-0.50  0.50
ASTIGMATISM

IMAGE HEIGHT = 5.50mm

-10  10
DISTORTION (%)

f = 99.83mm (INFINITELY DISTANT OBJECT)
FNO. 1 : 2.1

-0.50    0.50
SPHERICAL ABERRATION

IMAGE HEIGHT = 5.50mm

-0.50    0.50
ASTIGMATISM

IMAGE HEIGHT = 5.50mm

-10    10
DISTORTION (%)

f = 99.83mm (MINIMUM-DISTANCE OBJECT)
FNO. 1 : 2.1

-0.50    0.50
SPHERICAL ABERRATION

IMAGE HEIGHT = 5.50mm

-0.50    0.50
ASTIGMATISM

IMAGE HEIGHT = 5.50mm

-10    10
DISTORTION (%)

ZOOM LENS AND CAMERA SYSTEM

BACKGROUND OF THE INVENTION

1. Field of the Invention

The present invention relates to a zoom lens, and, more particularly, to a zoom lens which is suited for a television camera, a photographic camera, a digital camera, a video camera or the like, and in which an aspheric surface is appropriately employed in a part of a lens system thereof to obtain good optical performance over the entire variable magnification range while having, for example, a large relative aperture of 1.5 or thereabout in F-number at the wide-angle end, an ultrawide angle of view (2ω(angle of view in the wide-angle end)=78°–95°) and a high variable magnification ratio of 10-27 or thereabout. Further, the present invention relates to a zoom lens which is suited for a television camera, a video camera, a photographic camera, a video camera or the like, and, more particularly, to a zoom lens, in which the so-called inner focusing method, in which focusing is effected by moving a lens subunit that is a part of a first lens unit, is employed to obtain high optical performance over the entire object distance range while having a short minimum object distance.

2. Description of Related Art

Heretofore, for use with a television camera, a photographic camera, a digital camera, a video camera or the like, there has been a demand for a zoom lens having high optical performance while having a large relative aperture and a high variable magnification ratio.

In addition to such a demand, in the case of a color television camera for broadcasting, in particular, importance is attached to operability and mobility. In response to such a requirement, the usage of a CCD (charge-coupled device) of ⅔ inch or ½ inch has become the mainstream for an image pickup device in the color television camera.

Since the CCD has an almost uniform resolution over the entire image pickup range, a zoom lens to be associated with the CCD is also required to have an almost uniform resolution from the center of an image plane to the periphery thereof.

For example, the zoom lens is required to have the various aberrations such as astigmatism, distortion and lateral chromatic aberration corrected well and to have high optical performance over the entire image plane. In addition, the zoom lens is required to have a large relative aperture, a wide angle of view and a high variable magnification ratio while being small in size and light in weight, and moreover to have a long back focal distance for enabling a color separation optical system and a variety of filters to be disposed in front of an image pickup means.

Among zoom lenses, the so-called four-unit zoom lens, which is composed of four lens units, i.e., in order from the object side, a first lens unit of positive refractive power for focusing, a second lens unit of negative refractive power for variation of magnification, a third lens unit of positive or negative refractive power for compensating for shift of an image plane caused by the variation of magnification, and a fourth lens unit of positive refractive power for image formation, is relatively easy to make have a high variable magnification ratio and a large relative aperture and is, therefore, widely used as a zoom lens for color television cameras for broadcasting.

Among the four-unit zoom lenses, a zoom lens having a large relative aperture and a high variable magnification ratio, such as having an F-number of 1.7 or thereabout, an angle of view at the wide-angle end 2ω of 86° or thereabout, and a variable magnification ratio of 8 or thereabout, has been proposed, for example, in Japanese Laid-Open Patent Application No. Hei 6-242378.

In order to obtain, in a zoom lens, a large relative aperture (F-number of 1.5–1.8), a high variable magnification ratio (variable magnification ratio of 10-27) and an ultra-wide angle of view (angle of view in the wide-angle end 2ω of 78°–95°) and, moreover, to have high optical performance over the entire variable magnification range, it is necessary to appropriately set the refractive power of each lens unit and the lens construction.

In general, in order to obtain high optical performance with little variation of aberrations over the entire variable magnification range, it becomes necessary to increase the freedom of design on aberration correction, for example, by increasing the number of lens elements of each lens unit.

Therefore, if it is attempted to attain a zoom lens having a large relative aperture, an ultra-wide angle of view and a high variable magnification ratio, a problem arises in that the number of lens elements would be inevitably increased to make the size of the whole lens system large. Thus, it would become impossible to meet the requirement for reduction in size and weight.

Further, with respect to the image forming performance, first, making reference to the ultra-wide angle of view of a zoom lens, the greatest problem is distortion. This is because distortion has influence according to the cube of an angle of view in a region of third-order aberration coefficients.

FIG. 45 is a schematic diagram showing the variation of distortion in every zoom position.

As shown in FIG. 45, distortion exhibits a considerably large under-tendency (minus tendency) when the zoom position is at a wide-angle end (focal length of fw). As zooming advances from the wide-angle end fw to a telephoto end (focal length of ft), distortion becomes gradually large in the direction of an over-tendency (plus tendency). Then, after zooming reaches a zoom position at which the value of distortion is "0", the value of distortion in the over-tendency becomes maximum when the zoom position is in the vicinity of $fm=fw \times Z^{1/4}$, where fw is a focal length at the wide-angle end and Z As a zoom ratio. After that, as zooming advances from the position of the focal length fm to the telephoto end ft, the value of distortion in the over-tendency becomes gradually small. Such an inclination of distortion becomes larger as an angle of view at the wide-angle end becomes larger. Therefore, in such an ultra-wide-angle zoom lens as to have an angle of view 2ω at the wide-angle end exceeding 78°, distortion in the under-tendency increases rapidly on the wide-angle side, so that it becomes very difficult to control distortion.

The next problem is that a point at which an image contrast becomes best in the center of an image plane, i.e., the so-called best image plane, varies due to the variation of magnification. This is mainly caused by the variation of spherical aberration due to the variation of magnification. Since the spherical aberration has influence according to the cube of an aperture in a region of third-order aberration coefficients, it presents the greatest problem for attaining a large relative aperture.

In general, the variation of spherical aberration due to the variation of magnification exhibits, as shown in FIG. 46, an under-tendency (minus tendency) with respect to a Gauss image plane when zooming advances from the wide-angle end at which the value of spherical aberration is "0" until the vicinity of the zoom position $fm=fw \times Z^{1/4}$ where Z is a zoom ratio and fw is a focal length at the wide-angle end. Then, when zooming passes the vicinity of the zoom position $fm=fw \times Z^{1/4}$, the value of spherical aberration in the under-tendency becomes small. After zooming passes a zoom position at which the value of spherical aberration is "0", spherical aberration comes to exhibit an over-tendency (plus tendency) in turn.

Then, in the vicinity of a zoom position $fd=(Fno.w/Fno.t) \times ft$ at which the so-called F drop begins, i.e., the zoom position where the F-number begins to become large (the lens-system begins to become dark) with the diameter of an on-axial light flux limited, spherical aberration exhibits the greatest over-tendency (plus tendency). When zooming passes the zoom position fd, the value of spherical aberration in the over-tendency becomes small. At the telephoto end, the value of spherical aberration becomes almost "0". Incidentally, Fno.w and Fno.t represent the F-numbers at the wide-angle end and the telephoto end, respectively, and ft is a focal length at the telephoto end.

As mentioned above, in particular, in such a zoom lens as to have a zoom position where the F drop begins, it is very difficult to control spherical aberration on the telephoto side.

In order to correct well the variation of various aberrations over the entire variable magnification range, in the past, the number of constituent lenses of a focusing lens unit or a variator lens unit has been made to increase. Therefore, there has been a problem that the whole of the lens system is increased in size and complicated in construction.

Further, the introduction of an aspheric surface for the purpose of solving the above problem has been proposed in the above-mentioned Japanese Laid-Open Patent Application No. Hei 6-242378.

However, with regard to a zoom lens of improved performance having a large relative aperture and, moreover, a high variable magnification ratio beginning with an ultra-wide angle, it has been becoming necessary to reconsider the method of introducing an aspheric surface.

In a zoom lens having a large relative aperture and, moreover, a high variable magnification ratio beginning with an ultra-wide angle, distortion varies greatly on the wide-angle side and spherical aberration varies greatly on the telephoto side. Even if an aspheric surface is merely introduced to any one of surfaces of a variator lens system so as to correct well both distortion and spherical aberration, it has been becoming difficult to correct such aberrations efficiently and well.

Meanwhile, among zoom lenses each comprising, in order from the object side, a first lens unit (focusing lens unit) of positive refractive power for focusing, a second lens unit (variator lens unit) of negative refractive power for variation of magnification, a third lens unit (compensator lens unit) of positive or negative refractive power for compensating for shift of an image plane caused by the variation of magnification, an aperture stop, and a fourth lens unit (relay lens unit) of positive refractive power for image formation, i.e., among the so-called four-unit zoom lenses, a zoom lens employing the inner focusing method in which focusing is effected by moving a lens that is a part of the first lens unit has been proposed in Japanese Patent Publication No. Sho 59-4686, the above-mentioned Japanese Laid-Open Patent Application No. Hei 6-242378, etc.

In the above zoom lens, the first lens unit is composed of three lens subunits, i.e., a first lens subunit of negative refractive power, a second lens subunit of positive refractive power and a third lens subunit of positive refractive power, and focusing from an infinitely distant object to a minimum-distance object is effected by moving the second lens subunit toward the image side.

In general, a zoom lens employing the inner focusing method, as compared with a zoom lens in which focusing is effected by moving the whole first lens unit, has such advantageous characteristics that the effective diameter of the first lens unit can be made small to easily reduce the size of the whole lens system, close-up photography, in particular, ultra-close-up photography, can be made easy, and rapid focusing can be performed since focusing is effected by moving a relatively small-sized and light-weight lens unit to make the driving force for the lens unit small.

Generally, if the inner focusing method is employed in a zoom lens, as mentioned in the foregoing, there can be obtained such advantageous characteristics that the size of the whole lens system can be reduced, rapid focusing becomes possible, and close-up photography becomes easy.

However, on the other hand, if a zoom lens is made to have a large relative aperture (F-number of 1.6), a high variable magnification ratio (zoom ratio of 8-15 or thereabout) and a wide angle of view while reducing the minimum object distance, as mentioned in the foregoing, such a problem becomes conspicuous that distortion increases, and, in particular, distortion in the minus tendency at the wide-angle end increases.

The reason for such an increase of distortion is that, in order to attain a wide angle of view while reducing the minimum object distance, it is necessary to strengthen the power of a lens subunit (first lens subunit) located on the most object side in the first lens unit, thereby causing distortion in the minus tendency at the wide-angle end to increase.

In general, in order to obtain high optical performance over the entire variable magnification range, it becomes necessary to increase the freedom of design on the correction of aberrations, for example, by increasing the number of lens elements of each lens unit.

Therefore, if it is tried to attain a zoom lens having a large relative aperture, a wide angle of view and a high variable magnification ratio, a problem arises in that the number of lens elements increases to make the size of the whole lens system large, so that it becomes impossible to meet the demand for reduction in size and weight.

BRIEF SUMMARY OF THE INVENTION

The invention has been made in view of the above-mentioned problems, and an object of the invention is to provide a zoom lens having high optical performance over the entire variable magnification range with the variation of various aberrations due to the variation of magnification lessened, in particular, with distortion on the wide-angle side and spherical aberration on the telephoto side corrected well, by, in the so-called four-unit zoom lens, appropriately setting the refractive power of each lens unit, the F-number, etc., and applying aspheric surfaces to at least two lens surfaces.

Another object of the invention is to provide a zoom lens having a large relative aperture and a high variable magnification ratio such as having an F-number of 1.5–1.8 or thereabout, an ultra-wide angle of view (angle of view at the wide-angle end $2\omega=78°-95°$ or thereabout) and a variable magnification ratio of 10-27 or thereabout.

A further object of the invention is to provide a zoom lens employing the inner focusing method in which focusing is effected by moving a lens subunit for focusing that is a part of a first lens unit of the four-unit zoom lens, and having high optical performance with distortion in the minus tendency at the wide-angle end corrected well while attaining a wide angle of view, a reduction in minimum object distance, and a high variable magnification ratio and attaining the reduction in size of the whole lens system.

To attain the above objects, in accordance with an aspect of the invention, there is provided a zoom lens comprising, in order from an object side to an image side, a first lens unit of positive refractive power, a second lens unit of negative refractive power for variation of magnification, a third lens unit for compensating for shift of an image plane caused by the variation of magnification, and a fixed fourth lens unit of positive refractive power, wherein the first lens unit comprises a first lens subunit of negative refractive power fixed during focusing, a second lens subunit having a focusing function, and a third lens subunit of positive refractive power fixed during focusing, and at least one. of the first lens subunit and the second lens subunit and the third lens subunit respectively have aspheric lenses.

In accordance with a preferred aspect of the invention, in the above zoom lens, the first lens subunit and the third lens subunit respectively have aspheric lenses.

In accordance with a preferred aspect of the invention, in the above zoom lens, the first lens subunit has an aspheric surface (AS1) formed on at least one lens surface thereof satisfying the following conditions:

$$1.30 < hw/ht, \text{ and } 1.05 < hw/hz$$

where ht is a maximum height of incidence of an on-axial light flux in the first lens subunit, hw is a height of incidence of an off-axial light flux of a maximum angle of view in the first lens subunit at a wide-angle end, and hz is a height of incidence of an off-axial light flux of a maximum angle of view in the first lens subunit at a zoom position corresponding to $Z^{1/4}$, Z being a variable magnification ratio of the zoom lens.

In accordance with a preferred aspect of the invention, in the above zoom lens, the third lens subunit has an aspheric surface (AS2) formed on at least one lens surface thereof satisfying the following conditions:

$$0.75 > hw/ht$$

where ht is a maximum height of incidence of an on-axial light flux in the third lens subunit, and hw is a height of incidence of an off-axial light flux of a maximum angle of view in the third lens subunit at a wide-angle end.

In accordance with a preferred aspect of the invention, the above zoom lens satisfies the following conditions:

$$Z>10.$$

$$-0.42 < \beta 2w < -0.18 \quad (1)$$

$$-2.45 < f11/f1 < -0.98 \quad (2)$$

$$1.05 < f13/f1 < 2.10 \quad (3)$$

where Z is a variable magnification ratio of the zoom lens, f1, f11 and f13 are focal lengths of the first lens unit, the first lens subunit and the third lens subunit, respectively, and β2w is a lateral magnification at a wide-angle end of the second lens unit.

In accordance with a preferred aspect of the invention, in the above zoom lens, the aspheric surface (AS1) has, when formed on a positive refractive surface, such a shape that a positive refractive power becomes progressively stronger toward a marginal lens portion thereof, or has, when formed on a negative refractive surface, such a shape that a negative refractive power becomes progressively weaker toward a marginal lens portion thereof, and the following conditions are satisfied:

$$1.07 \times 10^{-3} < |\Delta 1(10)/f1| < 7.20 \times 10^{-2}$$

$$1.06 \times 10^{-3} < |\Delta 1(9)/f1| < 4.90 \times 10^{-2}$$

$$6.10 \times 10^{-4} < \oplus \Delta 1(7)/f1| < 1.95 \times 10^{-2} \quad (4)$$

where Δ1(10), Δ1(9) and Δ1(7) are amounts of asphericity at portions corresponding to 100%, 90% and 70%, respectively, of an effective lens diameter of the aspheric surface (AS1), and f1 is a focal length of the first lens unit.

In accordance with a preferred aspect of the invention, in the above zoom lens, the aspheric surface (AS2) has, when formed on a positive refractive surface, such a shape that a positive refractive power becomes progressively weaker toward a marginal lens portion thereof, or has, when formed on a negative refractive surface, such a shape that a negative refractive power becomes progressively stronger toward a marginal lens portion thereof, and the following conditions are satisfied:

$$2.15 \times 10^{-3} < |\Delta 2(10)/f1| < 2.45 \times 10^{-2}$$

$$1.35 \times 10^{-3} < |\Delta 2(9)/f1| < 1.60 \times 10^{-2}$$

$$4.85 \times 10^{-4} < |\Delta 2(7)/f1| < 5.60 \times 10^{-3} \quad (5)$$

where Δ2(10), Δ2(9) and Δ2(7) are amounts of asphericity at portions corresponding to 100%, 90% and 70%, respectively, of an effective lens diameter of the aspheric surface (AS2), and f1 is a focal length of the first lens unit.

In accordance with a preferred aspect of the invention, in the above zoom lens, the first lens subunit comprises, in order from the object side, at least two negative lenses and at least one positive lens, the negative lens located on the most object side having a meniscus shape or a plano-concave shape having a strong concave surface facing the image side, and the following condition is satisfied:

$$\Delta v11n - \Delta v11p > 26.5 \quad (6)$$

where Δv11n is a mean value of Abbe numbers of materials of the at least two negative lenses, and Δv11p is an Abbe number of a material of the positive lens.

In accordance with a preferred aspect of the invention, in the above zoom lens, the second lens subunit moves toward the image side during focusing from an infinitely distant object to a minimum-distance object, and comprises at least one positive lens of a shape having a convex surface facing the image side.

In accordance with a preferred aspect of the invention, in the above zoom lens, the third lens subunit comprises at least one negative lens and at least three positive lenses, and the following condition is satisfied:

$$\Delta v13p - \Delta v13n > 37.4 \quad (7)$$

where Δv13n is an Abbe number of a material of the negative lens, and Δv13p is a mean value of Abbe numbers of materials of the at least three positive lenses.

In accordance with a preferred aspect of the invention, in the above zoom lens, the second lens subunit and the third lens subunit respectively have aspheric surfaces.

In accordance with a preferred aspect of the invention, in the above zoom lens, the second lens subunit moves along an optical axis during focusing, an image forming magnification of the second lens unit varies within a range including −1× during the variation of magnification, and the following conditions are satisfied:

$$1.2 \leq |f11/f1| \leq 1.7 \quad (8)$$

$$4.0 \leq |f12/f1| \leq 7.0 \quad (9)$$

$$1.1 < |f13/f1| \leq 1.7 \quad (10)$$

where f11 is a focal length of the first lens subunit, f12 is a focal length of the second lens subunit, f13 is a focal length of the third lens subunit, and f1 is a focal length of the first lens unit.

In accordance with a preferred aspect of the invention, in the above zoom lens, the second lens subunit has, on at least one lens surface thereof satisfying hW>hT where hT is a maximum height of incidence of an on-axial light flux and hW is a maximum height of incidence of an off-axial light flux of a maximum angle of view at a wide-angle end, an aspheric surface having, when formed on a positive refractive surface, such a shape that a positive refractive power becomes progressively stronger toward a marginal lens portion thereof, or an aspheric surface having, when formed on a negative refractive surface, such a shape that a negative refractive power becomes progressively weaker toward a marginal lens portion thereof.

In accordance with a preferred aspect of the invention, in the above zoom lens, the third lens subunit has at least one aspheric surface having, when formed on a positive refractive surface, such a shape that a positive refractive power becomes progressively weaker toward a marginal lens portion thereof, or at least one aspheric surface having, when formed on a negative refractive surface, such a shape that a negative refractive power becomes progressively stronger toward a marginal lens portion thereof.

In accordance with a preferred aspect of the invention, in the above zoom lens, the second lens subunit has one positive lens (12p), the third lens subunit has one negative lens (13n), and the following conditions are satisfied:

$$N12p \leq 1.67 \quad (11)$$

$$1.76 \leq N13n \quad (12)$$

$$-0.4 \leq \beta VW \leq -0.2 \quad (13)$$

where N12p is a refractive power of a material of the positive lens (12p), N13n is a refractive power of a material of the negative lens (13n), and βVW is a lateral magnification of the second lens unit at a wide-angle end.

In accordance with a preferred aspect of the invention, in the above zoom lens, the first lens subunit comprises, in order from the object side to the image side, at least one negative lens of meniscus form having a convex surface facing the object side, a negative lens of bi-concave form, and a positive lens having a convex surface facing the object side.

In accordance with a preferred aspect of the invention, in the above zoom lens, the second lens subunit comprises a positive lens having a convex surface facing the image side, comprises, in order from the object side to the image side, a positive lens having a convex surface facing the image side and a cemented lens composed of a positive lens and a negative lens, or comprises, in order from the object side to the image side, two positive lenses and a cemented lens composed of a negative lens and a positive lens.

In accordance with a preferred aspect of the invention, in the above zoom lens, the third lens subunit comprises, in order from the object side to the image side, a cemented lens composed of a positive lens and a negative lens, a cemented lens composed of a negative lens and a positive lens and a positive lens, comprises, in order from the object side to the image side, a cemented lens composed of a negative lens and a positive lens and a positive lens, or comprises, in order from the object side to the image side, a cemented lens composed of a negative lens and a positive lens, a positive lens and a positive lens.

In accordance with a preferred aspect of the invention, the above zoom lens is included in a camera system.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 17A, 17B and 17C are aberration diagrams showing the various aberrations of the zoom lens when the focal length f is 107.2 mm according to the numerical example 3 of the invention.

FIGS. 18A, 18B and 18C are aberration diagrams showing the various aberrations of the zoom lens when the focal length f is 180.9 mm according to the numerical example 3 of the invention.

DETAILED DESCRIPTION OF THE INVENTION

Hereinafter, preferred embodiments of the invention will be described in detail with reference to the drawings.

Figure 1:
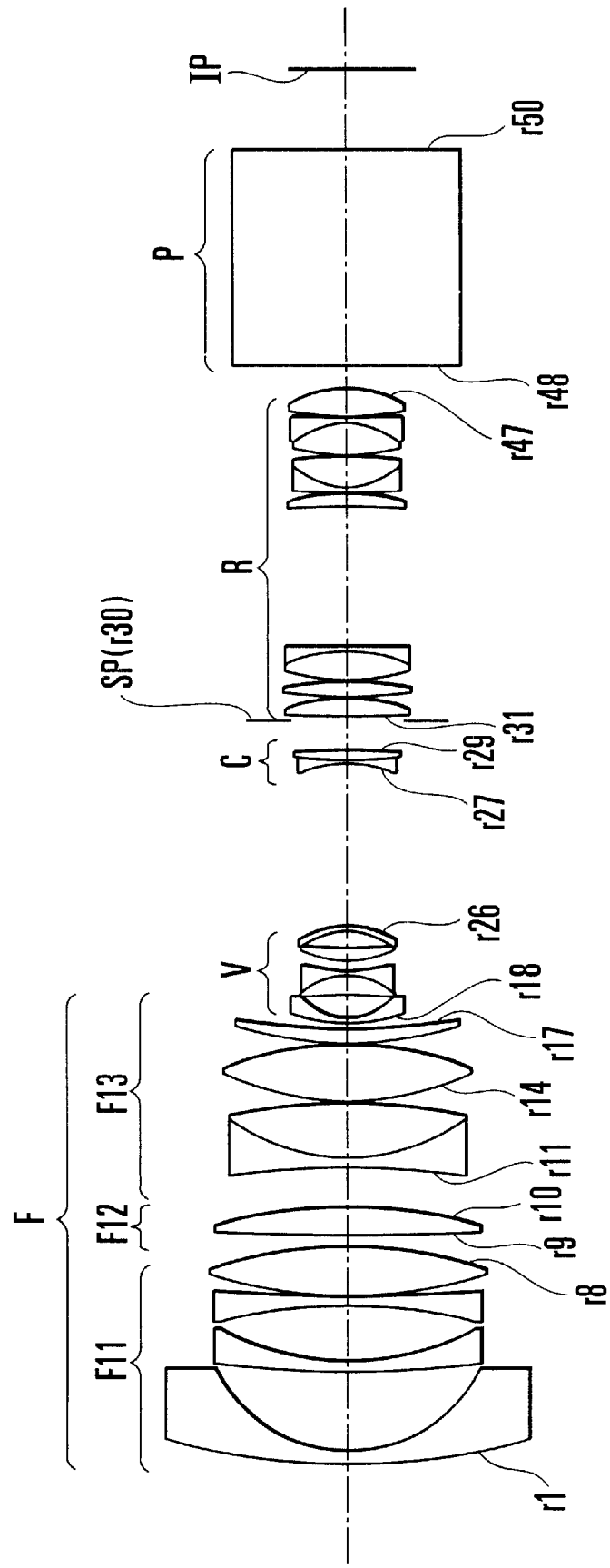
FIG. 1 is a lens sectional view showing a zoom lens at the wide-angle end according to a numerical example 1 of the invention.
Figure 2A:
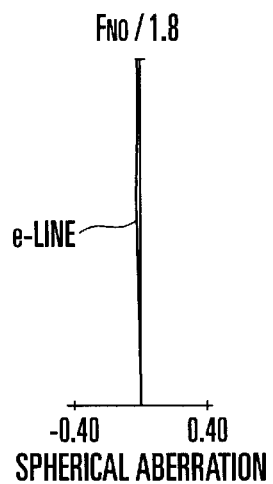
FIGS. 2A, 2B and 2C are aberration diagrams showing the various aberrations of the zoom lens when the focal length f is 5.00 mm according to the numerical example 1 of the invention.
Figure 2B:
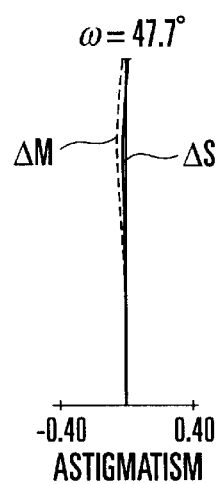
Figure 2C:
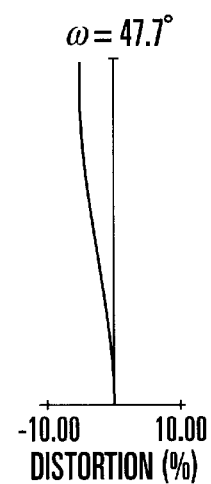
Figure 3A:
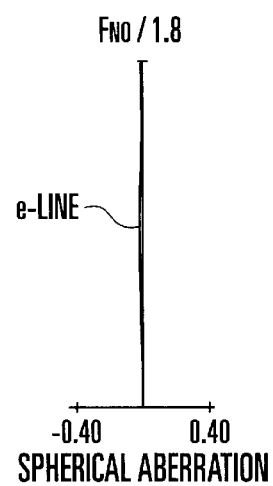
FIGS. 3A, 3B and 3C are aberration diagrams showing the various aberrations of the zoom lens when the focal length f is 8.89 mm according to the numerical example 1 of the invention.
Figure 3B:
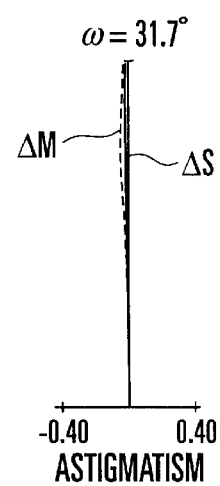
Figure 3C:
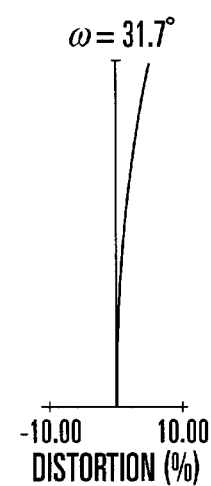
Figure 4A:
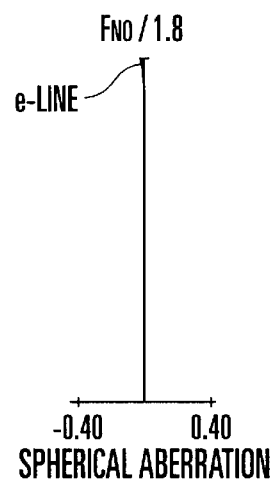
FIGS. 4A, 4B and 4C are aberration diagrams showing the various aberrations of the zoom lens when the focal length f is 12.50 mm according to the numerical example 1 of the invention.
Figure 4B:
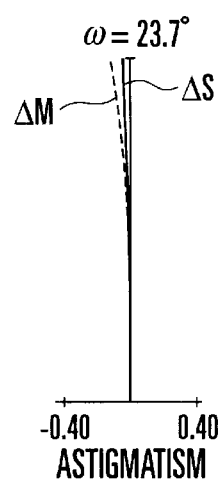
Figure 4C:
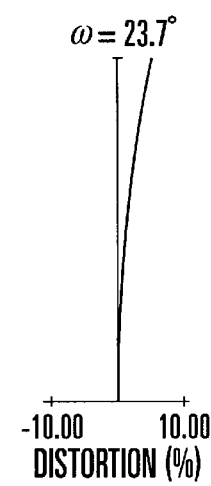
Figure 5A:
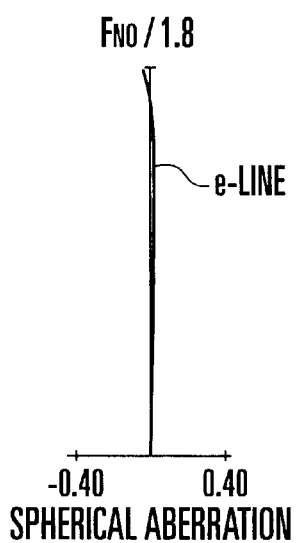
FIGS. 5A, 5B and 5C are aberration diagrams showing the various aberrations of the zoom lens when the focal length f is 37.50 mm according to the numerical example 1 of the invention.
Figure 5B:
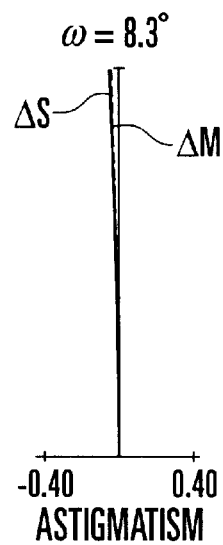
Figure 5C:
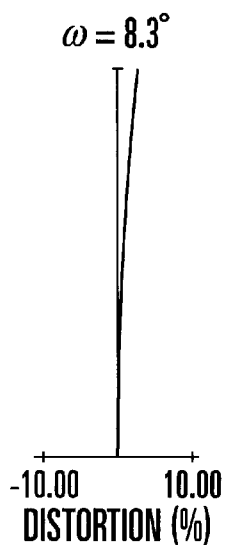
Figure 6A:
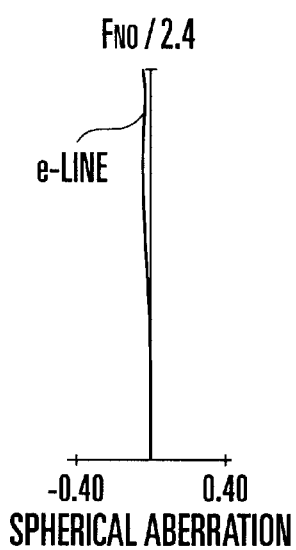
FIGS. 6A, 6B and 6C are aberration diagrams showing the various aberrations of the zoom lens when the focal length f is 50.00 mm according to the numerical example 1 of the invention.
Figure 6B:
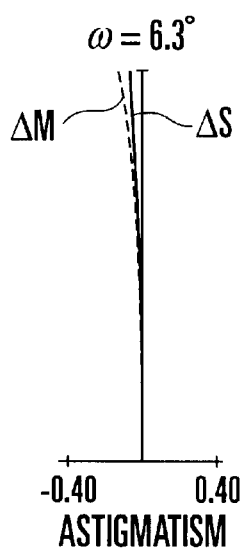
Figure 6C:
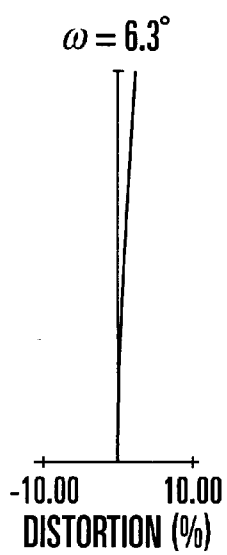

FIG. 1 is a lens sectional view showing a zoom lens in the wide-angle end according to a numerical example 1 of the invention. FIGS. 2A, 2B and 2C to FIGS. 6A, 6B and 6C are aberration diagrams showing the various aberrations of the zoom lens when the focal length f is 5.00 mm, 8.89 mm, 12.50 mm, 37.50 mm and 50.00 mm, respectively, according to the numerical example 1 of the invention.

Figure 7:
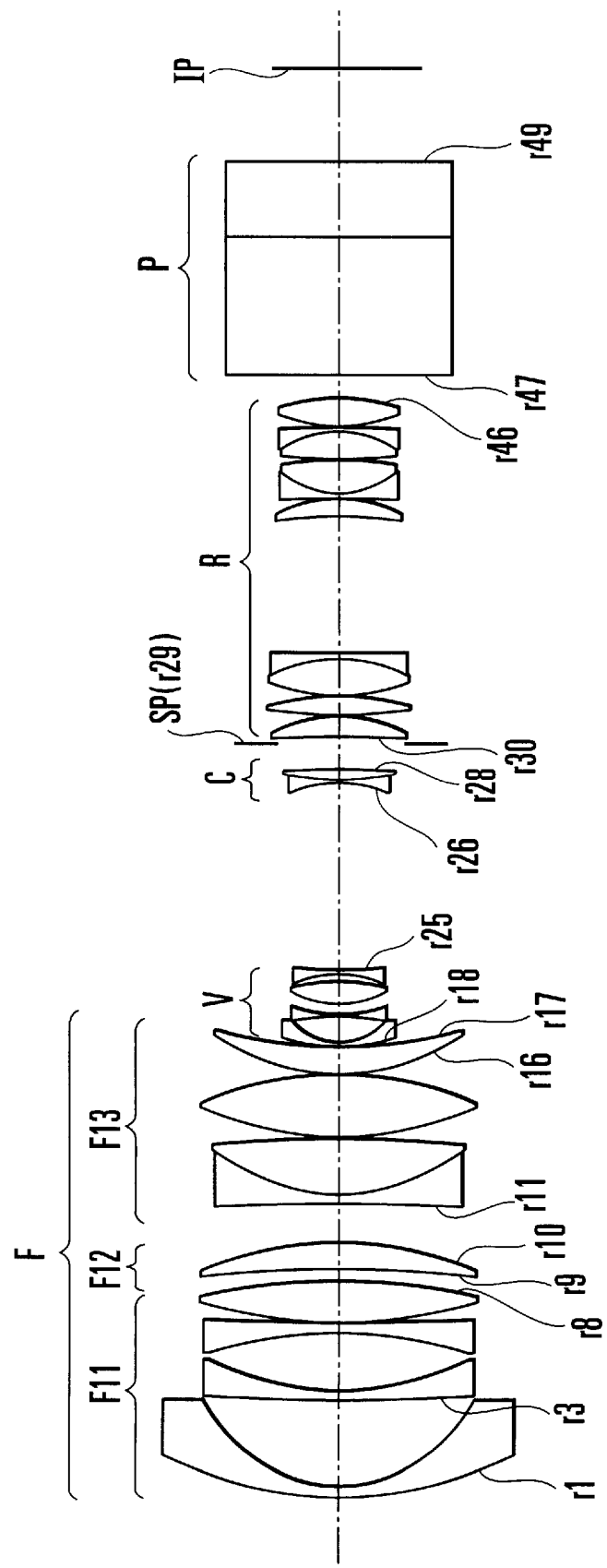
FIG. 7 is a lens sectional view showing a zoom lens at the wide-angle end according to a numerical example 2 of the invention.
Figure 8A:
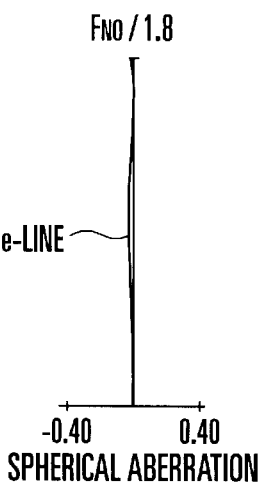
FIGS. 8A, 8B and 8C are aberration diagrams showing the various aberrations of the zoom lens when the focal length f is 5.50 mm according to the numerical example 2 of the invention.
Figure 8B:
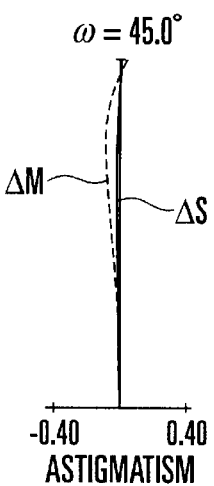
Figure 8C:
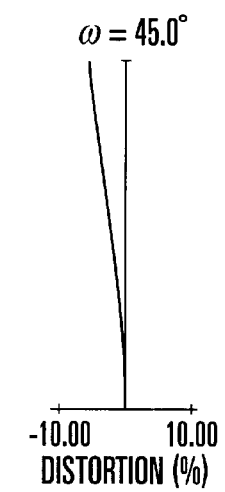
Figure 9A:
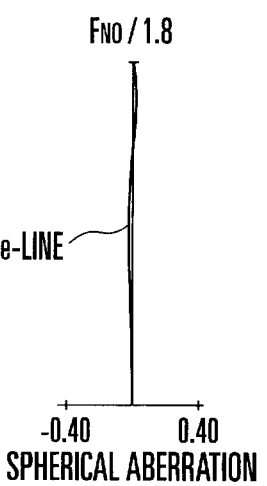
FIGS. 9A, 9B and 9C are aberration diagrams showing the various aberrations of the zoom lens when the focal length f is 10.24 mm according to the numerical example 2 of the invention.
Figure 9B:
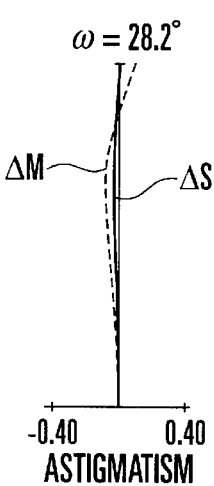
Figure 9C:
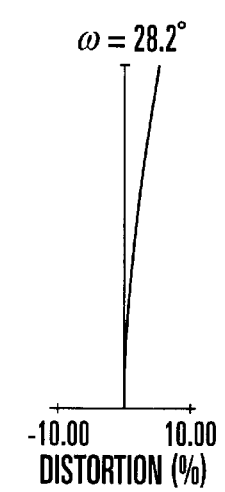
Figure 10A:
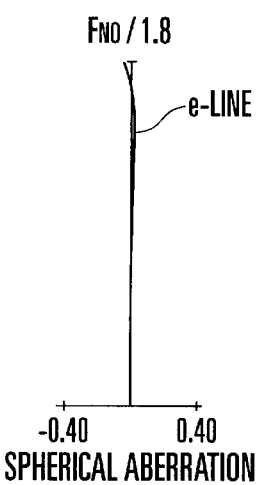
FIGS. 10A, 10B and 10C are aberration diagrams showing the various aberrations of the zoom lens when the focal length f is 22.00 mm according to the numerical example 2 of the invention.
Figure 10B:
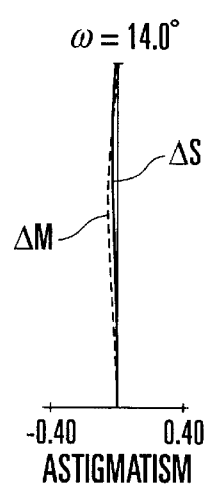
Figure 10C:
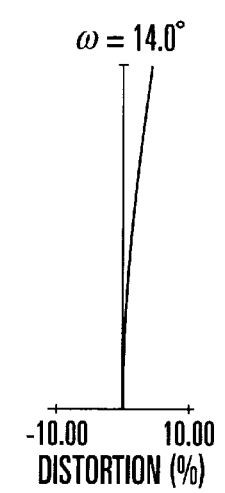
Figure 11A:
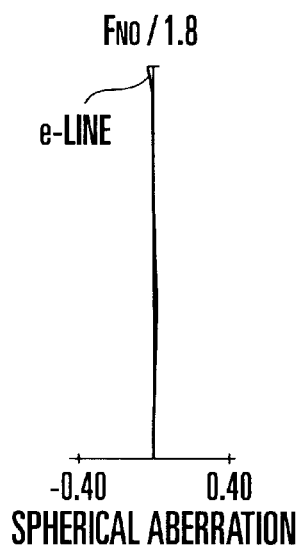
FIGS. 11A, 11B and 11C are aberration diagrams showing the various aberrations of the zoom lens when the focal length f is 46.75 mm according to the numerical example 2 of the invention.
Figure 11B:
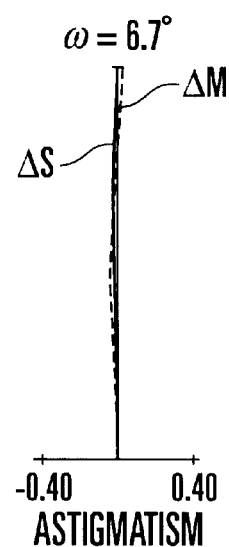
Figure 11C:
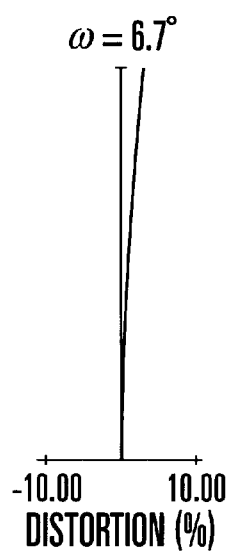
Figure 12A:
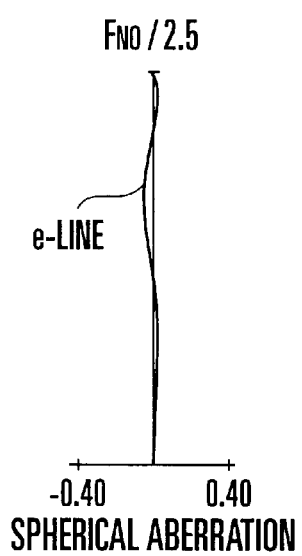
FIGS. 12A, 12B and 12C are aberration diagrams showing the various aberrations of the zoom lens when the focal length f is 66.00 mm according to the numerical example 2 of the invention.
Figure 12B:
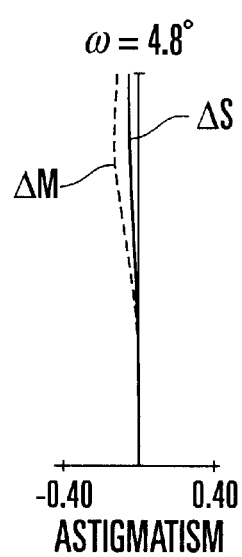
Figure 12C:
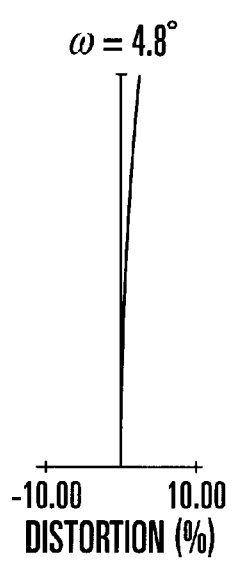

FIG. 7 is a lens sectional view showing a zoom lens at the wide-angle end according to a numerical example 2 of the invention. FIGS. 8A, 8B and 8C to FIGS. 12A, 12B and 12C are aberration diagrams showing the various aberrations of the zoom lens when the focal length f is 5.50 mm, 10.24 mm, 22.00 mm, 46.75 mm and 66.00 mm, respectively, according to the numerical example 2 of the invention.

Figure 13:
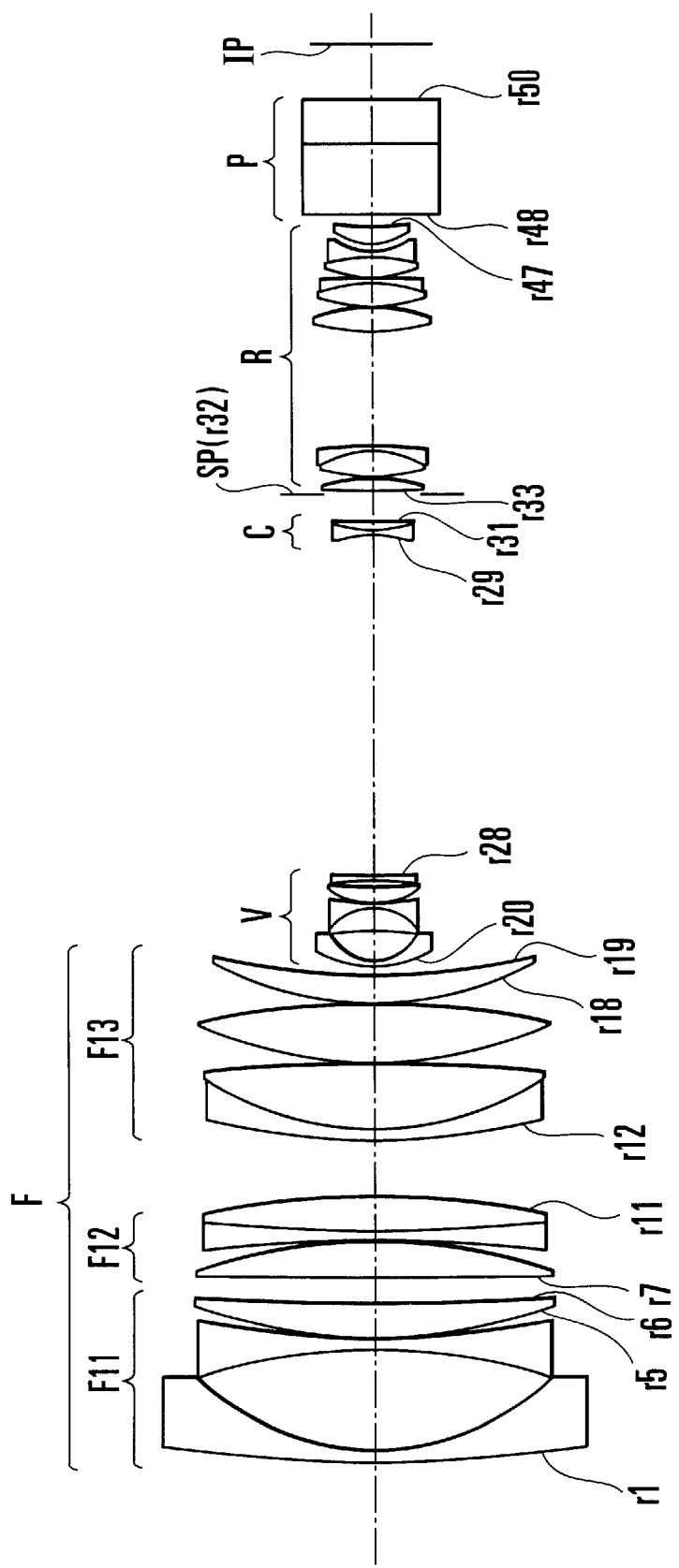
FIG. 13 is a lens sectional view showing a zoom lens in the wide-angle end according to a numerical example 3 of the invention.
Figure 14A:
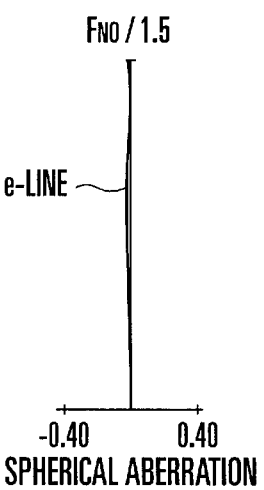
FIGS. 14A, 14B and 14C are aberration diagrams showing the various aberrations of the zoom lens when the focal length f is 6.70 mm according to the numerical example 3 of the invention.
Figure 14B:
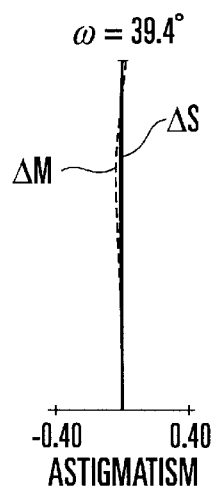
Figure 14C:
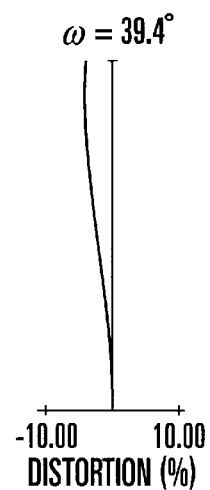
Figure 15A:
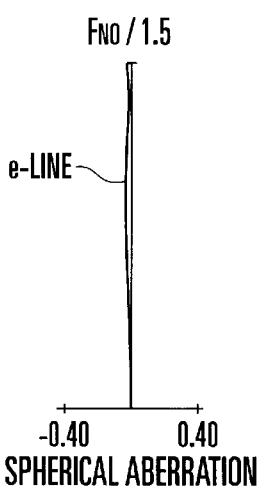
FIGS. 15A, 15B and 15C are aberration diagrams showing the various aberrations of the zoom lens when the focal length f is 15.27 mm according to the numerical example 3 of the invention.
Figure 15B:
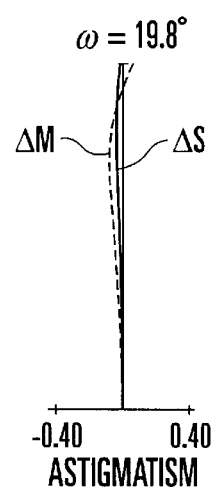
Figure 15C:
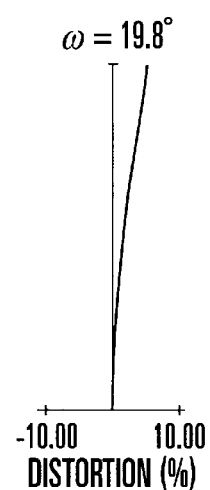
Figure 16A:
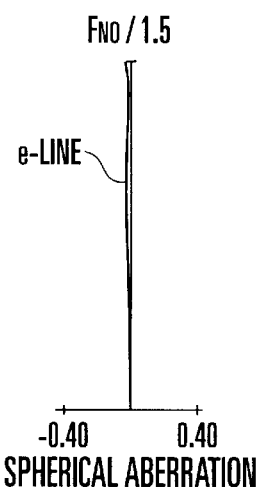
FIGS. 16A, 16B and 16C are aberration diagrams showing the various aberrations of the zoom lens when the focal length f is 33.50 mm according to the numerical example 3 of the invention.
Figure 16B:
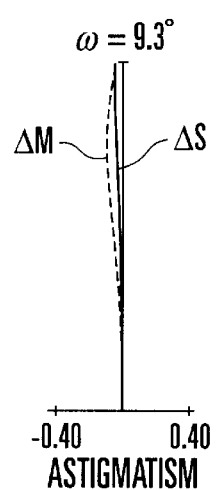
Figure 16C:
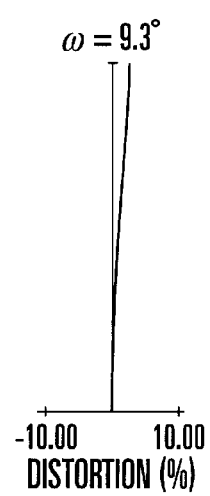

FIG. 13 is a lens sectional view showing a zoom lens at the wide-angle end according to a numerical example 3 of the invention. FIGS. 14A, 14B and 14C to FIGS. 18A, 18B and 18C are aberration diagrams showing the various aberrations of the zoom lens when the focal length f is 6.70 mm, 15.27 mm, 33.50 mm, 107.2 mm and 180.9 mm, respectively, according to the numerical example 3 of the invention.

Figure 19:
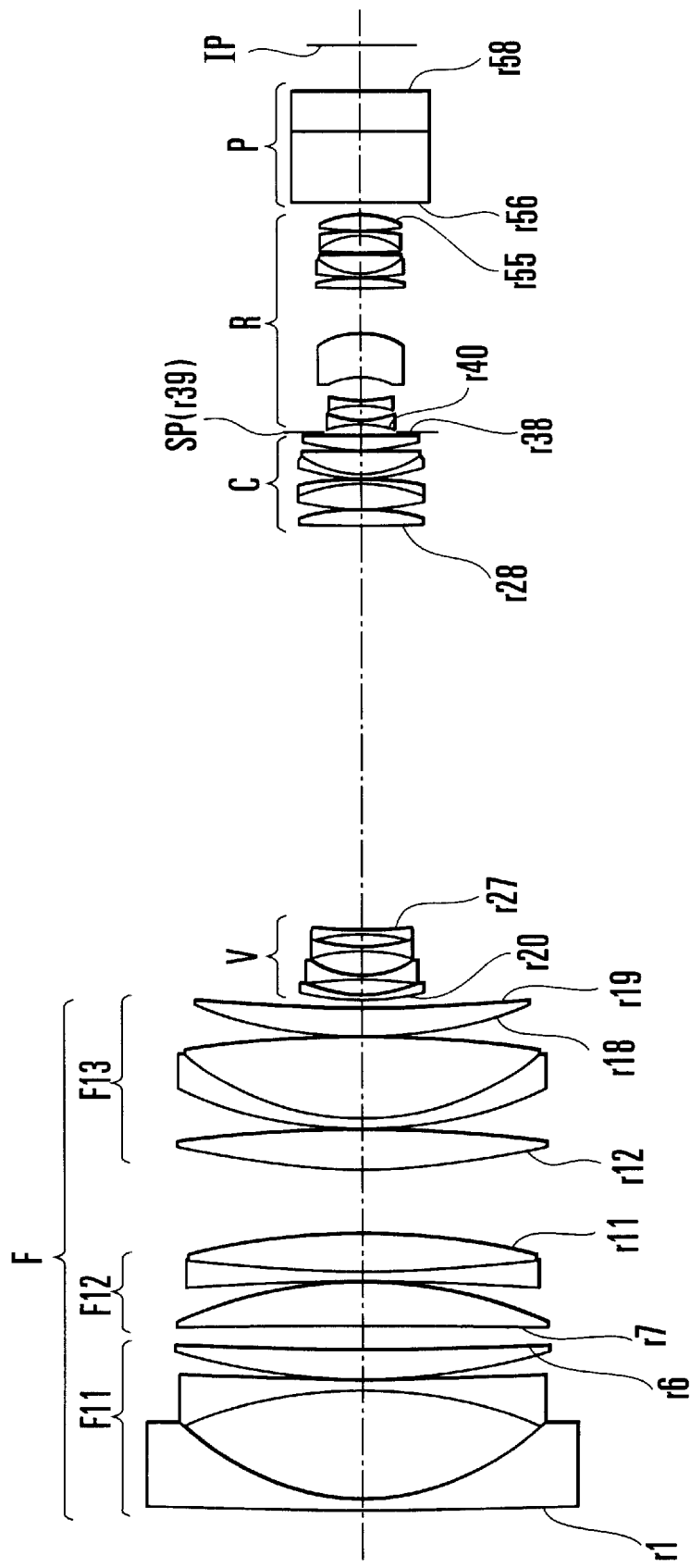
FIG. 19 is a lens sectional view showing a zoom lens at the wide-angle end according to a numerical example 4 of the invention.
Figure 20A:
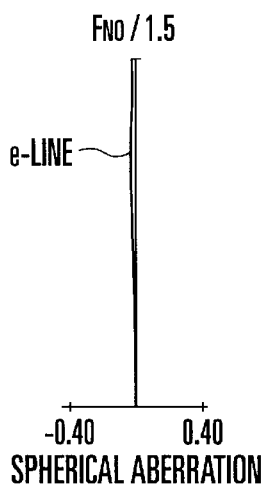
FIGS. 20A, 20B and 20C are aberration diagrams showing the various aberrations of the zoom lens when the focal length f is 6.70 mm according to the numerical example 4 of the invention.
Figure 20B:
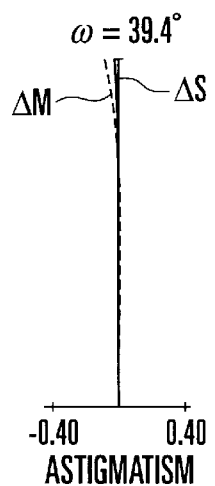
Figure 20C:
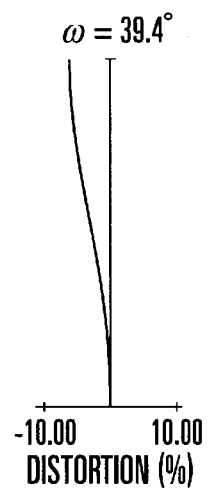
Figure 21A:
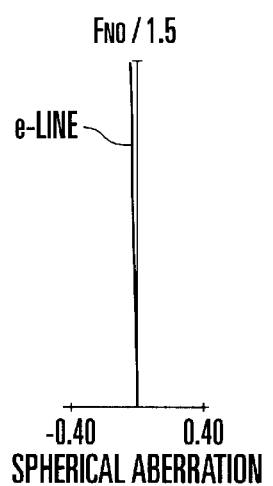
FIGS. 21A, 21B and 21C are aberration diagrams showing the various aberrations of the zoom lens when the focal length f is 15.27 mm according to the numerical example 4 of the invention.
Figure 21B:
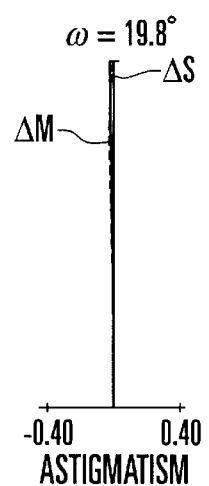
Figure 21C:
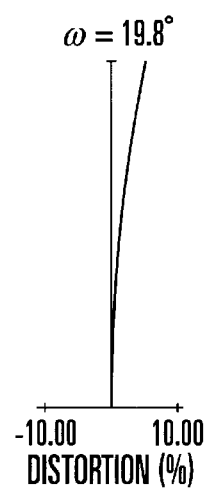
Figure 22A:
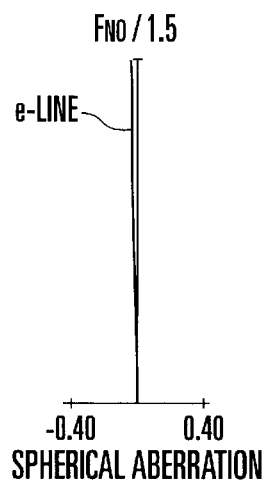
FIGS. 22A, 22B and 22C are aberration diagrams showing the various aberrations of the zoom lens when the focal length f is 28.66 mm according to the numerical example 4 of the invention.
Figure 22B:
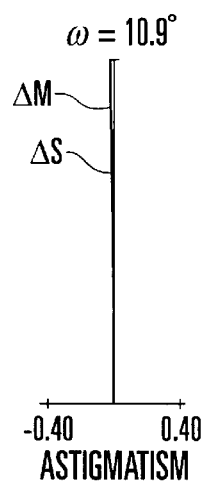
Figure 22C:
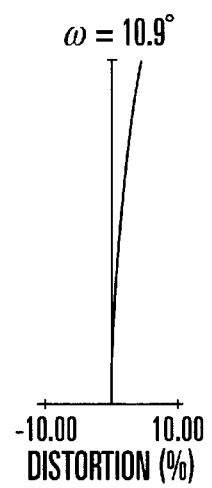
Figure 23A:
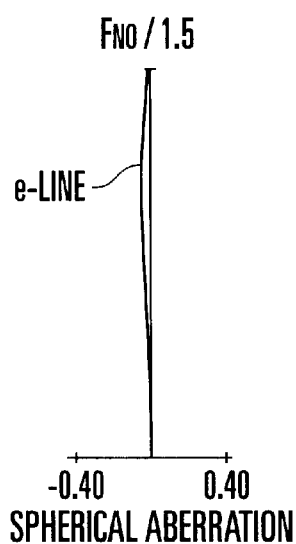
FIGS. 23A, 23B and 23C are aberration diagrams showing the various aberrations of the zoom lens when the focal length f is 67.55 mm according to the numerical example 4 of the invention.
Figure 23B:
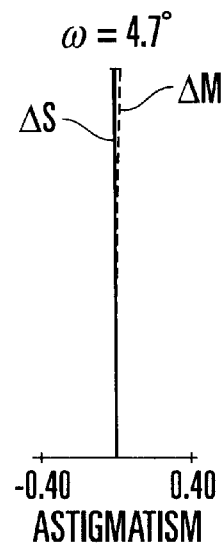
Figure 23C:
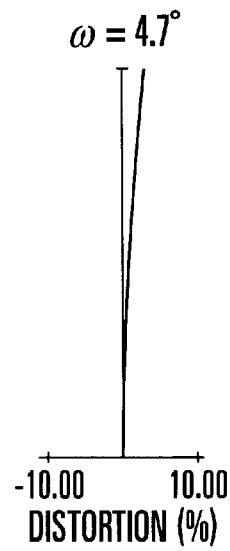
Figure 24A:
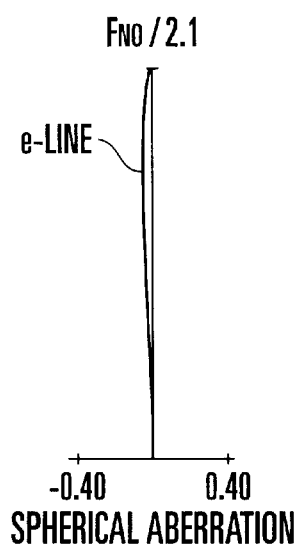
FIGS. 24A, 24B and 24C are aberration diagrams showing the various aberrations of the zoom lens when the focal length f is 180.9 mm according to the numerical example 4 of the invention.
Figure 24B:
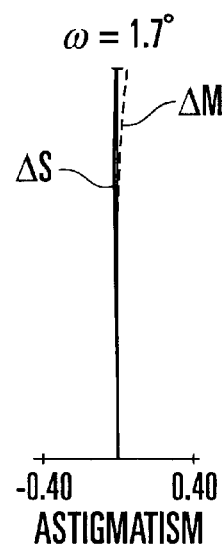
Figure 24C:
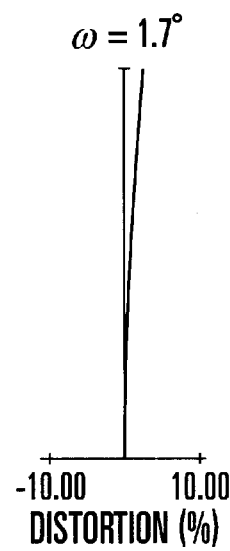
Figure 25:
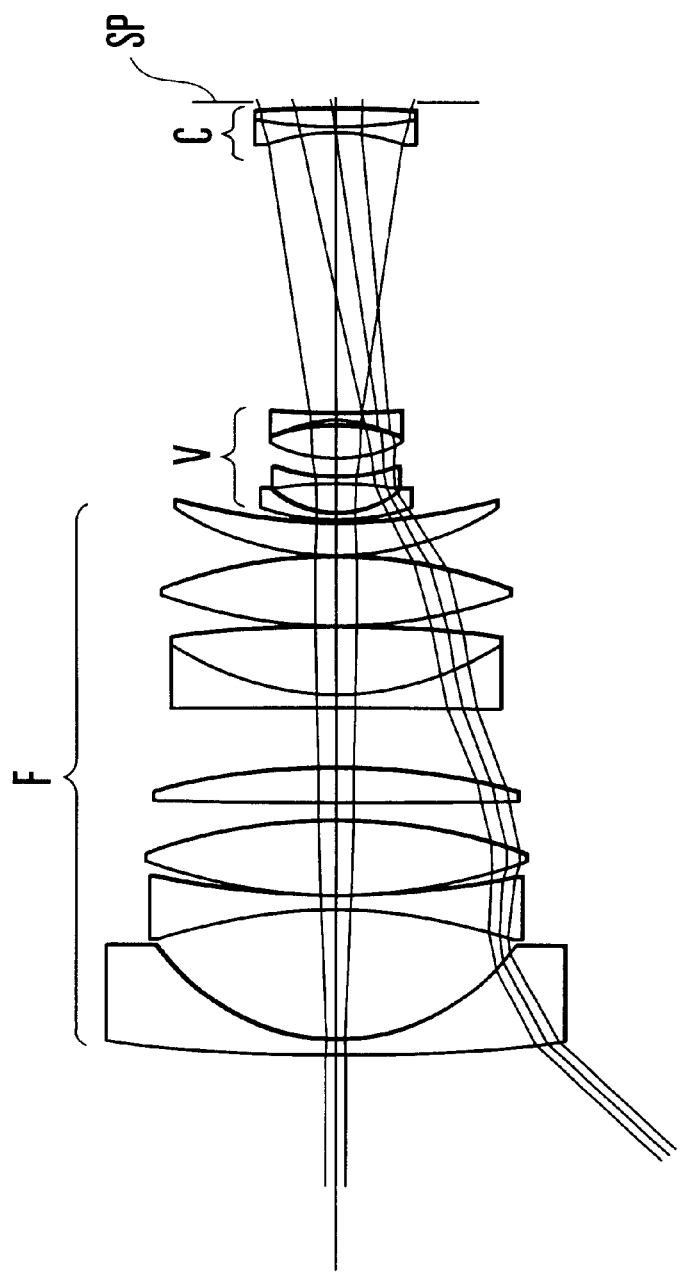
FIG. 25 is a diagram showing optical paths in a part of a wide-angle zoom lens.
Figure 26:
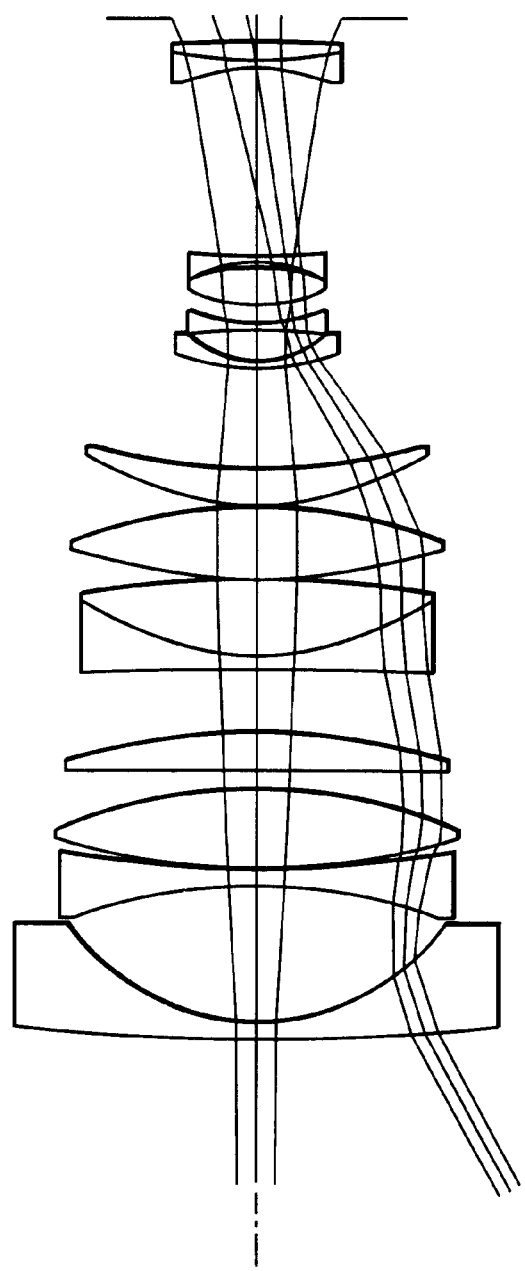
FIG. 26 is a diagram showing optical paths in the part of the wide-angle zoom lens.

FIG. 19 is a lens sectional view showing a zoom lens at the wide-angle end according to a numerical example 4 of the invention. FIGS. 20A, 20B and 20C to FIGS. 24A, 24B and 24C are aberration diagrams showing the various aberrations of the zoom lens when the focal length f is 6.70 mm, 15.27 mm, 28.66 mm, 67.55 mm and 180.9 mm, respectively, according to the numerical example 4 of the invention.

In the lens sectional views shown in FIGS. 1, 7, 13 and 19, a first lens unit F is a focusing lens unit (front lens unit) of positive refractive power, and comprises a fixed first lens subunit F11 of negative refractive power including at least two negative lenses and one positive lens, a second lens subunit F12 movable for focusing along an optical axis, and a fixed third lens subunit F13 of positive refractive power. A second lens unit V is a variator of negative refractive power for variation of magnification, and is arranged to move monotonously toward the image side along the optical axis so as to effect the variation of magnification from a wide-angle end to a telephoto end. A third lens unit C is a compensator of negative refractive power, and is arranged to move nonlinearly with a locus convex toward the image side along the optical axis so as to compensate for shift of an image plane caused by the variation of magnification. The third lens unit C is followed by a stop SP. A fourth lens unit R is a fixed relay lens unit of positive refractive power. Reference character P denotes a color separation prism, an optical filter or the like, which is illustrated as a glass block in FIGS. 1, 7, 13 and 19. Reference character IP denotes an image plane.

In the numerical examples 1 to 4, the first lens subunit F11 has at least one aspheric surface AS1, and the third lens subunit F13 has at least one aspheric surface AS2, so that the zoom lens has high optical performance over the entire variable magnification range.

Further, the variation of aberrations during focusing with the second lens subunit F12 is made small, so that the zoom lens has high optical performance over the entire object distance range.

While the zoom lens which the invention aims at can be achieved with the above-described construction, it is preferred, in terms of the correction of aberrations, to satisfy at least one of the following conditions.

(a-1) The first lens subunit F11 has an aspheric surface AS1 formed on at least one lens surface thereof satisfying the following conditions:

$$1.30 < hw/ht, \text{ and } 1.05 < hw/hz$$

where ht is a maximum height of incidence of an on-axial light flux in the first lens subunit F11, hw is a height of incidence of an off-axial light flux of a maximum angle of view in the first lens subunit F11 at a wide-angle end, and hz is a height of incidence of an off-axial light flux of a maximum angle of view in the first lens subunit F11 at a zoom position corresponding to $Z^{1/14}$, Z being a variable magnification ratio of the zoom lens.

Further, the third lens subunit F13 has an aspheric surface AS2 formed on at least one lens surface thereof satisfying the following conditions:

$$0.75 > hw/ht$$

where ht is a maximum height of incidence of an on-axial light flux in the third lens subunit F13, and hw is a height of incidence of an off-axial light flux of a maximum angle of view in the third lens subunit F13 at a wide-angle end.

Thus, according to the invention, in order to correct distortion at the wide-angle end, which has influence according to the cube of an angle of view, the aspheric surface AS1 is formed on, among lens surfaces constituting the first lens subunit F11 of the first lens unit (front lens unit) F, at least one lens surface satisfying "1.30<hw/ht" and "1.05<hw/hz", where ht is a maximum height of incidence of an on-axial light flux in the first lens subunit F11 in the entire variable magnification range, hw is a height of incidence of an off-axial light flux of a maximum angle of view in the first lens subunit F1 at a wide-angle end, and hz is a height of incidence of an off-axial light flux of a maximum angle of view in the first lens subunit F11 at a zoom position corresponding to $Z^{1/4}$, Z being a variable magnification ratio of the zoom lens. Further, in order to correct spherical aberration at the telephoto end, which has influence according to the cube of an aperture, the aspheric surface AS2 is formed on, among lens surfaces constituting the third lens subunit F13, at least one lens surface satisfying "0.75>hw/ht", where ht is a maximum height of incidence of an on-axial light flux in the third lens subunit F13 in the entire variable magnification range, and hw is a height of incidence of an off-axial light flux of a maximum angle of view in the third lens subunit F13 at a wide-angle end.

The above arrangement makes it possible to effectively correct distortion, which becomes a maximum when zooming is at the zoom position corresponding to $Z^{1/4}$ (Z being a variable magnification ratio of the zoom lens) or thereabout.

Figure 27:
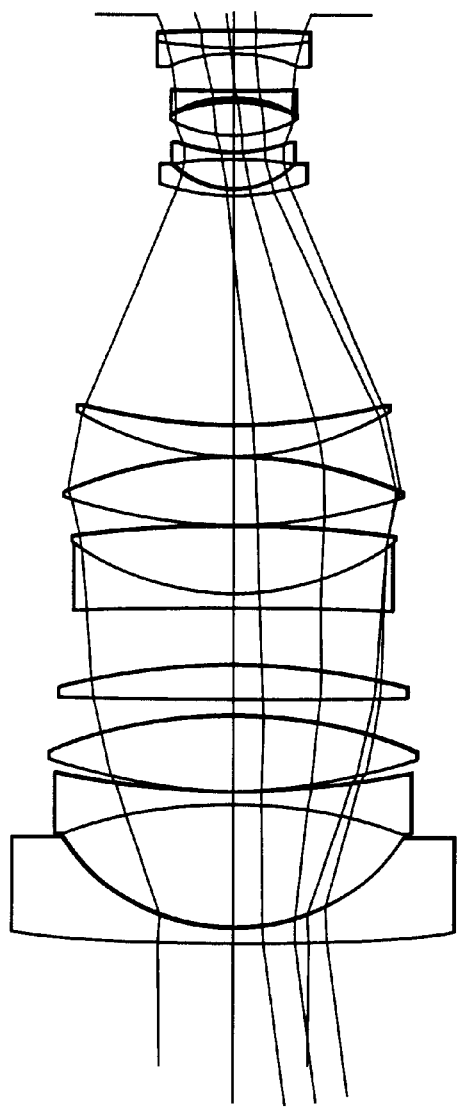
FIG. 27 is a diagram showing optical paths in the part of the wide-angle zoom lens.
Figure 28:
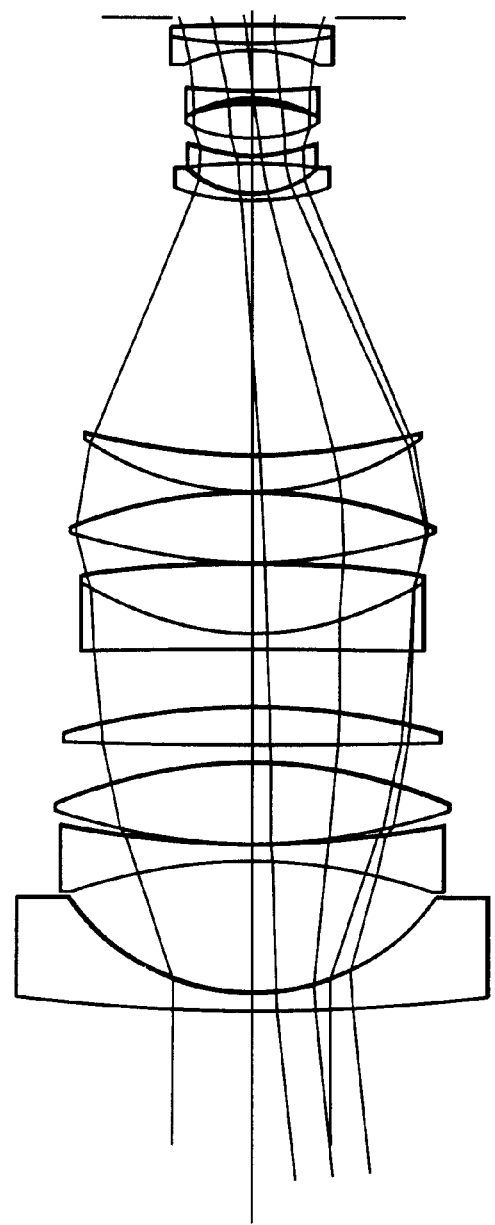
FIG. 28 is a diagram showing optical paths in the part of the wide-angle zoom lens.

Next, characteristic features of the aspheric surfaces to be employed in the zoom lens according to the invention are described. In the case of a zoom lens having an angle of view 2ω of 78°–95° at the wide-angle end and a zoom ratio of 10-27 or thereabout, a height of incidence of an on-axial light flux on each of the front lens unit and the variator becomes gradually higher as zooming advances from the wide-angle end to the telephoto end, as shown in FIGS. 25 to 28. In the case of a zoom lens having the so-called F drop, a height of incidence of an on-axial light flux on each of the front lens unit and the variator becomes highest when zooming is at a zoom position where the F drop begins (the zoom position fd as shown in FIG. 27). Then, when zooming is at the telephoto end, such a height stands as it is owing the F drop in the front lens unit, and becomes lower in the variator.

On the other hand, while an off-axial light flux passes through the full end of an effective diameter of the first lens subunit F11, in particular, of the front lens unit when zooming is at the wide-angle end, a height of incidence of an off-axial light flux on the first lens subunit F11 becomes suddenly low when zooming is at the zoom position fm=fw× $Z^{1/4}$. Conversely, a height of incidence of an off-axial light flux on the third lens subunit F13 becomes suddenly high. Such a tendency becomes conspicuous if a zoom lens having a wide angle of view and a high variable magnification ratio and reduced in size and weight is aimed at.

In suppressing the variation of aberrations by the employment of some aspheric surfaces, it is impossible to efficiently correct, with only one aspheric surface, both distortion, which greatly varies on the wide-angle side, and spherical aberration, which greatly varies on the telephoto side. This is because the aspheric surface shape and the amount of asphericity for correcting distortion greatly differ from those for correcting spherical aberration from the viewpoint of properties of the respective aberrations, so that, if an aspheric surface is applied taking any one of distortion and spherical aberration into consideration, such a bad influence as higher-order aberrations might be exerted on the other aberration.

The aspheric surface shape of the aspheric surface AS1 has, conversely, the opposite effect to what is intended with respect to distortion at the zoom position corresponding to $Z^{1/4}$ (Z being a variable magnification ratio of the zoom lens). Since the aspheric surface effect of the aspheric surface AS1 further strongly raises the over-tendency (plus tendency) of distortion caused by a strong positive refractive power of the front lens unit at the zoom position corresponding to $Z^{1/4}$(Z being a variable magnification ratio of the zoom lens), it would become difficult to suppress distortion.

Therefore, the satisfaction of the above condition of "1.30<hw/ht" means that an off-axial light flux passes through the first lens subunit F11 only when zooming is in the vicinity of the wide-angle end in the entire variable magnification range, and the height of incidence of the off-axial light flux has a great difference from a height of incidence of an on-axial light flux on the telephoto side. This arrangement makes it possible to suppress, as much as possible, the influence on the variation of spherical aberration on the telephoto side, etc., while correcting distortion at the wide-angle end caused by a wide angle of view. In addition, the concurrent satisfaction of the above condition of "1.05<hw/hz" means that an off-axial light flux passes through the first lens subunit F11 only when zooming is in the vicinity of the wide-angle end in the entire variable magnification range, and the height of incidence of the off-axial light flux has a great difference from a height of incidence of an off-axial light flux of a maximum angle of view in the vicinity of the zoom position corresponding to $Z^{1/4}$ (Z being a variable magnification ratio of the zoom lens), thereby avoiding, as much as possible, causing the aspheric surface effect to raise the over-tendency (plus tendency) of distortion due to a strong positive refractive power of the front lens unit at the zoom position corresponding to $Z^{1/4}$. This arrangement also makes it possible to suppress, as much as possible, the influence on the variation of spherical aberration on the telephoto side, etc., while correcting distortion at the wide-angle end caused by a wide angle of view.

Further, with regard to the aspheric surface AS2 in the third lens subunit F13, the satisfaction of the above condition of "0.75>hw/ht" means that an on-axial light flux passes through the third lens subunit F13 only when zooming is in the vicinity of the telephoto end in the entire variable magnification range, and the height of incidence of the on-axial light flux has a great difference from a height of incidence of an off-axial light flux on the wide-angle side. This arrangement makes it possible to suppress, as much as possible, the influence on the variation of distortion on the wide-angle side, etc., while correcting spherical aberration at the telephoto end caused by a high variable magnification ratio.

Owing to the additional advantageous effect of the aspheric surface AS2, it becomes possible to suppress the over-tendency (plus tendency) of distortion caused by an off-axial light flux being strongly raised by a positive refractive power of the front lens unit according to the sudden heightening of the height of incidence of an off-axial light flux in the front lens unit at the zoom position fm=fw× $Z^{1/4}$. In other words, if an aspheric surface is formed on such a lens surface of the third lens subunit F13 of the front lens unit that a height of incidence of an on-axial light flux on the telephoto side is high and the variation of a height of incidence of an off-axial light flux on the wide-angle side is large, a very advantageous effect can be obtained.

The aspheric surfaces AS1 and AS2 bring about greater effects if they are disposed away from each other at as large a distance as possible, because of the difference in their aberration correcting effects. Therefore, the first lens unit, which has the largest thickness in block form, is divided into three lens subunits and, moreover, the second lens subunit F12 is made to be used for focusing as an inner focusing lens, so that an appropriate distance is set between the aspheric surface AS1 and the aspheric surface AS2. Accordingly, a maximum aberration correcting effect can be obtained with only two aspheric surfaces.

As described in the foregoing, according to each of the numerical examples 1 to 4, a lens surface on which an aspheric surface is to be formed is appropriately set to correct well the variations of distortion on the wide-angle side and spherical aberration on the telephoto side, thereby obtaining high optical performance over the entire variable magnification range.

(a-2) The zoom lens satisfies the following conditions:

$Z>10$ $-0.42<\beta 2w<-0.18$ (1)

$-2.45<f11/f1<-0.98$ (2)

$1.05<f13/f1<2.10$ (3)

where Z is a variable magnification ratio, f1, f11 and f13 are focal lengths of the first lens unit F, the first lens subunit F11 and the third lens subunit F13, respectively, and $\beta 2w$ is a lateral magnification at the wide-angle end of the second lens unit V.

While the invention aims at such an ultra-wide-angle zoom lens as to have a zoom ratio Z of 10 or more and an angle of view 2ω at the wide-angle end exceeding 78°, in order to realize a zoom lens having a large aperture over the entire zooming range, first, a lateral magnification at the wide-angle end of the variator (the second lens unit) is set as in the condition (1), so that a power (refractive power) arrangement optimum for wide angles is set.

In addition, a refractive power of the first lens subunit F11 is so set as to satisfy the condition (2). By this arrangement, a lens subunit having a diverging function and a strong refractive power is disposed on the most object side of the first lens unit, so that the refractive power of the whole first lens unit is strengthened to realize a wide angle of view, and, at the same time, an appropriate diverging function is produced for improving the aberration correcting function performed when the second lens subunit F12 for focusing is moved along the optical axis.

If the upper limit of the condition (2) is exceeded, the diverging function becomes insufficient, making it difficult to realize a wide angle of view of the entire zoom lens system, and the variation of aberrations due to focusing remains greatly uncorrected. If the lower limit of the condition (2) is exceeded, the diverging function becomes too strong, making spherical aberration in the minus tendency suddenly large, so that it becomes difficult to perform aberration correction at the second lens subunit F12 and the third lens subunit F13.

If the upper limit of the condition (3) is exceeded, the diameter of curvature of each of lens surfaces constituting the third lens subunit F13 becomes suddenly small, so that the variation of aberrations, in particular, on the telephoto side would increase. Then, it becomes necessary to increase the number of lens elements for the purpose of heightening the freedom of design for aberration correction, thereby making it difficult to realize a large relative aperture and the reduction in size.

If the lower limit of the condition (3) is exceeded, the positive Petzval sum is remarkably reduced, so that it becomes difficult to correct spherical aberration in the minus tendency, which occurs in the first lens subunit F11, and the negative Petzval sum, which occurs in the variator V. Further, if the upper limit is exceeded, the principal point of the whole front lens unit comes into the image side, so that the opposite effect to what is intended for reduction in size is produced.

(a-3) The aspheric surface AS1 has, when formed on a positive refractive surface, such a shape that a positive refractive power becomes progressively stronger toward a marginal lens portion thereof, or has, when formed on a negative refractive surface, such a shape that a negative refractive power becomes progressively weaker toward a marginal lens portion thereof, and the following conditions are satisfied:

$$1.07 \times 10^{-3} < |\Delta 1(10)/f1| < 7.20 \times 10^{-2}$$

$$1.06 \times 10^{-3} < |\Delta 1(9)/f1| < 4.90 \times 10^{-2}$$

$$6.10 \times 10^{-4} < |\Delta 1(7)/f1| < 1.95 \times 10^{-2} \tag{4}$$

where $\Delta 1(10)$, $\Delta 1(9)$ and $\Delta 1(7)$ are amounts of asphericity at portions corresponding to 100%, 90% and 70%, respectively, of an effective lens diameter of the aspheric surface AS1.

Thus, the aspheric surface AS1, which is an aspheric surface provided for correcting the variation of distortion on the wide-angle side, has, when formed on a positive refractive surface in the first lens subunit F11, such a shape that a positive refractive power becomes progressively stronger toward a marginal lens portion thereof, or has, when formed on a negative refractive surface, such a shape that a negative refractive power becomes progressively weaker toward a marginal lens portion thereof. Accordingly, the aspheric surface AS1 is provided for correcting the under-tendency (minus tendency) of distortion in the vicinity of the wide-angle end, thereby correcting well the variation of distortion on the wide-angle side.

Further, the aspheric surface shape of the aspheric surface AS1 in the first lens subunit F11 is formed such that, in order to correct well distortion on the wide-angle side occurring due to a wide angle of view, a central portion of the aspheric surface is almost a spherical surface, and the amount of asphericity becomes progressively larger toward a marginal lens portion thereof, in such a way as to satisfy the above condition (4).

The above condition (4) is provided for making the aspheric surface produce a distortion correcting effect only in a very small part of the entire zooming range, i.e., only in the vicinity of the wide-angle end, and for, in the other part of the entire zooming range, making the influence on spherical aberration, astigmatism, coma, etc., as little as possible.

(a-4) The aspheric surface AS2 has, when formed on a positive refractive surface, such a shape that a positive refractive power becomes progressively weaker toward a marginal lens portion thereof, or has, when formed on a negative refractive surface, such a shape that a negative refractive power becomes progressively stronger toward a marginal lens portion thereof, and the following conditions are satisfied:

$$2.15 \times 10^{-3} < |\Delta 2(10)/f1| < 2.45 \times 10^{-2}$$

$$1.35 \times 10^{-3} < |\Delta 2(9)/f1| < 1.60 \times 10^{-2}$$

$$4.85 \times 10^{-4} < |\Delta 2(7)/f1| < 5.60 \times 10^{-3} \tag{5}$$

where $\Delta 2(10)$, $\Delta 2(9)$ and $\Delta 2(7)$ are amounts of asphericity at portions corresponding to 100%, 90% and 70%, respectively, of an effective lens diameter of the aspheric surface AS2.

Thus, the aspheric surface AS2, which is an aspheric surface provided for correcting the variation of spherical aberration on the telephoto side, has, when formed on a positive refractive surface in the third lens subunit F13, such a shape that a positive refractive power becomes progressively weaker toward a marginal lens portion thereof, or has, when formed on a negative refractive surface, such a shape that a negative refractive power becomes progressively stronger toward a marginal lens portion thereof. Accordingly, the aspheric surface AS2 is provided for correcting the under-tendency (minus tendency) of spherical aberration in the vicinity of the telephoto end, thereby correcting well the variation of spherical aberration on the telephoto side.

Further, the aspheric surface shape of the aspheric surface AS2 in the third lens subunit F13 is formed such that, in order to correct well spherical aberration on the telephoto side occurring due to a high variable magnification ratio, a central portion of the aspheric surface is almost a spherical surface, and the amount of asphericity becomes progressively larger toward a marginal lens portion thereof, in such a way as to satisfy the above condition (5).

The above condition (5) is provided for making the aspheric surface produce a spherical aberration correcting effect only in a very small part of the entire zooming range, i.e., only in the vicinity of the telephoto end, and for, in the other part of the entire zooming range, making the influence on astigmatism, coma, etc., as little as possible.

(a-5) The first lens subunit F11 comprises, in order from the object side to the image side, at least two negative lenses and at least one positive lens, the negative lens located on the most object side has a meniscus shape or a plano-concave shape having a strong concave surface facing the image side, and the following condition is satisfied:

$$\Delta v11n - \Delta v11p > 26.5 \tag{6}$$

where $\Delta v11n$ is a mean value of Abbe numbers of materials of the at least two negative lenses, and $\Delta v11p$ is an Abbe number of a material of the positive lens.

Thus, with regard to the front lens unit, the first lens subunit F11 comprises, in order from the object side to the image side, at least two negative lenses and at least one positive lens, and the negative lens located on the most object side has a meniscus shape or a plano-concave shape having a strong concave surface facing the image side, thereby suppressing, as much as possible, the occurrence of distortion at the wide-angle end.

Further, the condition (6) for achromatism in the first lens subunit F11 is satisfied, thereby correcting well achromatism of an off-axial light ray on the wide-angle side in particular.

If the lower limit of the condition (6) is exceeded, achromatism becomes insufficient, so that the variation of lateral chromatic aberration on the wide-angle side remains greatly uncorrected.

(a-6) The second lens subunit F12 moves toward the image side during focusing from an infinitely distant object to a minimum-distance object, and comprises at least one positive lens of a shape having a convex surface facing the image side.

The so-called inner focusing method in which the second lens subunit F12 moves toward the image side during focusing from an infinitely distant object to a minimum-distance object is employed, thereby correcting well the variation of aberrations due to object distances and, at the same time, attaining the effect of reducing the size of the whole zoom lens and reducing focus-driving torque.

Further, the second lens subunit F12 comprises at least one positive lens of a shape having a convex surface facing the image side, thereby attaining the effect of correcting distortion which varies greatly in the under-tendency (minus tendency) at the wide-angle end.

(a-7) The third lens subunit F13 comprises at least one negative lens and at least three positive lenses, and the following condition is satisfied:

$$\Delta v13p - \Delta v13n > 37.4 \quad (7)$$

where $\Delta v13n$ is an Abbe number of a material of the negative lens, and $\Delta v13p$ is a mean value of Abbe numbers of materials of the at least three positive lenses.

Thus, the third lens subunit F13 comprises at least one negative lens and at least three positive lenses.

Further, the condition (7) for achromatism in the third lens subunit F13 is satisfied, thereby correcting well achromatism of an on-axial light ray on the telephoto side in particular.

If the lower limit of the condition (7) is exceeded, achromatism becomes insufficient, so that the variation of longitudinal chromatic aberration on the telephoto side remains greatly uncorrected.

Next, characteristic features of each of the numerical examples 1 to 4 are described. A zoom lens according to the numerical example 1 shown in FIG. 1 has a zoom ratio of 10 and an angle of view $2\omega$ at the wide-angle end exceeding 95°. Referring to FIG. 1, surfaces r1 to r17 define a front lens unit F. Surfaces r1 to r8 define a first lens subunit F11 stationary during focusing and having a negative power (refractive power). Surfaces r9 to r10 define a second lens subunit F12 having a focusing function and arranged to move toward the image side during focusing from an infinitely distant object to a minimum-distance object. Surfaces r11 to r17 define a third lens subunit F13 stationary during focusing and having a positive power. Surfaces r18 to r26 define a variator V arranged to move monotonously toward the image side during variation of magnification from the wide-angle end to the telephoto end. Surfaces r27 to r29 define a compensator C having the function of compensating for shift of an image plane due to the variation of magnification, having a negative power and arranged to move in such a way as to draw an arc convex toward the object side during the variation of magnification from the wide-angle end to the telephoto end. Reference character SP (r30) denotes a stop. Surfaces r31 to r47 define a relay lens unit R having an image forming function. Surfaces r48 to r50 define a glass block P equivalent to a color separation prism.

The zoom lens according to the numerical example 1 has such a wide angle of view as to have a power (refractive power) of $\beta 2w = -0.392$, where $\beta 2w$ is a lateral magnification of the variator V at the wide-angle end.

To cope with the wide angle of view, in the front lens unit F, first, the first lens subunit F11, which has a great influence on the various aberrations on the wide-angle side because a height of incidence of an off-axial light flux becomes large on the wide-angle side, comprises four lenses, i.e., in order from the object side, negative, negative, negative and positive lenses, and the negative lens located on the most object side has a meniscus shape or a plano-concave shape having a strong concave surface facing the image side, thereby suppressing the occurrence of distortion in the front lens unit F.

Further, the inner focusing method in which the second lens subunit F12 is used as a focusing lens is employed, thereby correcting well the variation of aberrations due to object distances and, at the same time, attaining the effect of reducing the size of the whole zoom lens and reducing focus-driving torque.

Further, the third lens subunit F13, which has a great influence on the various aberrations on the telephoto side because a height of incidence of an on-axial light flux becomes large on the telephoto side, comprises four lenses, i.e., in order from the object side, negative, positive, positive and positive lenses, and the negative lens of the third lens subunit F13 diverges spherical aberration to suppress the occurrence of spherical aberration in the front lens unit F.

The above-mentioned conditions (2), (3), (6) and (7) have such values that $f11/f1=-2.302$, $f13/f1=2.009$, $\Delta v11n - \Delta v11p = 29.35$, and $\Delta v13p - \Delta v13n = 41.79$.

In addition, the variator V comprises, in order from the object side, negative, positive, negative, positive and negative lenses. First, the negative lens located on the most object side has a meniscus shape having a strong concave surface facing the image side, thereby effectively correcting distortion at the wide-angle end.

A combination of the second, positive lens and the third, negative lens of the variator V is used to correct the variation of chromatic aberration and, in particular, lateral chromatic aberration itself. The reason for this is as follows. Since the variator V is composed of five lenses, thus increasing the thickness of the whole variator V, the nearer to the image side the position for achromatism as a variator, the greater the shift of the position of a principal point with wavelengths of the variator becomes, thus producing great lateral chromatic aberration. Therefore, as in the construction of the numerical example 1, the position for achromatism as a variator is made to exist on the object side, thereby correcting well lateral chromatic aberration.

Further, as a combination of the fourth, positive lens and the fifth, negative lens of the variator V, an appropriate difference in refractive index is set between the fourth lens and the fifth lens to correct coma on the telephoto side in particular. Since the positive lens and the negative lens have either one of a cemented form and a separate form, when the influence of higher-order aberrations is taken into consideration, if the difference in refractive index is small, the effect of divergence of coma occurring when the positive lens and the negative lens have a cemented form is remarkably lost.

In addition, the compensator C comprises two lenses, i.e., a negative lens and a positive lens, thereby causing a diverging spherical aberration and chromatic aberration at the boundary between the negative lens and the positive lens to suppress the occurrence of the various aberrations.

The aspheric surface AS1 of the first lens subunit F11 is formed on the surface r1, and is arranged to effectively utilize the fact that an off-axial light flux passes through the surface r1 only when zooming is in the vicinity of the wide-angle end in the entire variable magnification range, and the height of incidence of the off-axial light flux has a great difference from a height of incidence of an on-axial light flux on the telephoto side, and the fact that an off-axial light flux passes through the surface r1 only when zooming is in the vicinity of the wide-angle end in the entire variable magnification range, and the height of incidence of the off-axial light flux has a great difference from a height of incidence of an off-axial light flux of a maximum angle of view in the vicinity of the zoom position corresponding to $Z^{1/4}$ (Z being a variable magnification ratio of the zoom lens). Here, hw/ht=3.796, and hw/hz=1.413.

The direction of asphericity of the aspheric surface AS1 is such a direction that a positive power becomes stronger as the distance from the optical axis becomes larger. In order to efficiently correct distortion and spherical aberration up to higher-order regions, the aspheric surface AS1 uses up to aspheric coefficients B, C, D and E. Here, the amount of asphericity is 1847 μm at a maximum height of incidence of a ray on the surface r1.

The aspheric surface AS2 of the third lens subunit F13 is formed on the surface r14, and is arranged to effectively utilize the fact that an on-axial light flux passes through the surface r14 only when zooming is in the vicinity of the telephoto end in the entire variable magnification range, and the height of incidence of the on-axial light flux has a great difference from a height of incidence of an off-axial light flux on the wide-angle side. Here, hw/ht=0.743.

The direction of asphericity of the aspheric surface AS2 is such a direction that a positive power becomes weaker as the distance from the optical axis becomes larger. In order to efficiently correct distortion and spherical aberration up to higher-order regions, the aspheric surface AS2 uses up to aspheric coefficients B, C, D and E. Here, the amount of asphericity is 621.1 μm at a maximum height of incidence of a ray on the surface r14.

FIGS. 2A to 2C through FIGS. 6A to 6C are graphs respectively showing spherical aberration, astigmatism and distortion at the various zoom positions in the zoom lens according to the numerical example 1.

A zoom lens according to the numerical example 2 shown in FIG. 7 has a zoom ratio of 12 and an angle of view 2ω at the wide-angle end exceeding 90°. Referring to FIG. 7, surfaces r1 to r17 define a front lens unit F. Surfaces r1 to r8 define a first lens subunit F11 stationary during focusing and having a negative power (refractive power). Surfaces r9 to r10 define a second lens subunit F12 having a focusing function and arranged to move toward the image side during focusing from an infinitely distant object to a minimum-distance object. Surfaces r11 to r17 define a third lens subunit F13 stationary during focusing and having a positive power. Surfaces r18 to r25 define a variator V arranged to move monotonously toward the image side during variation of magnification from the wide-angle end to the telephoto end. Surfaces r26 to r28 define a compensator C having the function of compensating for shift of an image plane due to the variation of magnification, having a negative power and arranged to move in such a way as to draw an arc convex toward the object side during the variation of magnification from the wide-angle end to the telephoto end. Reference character SP (r29) denotes a stop. Surfaces r30 to r46 define a relay lens unit R having an image forming function. Surfaces r47 to r49 define a glass block P equivalent to a color separation prism.

The zoom lens according to the numerical example 2 has such a wide angle of view as to have a power (refractive power) of β2w=−0.342, where β2w is a lateral magnification of the variator V at the wide-angle end.

To cope with the wide angle of view, in the front lens unit F, first, the first lens subunit F11, which has a great influence on the various aberrations on the wide-angle side because a height of incidence of an off-axial light flux becomes large on the wide-angle side, comprises four lenses, i.e., in order from the object side, negative, negative, negative and positive lenses, and the negative lens located on the most object side has a meniscus shape having a strong concave surface facing the image side, thereby suppressing the occurrence of distortion in the front lens unit F.

Further, the inner focusing method in which the second lens subunit F12 is used as a focusing lens is employed, thereby correcting well the variation of aberrations due to object distances and, at the same time, attaining the effect of reducing the size of the whole zoom lens and reducing focus-driving torque.

Further, the third lens subunit F13, which has a great influence on the various aberrations on the telephoto side because a height of incidence of an on-axial light flux becomes large on the telephoto side, comprises four lenses, i.e., in order from the object side, negative, positive, positive and positive lenses, and the negative lens of the third lens subunit F13 causes spherical aberration to diverge to suppress the occurrence of spherical aberration in the front lens unit F.

The above-mentioned conditions (2), (3), (6) and (7) have such values that f11/f1=−1.995, f13/f1=1.743, Δv11n−Δv11p=28.12, and Δv13p−Δv13n=41.83.

In addition, the variator V comprises four lenses, i.e., in order from the object side, negative, negative, positive and negative lenses. The positive lens of the variator V is arranged to cause a divergence in spherical aberration, coma, etc., to suppress the occurrence of the various aberrations in the variator V.

In addition, the compensator C comprises two lenses, i.e., a negative lens and a positive lens, thereby causing a divergence in spherical aberration and chromatic aberration at the boundary between the negative lens and the positive lens to suppress the occurrence of the various aberrations.

The aspheric surface AS1 of the first lens subunit F11 is formed on the surface r3, and is arranged to effectively utilize the fact that an off-axial light flux passes through the surface r3 only when zooming is in the vicinity of the wide-angle end in the entire variable magnification range, and the height of incidence of the off-axial light flux has a great difference from a height of incidence of an on-axial light flux on the telephoto side, and the fact that an off-axial light flux passes through the surface r3 only when zooming is in the vicinity of the wide-angle end in the entire variable magnification range, and the height of incidence of the off-axial light flux has a great difference from a height of incidence of an off-axial light flux of a maximum angle of view in the vicinity of the zoom position corresponding to $Z^{1/4}$ (Z being a variable magnification ratio of the zoom lens). Here, hw/ht=1.784, and hw/hz=1.198.

The direction of asphericity of the aspheric surface AS1 is such a direction that a positive power becomes stronger as the distance from the optical axis becomes larger. In order to efficiently correct distortion and spherical aberration up to higher-order regions, the aspheric surface AS1 uses up to aspheric coefficients B, C, D and E. Here, the amount of asphericity is 105.5 μm at a maximum height of incidence of a ray on the surface r3.

The aspheric surface AS2 of the third lens subunit F13 is formed on the surface r16 to correct spherical aberration which occurs greatly on the telephoto side. The direction of asphericity of the aspheric surface AS2 is such a direction that a positive power becomes weaker as the distance from the optical axis becomes larger. In order to efficiently correct distortion and spherical aberration up to higher-order regions, the aspheric surface AS2 uses up to aspheric coefficients B, C, D and E. Here, the amount of asphericity is 260.4 μm at a maximum height of incidence of a ray on the surface r16. The aspheric surface shape of the aspheric surface AS2 also has the function of reducing distortion in the over-tendency at the zoom position $Z^{1/4}$ (Z being a variable magnification ratio of the zoom lens), and is more effective when formed on a lens surface in which a height of incidence of an on-axial light flux on the telephoto side is larger. Therefore, the aspheric surface AS2 is formed on the surface r16. Here, hw/ht=0.562.

FIGS. 8A to 8C through FIGS. 12A to 12C are graphs respectively showing spherical aberration, astigmatism and distortion at the various zoom positions in the zoom lens according to the numerical example 2.

A zoom lens according to the numerical example 3 shown in FIG. 13 has a zoom ratio of 27 and an angle of view 2ω at the wide-angle end exceeding 78°. Referring to FIG. 13, surfaces r1 to r19 define a front lens unit F. Surfaces r1 to r6 define a first lens subunit F11 stationary during focusing and having a negative power (refractive power). Surfaces r7 to r11 define a second lens subunit F12 having a focusing function and arranged to move toward the image side during focusing from an infinitely distant object to a minimum-distance object. Surfaces r12 to r19 define a third lens subunit F13 stationary during focusing and having a positive power. Surfaces r20 to r28 define a variator V arranged to move monotonously toward the image side during variation of magnification from the wide-angle end to the telephoto end. Surfaces r29 to r31 define a compensator C having the function of compensating for shift of an image plane due to the variation of magnification, having a negative power and arranged to move in such a way as to draw an arc convex toward the object side during the variation of magnification from the wide-angle end to the telephoto end. Reference character SP (r32) denotes a stop. Surfaces r33 to r47 define a relay lens unit R having an image forming function. Surfaces r48 to r50 define a glass block P equivalent to a color separation prism.

The zoom lens according to the numerical example 3 has such a wide angle of view as to have a power (refractive power) of β2w=−0.231, where β2w is a lateral magnification of the variator V at the wide-angle end.

To cope with the wide angle of view, in the front lens unit F, first, the first lens subunit F11, which has a great influence on the various aberrations on the wide-angle side because a height of incidence of an off-axial light flux becomes large on the wide-angle side, comprises three lenses, i.e., in order from the object side, negative, negative and positive lenses, and the negative lens located on the most object side has a meniscus shape having a strong concave surface facing the image side, thereby suppressing the occurrence of distortion in the front lens unit F.

Further, the inner focusing method in which the second lens subunit F12 is used as a focusing lens is employed, and the second lens subunit F12 comprises three lenses, i.e., positive, negative and positive lenses, thereby correcting well the variation of spherical aberration and chromatic aberration due to object distances, which would be difficult to correct in a high variable magnification zoom lens, and, at the same time, attaining the effect of reducing the size of the whole zoom lens and reducing focus-driving torque.

Further, the third lens subunit F13, which has a great influence on the various aberrations on the telephoto side because a height of incidence of an on-axial light flux becomes large on the telephoto side, comprises four lenses, i.e., in order from the object side, negative, positive, positive and positive lenses, and the negative lens of the third lens subunit F13 causes the divergence of spherical aberration to suppress the occurrence of spherical aberration in the front lens unit F.

The above-mentioned conditions (2), (3), (6) and (7) have such values that f11/f1=−1.092, f13/f1=1.155, Δν11n−Δν11p=30.1, and Δν13p−Δν13n=39.4.

In addition, the variator V comprises, in order from the object side, negative, positive, negative, positive and negative lenses. First, the negative lens located on the most object side has a meniscus shape having a strong concave surface facing the image side, thereby effectively correcting distortion at the wide-angle end.

A combination of the second, positive lens and the third, negative lens of the variator V is used to correct the variation of chromatic aberration and, in particular, lateral chromatic aberration itself. The reason for this is as follows. Since the variator V is composed of five lenses, thus increasing the thickness of the whole variator V, the nearer to the image side the position for achromatism as a variator is placed, the greater the shift of the position of a principal point with wavelengths of the variator, thus producing great lateral chromatic aberration. Therefore, as in the construction of the numerical example 3, the position for achromatism as a variator is made to exist on the object side, thereby correcting well lateral chromatic aberration.

Further, as a combination of the fourth, positive lens and the fifth, negative lens of the variator V, an appropriate difference in refractive index is set between the fourth lens and the fifth lens to correct coma on the telephoto side in particular. Since the positive lens and the negative lens have either one of a cemented form and a separate form, when the influence of higher-order aberrations is taken into consideration, if the difference in refractive index is small, the effect of divergence of coma occurring when the positive lens and the negative lens have a cemented form is remarkably lost.

In addition, the compensator C comprises two lenses, i.e., a negative lens and a positive lens, thereby causing divergence of spherical aberration and chromatic aberration at the boundary between the negative lens and the positive lens to suppress the occurrence of the various aberrations.

The aspheric surface AS1 of the first lens subunit F11 is formed on the surface r5, and is arranged to effectively utilize the fact that an off-axial light flux passes through the surface r5 only when zooming is in the vicinity of the wide-angle end in the entire variable magnification range, and the height of incidence of the off-axial light flux has a great difference from a height of incidence of an on-axial light flux on the telephoto side, and the fact that an off-axial light flux passes through the surface r5 only when zooming is in the vicinity of the wide-angle end in the entire variable magnification range, and the height of incidence of the off-axial light flux has a great difference from a height of incidence of an off-axial light flux of a maximum angle of view in the vicinity of the zoom position corresponding to $Z^{1/4}$ (Z being a variable magnification ratio of the zoom lens). Here, hw/ht=1.343, and hw/hz=1.057.

The direction of asphericity of the aspheric surface AS1 is such a direction that a positive power becomes stronger as the distance from the optical axis becomes larger. In order to efficiently correct distortion and spherical aberration up to higher-order regions, the aspheric surface AS1 uses up to aspheric coefficients B, C, D and E. Here, the amount of asphericity is −140.3 μm at a maximum height of incidence of a ray on the surface r5.

The aspheric surface AS2 of the third lens subunit F13 is formed on the surface r18, and is arranged to effectively utilize the fact that an on-axial light flux passes through the surface r18 only when zooming is in the vicinity of the telephoto end in the entire variable magnification range, and the height of incidence of the on-axial light flux has a great difference from a height of incidence of an off-axial light flux on the wide-angle side. Here, hw/ht=0.521.

The direction of asphericity of the aspheric surface AS2 is such a direction that a positive power becomes weaker as the distance from the optical axis becomes larger. In order to efficiently correct distortion and spherical aberration up to higher-order regions, the aspheric surface AS2 uses up to aspheric coefficients B, C, D and E. Here, the amount of asphericity is 501.8 μm at a maximum height of incidence of a ray on the surface r18.

FIGS. 14A to 14C through FIGS. 18A to 18C are graphs respectively showing spherical aberration, astigmatism and distortion at the various zoom positions in the zoom lens according to the numerical example 3.

A zoom lens according to the numerical example 4 shown in FIG. 19 has a zoom ratio of 27 and an angle of view 2ω at the wide-angle end exceeding 78°. Referring to FIG. 19, surfaces r1 to r19 define a front lens unit F. Surfaces r1 to r6 define a first lens subunit F11 stationary during focusing and having a negative power (refractive power). Surfaces r7 to r11 define a second lens subunit F12 having a focusing function and arranged to move toward the image side during focusing from an infinitely distant object to a minimum-distance object. Surfaces r12 to r19 define a third lens subunit F13 stationary during focusing and having a positive power. Surfaces r20 to r27 define a variator V arranged to move monotonously toward the image side during variation of magnification from the wide-angle end to the telephoto end. Surfaces r28 to r38 define a compensator C having the function of compensating for shift of an image plane due to the variation of magnification, having a positive power and arranged to move monotonously toward the object side during the variation of magnification from the wide-angle end to the telephoto end. Reference character SP (r39) denotes a stop. Surfaces r40 to r55 define a relay lens unit R having an image forming function. Surfaces r56 to r58 define a glass block P equivalent to a color separation prism.

The zoom lens according to the numerical example 4 has such a wide angle of view as to have a power (refractive power) of β2w=−0.206, where β2w is a lateral magnification of the variator V at the wide-angle end.

To cope with the wide angle of view, in the front lens unit F, first, the first lens subunit F11, which has a great influence on the various aberrations on the wide-angle side because a height of incidence of an off-axial light flux becomes large on the wide-angle side, comprises three lenses, i.e., in order from the object side, negative, negative and positive lenses, and the negative lens located on the most object side has a meniscus shape or a plano-concave shape having a strong concave surface facing the image side, thereby suppressing the occurrence of distortion in the front lens unit F.

Further, the inner focusing method in which the second lens subunit F12 is used as a focusing lens is employed, and the second lens subunit F12 comprises three lenses, i.e., positive, negative and positive lenses, thereby correcting well the variation of spherical aberration and chromatic aberration due to object distances, which would be difficult to correct in a high variable magnification zoom lens, and, at the same time, attaining the effect of reducing the size of the whole zoom lens and reducing focus-driving torque.

Further, the third lens subunit F13, which has a great influence on the various aberrations on the telephoto side because a height of incidence of an on-axial-light flux becomes large on the telephoto side, comprises four lenses, i.e., in order from the object side, positive, negative, positive and positive lenses, and the negative lens of the third lens subunit F13 causes the divergence of spherical aberration to suppress the occurrence of spherical aberration in the front lens unit F.

The above-mentioned conditions (2), (3), (6) and (7) have such values that f11/f1=−1.029, f13/f1=1.231, Δv11n−Δv11p=30.1, and Δv13p−Δv13n=41.49.

In addition, the variator V comprises, in order from the object side, negative, negative, positive, negative and negative lenses. First, the negative lens located on the most object side has a meniscus shape having a strong concave surface facing the image side, thereby effectively correcting distortion at the wide-angle end.

A combination of the second, negative lens and the third, positive lens of the variator V is used to correct the variation of chromatic aberration and, in particular, lateral chromatic aberration itself. The reason for this is as follows. Since the variator V is composed of five lenses, thus increasing the thickness of the whole variator V, the nearer to the image side the position for achromatism as a variator is placed, the greater the shift of the position of a principal point with wavelengths of the variator, thus producing great lateral chromatic aberration. Therefore, as in the construction of the numerical example 4, the position for achromatism as a variator is made to exist on the object side, thereby correcting well lateral chromatic aberration.

Further, a combination of the fourth, negative lens and the fifth, negative lens of the variator V is used to suppress the occurrence of spherical aberration at the wide-angle end.

In the compensator C, since, in the case of such a power arrangement as shown in the numerical example 4 in which the third lens unit has a positive refractive power, a height of incidence of an on-axial light flux in the third lens unit becomes large, it becomes difficult to correct aberrations. Therefore, the compensator C is made to have a symmetrical lens arrangement having positive, positive, negative, negative, positive and positive lenses, so as to set a plurality of positions for canceling aberrations with the positive lens and the negative lens, thereby causing a divergence in spherical aberration, coma and chromatic aberration to suppress the occurrence of the various aberrations.

The aspheric surface AS1 of the first lens subunit F11 is formed on the surface r1, and is arranged to effectively utilize the fact that an off-axial light flux passes through the surface r1 only when zooming is in the vicinity of the wide-angle end in the entire variable magnification range, and the height of incidence of the off-axial light flux has a great difference from a height of incidence of an on-axial light flux on the telephoto side, and the fact that an off-axial light flux passes through the surface r1 only when zooming is in the vicinity of the wide-angle end in the entire variable magnification range, and the height of incidence of the off-axial light flux has a great difference from a height of incidence of an off-axial light flux of a maximum angle of view in the vicinity of the zoom position corresponding to $Z^{1/4}$ (Z being a variable magnification ratio of the zoom lens). Here, hw/ht=2.169, and hw/hz=1.384.

The direction of asphericity of the aspheric surface AS1 is such a direction that a positive power becomes stronger as the distance from the optical axis becomes larger. In order to efficiently correct distortion and spherical aberration up to higher-order regions, the aspheric surface AS1 uses up to aspheric coefficients B, C, D and E. Here, the amount of asphericity is −1323.8 μm at a maximum height of incidence of a ray on the surface r1.

The aspheric surface AS2 of the third lens subunit F13 is formed on the surface r18, and is arranged to effectively utilize the fact that an on-axial light flux passes through the surface r18 only when zooming is in the vicinity of the telephoto end in the entire variable magnification range, and the height of incidence of the on-axial light flux has a great difference from a height of incidence of an off-axial light flux on the wide-angle side. Here, hw/ht=0.504.

The direction of asphericity of the aspheric surface AS2 is such a direction that a positive power becomes weaker as the distance from the optical axis becomes larger. In order to efficiently correct distortion and spherical aberration up to higher-order regions, the aspheric surface AS2 uses up to aspheric coefficients B, C, D and E. Here, the amount of asphericity is 277.4 μm at a maximum height of incidence of a ray on the surface r18.

FIGS. 20A to 20C through FIGS. 24A to 24C are graphs respectively showing spherical aberration, astigmatism and distortion at the various zoom positions in the zoom lens according to the numerical example 4.

Next, numerical data of the numerical examples 1 to 4 are shown. In the numerical data of the numerical examples 1 to 4, r1 is the radius of curvature of the i-th lens surface, when counted from the object side, di is the i-th lens thickness or air separation, when counted from the object side, and ni and vi are respectively the refractive index and Abbe number of the glass of the i-th lens, when counted from the object side, with respect to d-line. The last three lens surfaces constitute a glass block, such as a face plate or a filter.

The shape of an aspheric surface is expressed in the coordinates with an X axis in the optical axis direction and a Y axis in the direction perpendicular to the optical axis, th direction in which light advances being taken as positive, by the following equation:

$$X = \frac{(1/R)H^2}{1+\sqrt{1-(1+K)(H/R)^2}} + BH^4 + CH^6 + DH^8 + EH^{10}$$

where R is the radius of osculating sphere, and K, B, C, D and E are aspheric coefficients.

Further, for example, the indication of "D-0X" means "$10^{-X}$".

NUMERICAL EXAMPLE 1

| f = 5.0–50 | | Fno = 1.8–2.4 | | 2ω = 95.5°–12.6° | |
|---|---|---|---|---|---|
| *r1 = 223.120 | d1 = 2.50 | n1 = 1.77621 | v1 = 49.6 |
| r2 = 32.721 | d2 = 17.51 | | |
| r3 = 307.019 | d3 = 2.00 | n2 = 1.64254 | v2 = 60.1 |
| r4 = 58.637 | d4 = 12.14 | | |
| r5 = −117.978 | d5 = 2.00 | n3 = 1.73234 | v3 = 54.7 |
| r6 = 323.264 | d6 = 0.20 | | |
| r7 = 99.804 | d7 = 10.60 | n4 = 1.81265 | v4 = 25.4 |
| r8 = −99.471 | d8 = 1.23 | | |
| r9 = 764.850 | d9 = 5.85 | n5 = 1.60520 | v5 = 65.4 |
| r10 = −107.956 | d10 = 10.03 | | |
| r11 = −183.296 | d11 = 2.00 | n6 = 1.81265 | v6 = 25.4 |
| r12 = 44.268 | d12 = 11.85 | n7 = 1.49845 | v7 = 81.5 |
| r13 = −129.536 | d13 = 0.20 | | |
| *r14 = 56.193 | d14 = 12.23 | n8 = 1.60520 | v8 = 65.4 |
| r15 = −74.942 | d15 = 0.20 | | |
| r16 = 76.096 | d16 = 3.28 | n9 = 1.73234 | v9 = 54.7 |
| r17 = 153.907 | d17 = Variable | | |
| r18 = 47.543 | d18 = 0.80 | n10 = 1.82017 | v10 = 46.6 |
| r19 = 14.298 | d19 = 5.08 | | |
| r20 = −111.590 | d20 = 4.16 | n11 = 1.79191 | v11 = 25.7 |
| r21 = −15.301 | d21 = 0.80 | n12 = 1.77621 | v12 = 49.6 |
| r22 = 34.402 | d22 = 2.36 | | |
| r23 = 22.669 | d23 = 2.82 | n13 = 1.53430 | v13 = 48.9 |
| r24 = 82.604 | d24 = 3.67 | | |
| r25 = −19.565 | d25 = 0.80 | n14 = 1.77621 | v14 = 49.6 |
| r26 = −24.777 | d26 = Variable | | |
| r27 = −29.054 | d27 = 0.80 | n15 = 1.77621 | v15 = 49.6 |
| r28 = 83.998 | d28 = 2.24 | n16 = 1.85501 | v16 = 23.9 |
| r29 = −154.668 | d29 = Variable | | |
| r30 = Stop | d30 = 1.20 | | |
| r31 = 708.694 | d31 = 3.78 | n17 = 1.51825 | v17 = 64.2 |
| r32 = −41.225 | d32 = 0.15 | | |
| r33 = 105.514 | d33 = 3.29 | n18 = 1.50349 | v18 = 56.4 |
| r34 = −85.642 | d34 = 0.15 | | |
| r35 = 47.793 | d35 = 6.28 | n19 = 1.52032 | v19 = 59.0 |
| r36 = −37.452 | d36 = 1.20 | n20 = 1.82017 | v20 = 46.6 |
| r37 = −8111.628 | d37 = 30.00 | | |
| r38 = −198.821 | d38 = 2.87 | n21 = 1.48915 | v21 = 70.2 |
| r39 = −49.349 | d39 = 0.15 | | |
| r40 = 309.211 | d40 = 1.20 | n22 = 1.88814 | v22 = 40.8 |
| r41 = 17.322 | d41 = 6.85 | n23 = 1.51825 | v23 = 64.2 |
| r42 = −97.664 | d42 = 0.15 | | |
| r43 = 45.885 | d43 = 7.13 | n24 = 1.50349 | v24 = 56.4 |
| r44 = −20.309 | d44 = 1.20 | n25 = 1.88815 | v25 = 40.8 |
| r45 = −1089.825 | d45 = 0.15 | | |
| r46 = 76.488 | d46 = 5.92 | n26 = 1.66152 | v26 = 50.9 |
| r47 = −26.585 | d47 = 5.00 | | |
| r48 = ∞ | d48 = 30.00 | n27 = 1.60718 | v27 = 38.0 |
| r49 = ∞ | d49 = 16.20 | n28 = 1.51825 | v28 = 64.1 |
| r50 = ∞ | | | |

*Aspheric Surface

| Variable | Focal Length | | | | |
|---|---|---|---|---|---|
| Separation | 5.00 | 8.89 | 12.50 | 37.50 | 50.00 |
| d17 | 1.41 | 15.83 | 22.34 | 36.08 | 38.12 |
| d26 | 35.15 | 18.02 | 10.54 | 2.22 | 4.60 |
| d29 | 6.50 | 9.21 | 10.18 | 4.77 | 0.34 |

<Aspheric Surfaces in Numerical Example 1>
r1 (aspheric surface AS1):
Reference spherical surface R=223.120
Aspheric Coefficients:
K=6.889D−1
B=1.048D−6
C=−2.443D−10
D=2.587D−14
E=1.308D−17

Amount of Asphericity

| r1 | h | Δ |
|---|---|---|
| 70 percent | 27.379 mm | −501.4 μm |
| 90 percent | 35.202 mm | −1255.1 μm |
| 100 percent | 39.113 mm | −1847.0 μm |

Condition for Introducing Aspheric Surface AS1

| hw/ht = 3.796 | hw/hz = 1.413 |
|---|---| r14 (aspheric surface AS2):
Reference spherical surface R=56.193
Aspheric Coefficients:
   K=−7.162D−1
   B=−6.679D−7
   C=−7.682D−11
   D=1.592D−14
   E=1.974D−17
Amount of Asphericity

| r14 | h | Δ |
|---|---|---|
| 70 percent | 18.422 mm | 142.1 μm |
| 90 percent | 23.686 mm | 400.4 μm |
| 100 percent | 26.318 mm | 621.1 μm |

Condition for Introducing Aspheric Surface AS2
  hw/ht=0.743

<Zoom Parameters of Numerical Example 1>
β2w=−0.392
f11/f1=−2.302
f13/f1=2.009
Δv11n−Δv11p=29.35
Δv13p−Δv13n=41.79

NUMERICAL EXAMPLE 2 f = 5.5–66   Fno = 1.8–2.5   2ω = 90.0°–9.5°

| r1 = | 91.876 | d1 = | 2.50 | n1 = 1.77621 | v1 = 49.6 |
|---|---|---|---|---|---|
| r2 = | 33.943 | d2 = | 18.53 | | |
| *r3 = | 584.679 | d3 = | 2.00 | n2 = 1.69979 | v2 = 55.5 |
| r4 = | 67.875 | d4 = | 12.46 | | |
| r5 = | −96.690 | d5 = | 2.00 | n3 = 1.69979 | v3 = 55.5 |
| r6 = | 504.325 | d6 = | 0.20 | | |
| r7 = | 109.371 | d7 = | 9.23 | n4 = 1.81265 | v4 = 25.4 |
| r8 = | −136.733 | d8 = | 1.30 | | |
| r9 = | −269.671 | d9 = | 6.10 | n5 = 1.60520 | v5 = 65.5 |
| r10 = | −74.735 | d10 = | 10.04 | | |
| r11 = | −517.527 | d11 = | 2.00 | n6 = 1.81264 | v6 = 25.4 |
| r12 = | 45.318 | d12 = | 12.28 | n7 = 1.49845 | v7 = 81.6 |
| r13 = | −262.145 | d13 = | 0.20 | | |
| r14 = | 75.948 | d14 = | 13.75 | n8 = 1.60520 | v8 = 65.5 |
| r15 = | −78.680 | d15 = | 0.20 | | |
| *r16 = | 48.832 | d16 = | 5.53 | n9 = 1.73234 | v9 = 54.7 |
| r17 = | 103.688 | d17 = | Variable | | |
| r18 = | 42.494 | d18 = | 0.80 | n10 = 1.82017 | v10 = 46.6 |
| r19 = | 14.244 | d19 = | 5.67 | | |
| r20 = | −58.701 | d20 = | 0.42 | n11 = 1.82017 | v11 = 46.6 |
| r21 = | 37.313 | d21 = | 2.32 | | |

-continued f = 5.5–66   Fno = 1.8–2.5   2ω = 90.0°–9.5°

| r22 = | 23.674 | d22 = | 4.77 | n12 = 1.79191 | v12 = 25.7 |
|---|---|---|---|---|---|
| r23 = | −41.197 | d23 = | 1.66 | | |
| r24 = | −26.631 | d24 = | 0.80 | n13 = 1.88815 | v13 = 40.8 |
| r25 = | 87.169 | d25 = | Variable | | |
| r26 = | −28.247 | d26 = | 0.80 | n14 = 1.77621 | v14 = 49.6 |
| r27 = | 61.761 | d27 = | 2.45 | n15 = 1.85501 | v15 = 23.9 |
| r28 = | −225.728 | d28 = | Variable | | |
| r29 = | Stop | d29 = | 1.20 | | |
| r30 = | −420.863 | d30 = | 4.50 | n16 = 1.50014 | v16 = 65.0 |
| r31 = | −33.924 | d31 = | 0.15 | | |
| r32 = | 98.762 | d32 = | 4.29 | n17 = 1.50349 | v17 = 56.4 |
| r33 = | −65.890 | d33 = | 0.15 | | |
| r34 = | 43.142 | d34 = | 7.95 | n18 = 1.48915 | v18 = 70.2 |
| r35 = | −34.445 | d35 = | 1.20 | n19 = 1.82017 | v19 = 46.6 |
| r36 = | −2702.937 | d36 = | 30.00 | | |
| r37 = | −94.554 | d37 = | 3.67 | n29 = 1.51977 | v20 = 52.4 |
| r38 = | −32.736 | d38 = | 0.15 | | |
| r39 = | −384.779 | d39 = | 1.20 | n21 = 1.88814 | v21 = 40.8 |
| r40 = | 19.792 | d40 = | 7.27 | n22 = 1.51825 | v22 = 64.2 |
| r41 = | −77.624 | d41 = | 0.15 | | |
| r42 = | 165.407 | d42 = | 5.66 | n23 = 1.50349 | v23 = 56.4 |
| r43 = | −26.268 | d43 = | 1.20 | n24 = 1.83932 | v24 = 37.2 |
| r44 = | −133.998 | d44 = | 0.15 | | |
| r45 = | 37.833 | d45 = | 6.13 | n25 = 1.51977 | v25 = 52.4 |
| r46 = | −44.043 | d46 = | 5.00 | | |
| r47 = | ∞ | d47 = | 30.00 | n26 = 1.60718 | v26 = 38.0 |
| r48 = | ∞ | d48 = | 16.20 | n27 = 1.51825 | v27 = 64.1 |

*Aspheric Surface

| Variable | Focal Length | | | | |
|---|---|---|---|---|---|
| Separation | 5.50 | 10.24 | 22.00 | 46.75 | 66.00 |
| d17 | 0.41 | 15.85 | 28.63 | 36.56 | 38.87 |
| d25 | 40.89 | 22.54 | 8.19 | 4.64 | 7.07 |
| d28 | 6.00 | 8.91 | 10.47 | 6.10 | 1.35 |

<Aspheric Surfaces in Numerical Example 2> r3 (aspheric surface AS1):
Reference spherical surface R=584.679
Aspheric Coefficients:
   K=−2.102D−12
   B=5.030D−7
   C=−4.170D−10
   D=−7.887D−14
   E=8902D−17

Amount of Asphericity

| r3 | h | Δ |
|---|---|---|
| 70 percent | 20.546 mm | −35.5 μm |
| 90 percent | 26.416 mm | −99.3 μm |
| 100 percent | 29.352 mm | −105.5 μm |

Condition for Introducing Aspheric Surface AS1

| hw/ht = 1.784 | hw/hz = 1.198 |
|---|---| r16 (aspheric surface AS2):
Reference spherical surface R=48.832
Aspheric Coefficients:
  K=−1.015D−1
  B=−1.798D−7
  C=−2.105D−10
  D=1.882D−13
  E=−3.180D−16
Amount of Asphericity

| r16 | h | Δ |
|---|---|---|
| 70 percent | 18.771 mm | 46.1 μm |
| 90 percent | 24.134 mm | 150.2 μm |
| 100 percent | 26.816 mm | 260.4 μm |

Condition for Introducing Aspheric Surface AS2
  hw/ht=0.562
<Zoom Parameters of Numerical Example 2>
  β2w=−0.342
  f11/f1=−1.995
  f13/f1=1.743
  Δv11n−Δv11p=28.12
  Δv13p−Δv13n=41.83

NUMERICAL EXAMPLE 3

| f = 6.7–180.9 | Fno = 1.5–2.1 | 2ω = 78.8°–3.5° | | |
|---|---|---|---|---|
| r1 = 663.281 | d1 = 4.70 | n1 = 1.69979 | v1 = 55.5 |
| r2 = 109.780 | d2 = 43.84 | | |
| r3 = −240.845 | d3 = 4.50 | n2 = 1.69979 | v2 = 55.5 |
| r4 = 394.227 | d4 = 0.15 | | |
| *r5 = 222.519 | d5 = 14.73 | n3 = 1.81265 | v3 = 25.4 |
| r6 = 1224.516 | d6 = 4.77 | | |
| r7 = 78734.617 | d7 = 15.19 | n4 = 1.62286 | v4 = 60.3 |
| r8 = −245.508 | d8 = 0.20 | | |
| r9 = −798.729 | d9 = 4.40 | n5 = 1.81265 | v5 = 25.4 |
| r10 = 814.478 | d10 = 14.62 | n6 = 1.48915 | v6 = 70.2 |
| r11 = −380.518 | d11 = 31.80 | | |
| r12 = 319.862 | d12 = 4.40 | n7 = 1.76168 | v7 = 27.5 |
| r13 = 136.167 | d13 = 0.08 | | |
| r14 = 136.502 | d14 = 27.95 | n8 = 1.48915 | v8 = 70.2 |
| r15 = −829.173 | d15 = 0.15 | | |
| r16 = 187.100 | d16 = 26.39 | n9 = 1.48915 | v9 = 70.2 |
| r17 = −340.012 | d17 = 0.15 | | |
| *r18 = 149.728 | d18 = 11.31 | n10 = 1.62286 | v10 = 60.3 |
| r19 = 309.436 | d19 = Variable | | |
| r20 = 55.817 | d20 = 1.90 | n11 = 1.88815 | v11 = 40.8 |
| r21 = 23.976 | d21 = 13.49 | | |
| r22 = −125.074 | d22 = 9.67 | n12 = 1.76859 | v12 = 26.5 |
| r23 = −27.416 | d23 = 1.90 | n13 = 1.73234 | v13 = 54.7 |
| r24 = 110.574 | d24 = 0.15 | | |
| r25 = 38.814 | d25 = 6.83 | n14 = 1.53430 | v14 = 48.9 |
| r26 = 146.457 | d26 = 2.84 | | |
| r27 = −283.651 | d27 = 1.90 | n15 = 1.88815 | v15 = 40.8 |
| r28 = 527.127 | d28 = Variable | | |
| r29 = −56.338 | d29 = 1.60 | n16 = 1.76076 | v16 = 47.8 |
| r30 = 66.745 | d30 = 3.51 | n17 = 1.85501 | v17 = 23.9 |
| r31 = 1701.093 | d31 = Variable | | |
| r32 = Stop | d32 = 1.50 | | |
| r33 = 2349.341 | d33 = 5.29 | n18 = 1.64268 | v18 = 44.9 |
| r34 = −83.560 | d34 = 0.20 | | |
| r35 = 79.207 | d35 = 11.74 | n19 = 1.48915 | v19 = 70.2 |
| r36 = −47.057 | d36 = 1.70 | n20 = 1.79012 | v20 = 44.2 |
| r37 = −239.977 | d37 = 48.61 | | |
| r38 = 102.005 | d38 = 10.13 | n21 = 1.50349 | v21 = 56.4 |
| r39 = −78.848 | d39 = 0.20 | | |
| r40 = 76.250 | d40 = 10.37 | n22 = 1.49845 | v22 = 81.5 |
| r41 = −69.301 | d41 = 1.80 | n23 = 1.73234 | v23 = 54.7 |
| r42 = −908.892 | d42 = 0.20 | | |
| r43 = 60.797 | d43 = 8.66 | n24 = 1.50349 | v24 = 56.4 |
| *r44 = 73.962 | d44 = 1.0 | n25 = 1.69417 | v25 = 31.1 |
| r45 = 28.331 | d45 = 3.92 | | |
| r46 = 29.192 | d46 = 7.02 | n26 = 1.67340 | v26 = 47.2 |
| r47 = 117.991 | d47 = 5.00 | | |
| r48 = ∞ | d48 = 30.00 | n27 = 1.60718 | v27 = 38.0 |
| r49 = ∞ | d49 = 17.40 | n28 = 1.51825 | v28 = 64.2 |
| r50 = ∞ | | | |

*Aspheric Surface

| Variable Separation | Focal Length | | | | |
|---|---|---|---|---|---|
| | 6.70 | 15.27 | 33.50 | 107.20 | 180.90 |
| d19 | 4.44 | 68.81 | 108.06 | 141.58 | 149.42 |
| d28 | 147.15 | 76.53 | 32.76 | 6.65 | 12.72 |
| d31 | 12.00 | 18.24 | 22.77 | 15.36 | 1.45 |

<Aspheric Surfaces in Numerical Example 3> r5 (aspheric surface AS1):
Reference spherical surface R=222.519
Aspheric Coefficients:
  K=4.875D−1
  B=8.957D−9
  C=−1.420D−12
  D=−1.536D−16
  E=1.100D−20

Amount of Asphericity

| r5 | h | Δ |
|---|---|---|
| 70 percent | 53.268 mm | −79.7 μm |
| 90 percent | 68.488 mm | −139.0 μm |
| 100 percent | 76.098 mm | −140.3 μm |

Condition for Introducing Aspheric Surface AS1

| hw/ht = 1.343 | hw/hz = 1.057 |
|---|---| r18 (aspheric surface AS2):
Reference spherical surface R=149.728
Aspheric Coefficients:
  K=−4.057D−1
  B=−1.198D−9
  C=−6.386D−13

D=3.312D−17
E=−1.132D−20

Amount of Asphericity

| r18 | h | Δ |
|---|---|---|
| 70 percent | 47.971 mm | 101.0 μm |
| 90 percent | 61.677 mm | 307.2 μm |
| 100 percent | 68.531 mm | 501.8 μm |

Condition for Introducing Aspheric Surface AS2 hw/ht=0.521

<Zoom Parameters of Numerical Example 3>

β2w=−0.231
f11/f1=−1.092
f13/f1=1.155
Δν11n−Δν11p=30.1
Δν13p−Δν13n=39.4

NUMERICAL EXAMPLE 4

| f = 6.7–180.9 | | Fno = 1.5–2.1 | | 2ω = 78.8°–3.5° | |
|---|---|---|---|---|---|
| *r1 = 17634.271 | d1 = 4.70 | n1 = 1.69979 | ν1 = 55.5 |
| r2 = 109.899 | d2 = 46.92 | | |
| r3 = −201.325 | d3 = 4.50 | n2 = 1.69979 | ν2 = 55.5 |
| r4 = 1829.577 | d4 = 0.15 | | |
| r5 = 283.523 | d5 = 12.64 | n3 = 1.81265 | ν3 = 25.4 |
| r6 = 2167.464 | d6 = 5.15 | | |
| r7 = −2805.896 | d7 = 18.49 | n4 = 1.48915 | ν4 = 70.2 |
| r8 = −196.467 | d8 = 0.20 | | |
| r9 = −1000.469 | d9 = 4.40 | n5 = 1.81265 | ν5 = 25.4 |
| r10 = 603.998 | d10 = 16.55 | n6 = 1.48915 | ν6 = 70.2 |
| r11 = −307.782 | d11 = 32.56 | | |
| r12 = 315.156 | d12 = 17.48 | n7 = 1.48915 | ν7 = 70.2 |
| r13 = −596.320 | d13 = 0.15 | | |
| r14 = 191.137 | d14 = 4.40 | n8 = 1.81265 | ν8 = 25.4 |
| r15 = 118.065 | d15 = 0.39 | | |
| r16 = 119.291 | d16 = 35.44 | n9 = 1.48915 | ν9 = 70.2 |
| r17 = −534.926 | d17 = 0.15 | | |
| *r18 = 200.940 | d18 = 12.13 | n10 = 1.62286 | ν10 = 60.3 |
| r19 = 826.607 | d19 = Variable | | |
| r20 = 129.425 | d20 = 1.50 | n11 = 1.88815 | ν11 = 40.8 |
| r21 = 64.710 | d21 = 6.90 | | |
| r22 = −200.692 | d22 = 1.50 | n12 = 1.73234 | ν12 = 54.7 |
| r23 = 41.776 | d23 = 10.46 | n13 = 1.85501 | ν13 = 23.9 |
| r24 = −106.134 | d24 = 1.50 | n14 = 1.73234 | ν14 = 54.7 |
| r25 = 86.715 | d25 = 6.25 | | |
| r26 = −81.264 | d26 = 1.50 | n15 = 1.88815 | ν15 = 40.8 |
| r27 = 227.627 | d27 = Variable | | |
| r28 = 600.754 | d28 = 6.75 | n16 = 1.62286 | ν16 = 60.3 |
| r29 = −114.148 | d29 = 0.15 | | |
| r30 = 117.668 | d30 = 11.71 | n17 = 1.48915 | ν17 = 70.2 |
| r31 = −75.558 | d31 = 0.09 | | |
| r32 = −76.874 | d32 = 1.60 | n18 = 1.81265 | ν18 = 25.4 |
| r33 = −134.820 | d33 = 0.15 | | |
| r34 = 86.226 | d34 = 1.60 | n19 = 1.81265 | ν19 = 25.4 |
| r35 = 48.805 | d35 = 10.30 | n20 = 1.48915 | ν20 = 70.2 |
| r36 = 2324.271 | d36 = 0.15 | | |
| r37 = 94.551 | d37 = 6.65 | n21 = 1.62286 | ν21 = 60.3 |
| r38 = −6865.358 | d38 = Variable | | |
| r39 = Stop | d39 = 3.42 | | |
| r40 = −55.489 | d40 = 1.50 | n22 = 1.77621 | ν22 = 49.6 |
| r41 = 33.640 | d41 = 6.93 | n23 = 1.79191 | ν23 = 25.7 |
| r42 = −62.728 | d42 = 1.50 | n24 = 1.77621 | ν24 = 49.6 |
| r43 = 53.743 | d43 = 9.81 | | |
| r44 = −38.051 | d44 = 18.63 | n25 = 1.77621 | ν25 = 49.6 |
| r45 = −40.615 | d45 = 19.15 | | |
| r46 = 445.076 | d46 = 4.78 | n26 = 1.62286 | ν26 = 60.3 |
| r47 = −81.461 | d47 = 0.20 | | |
| r48 = 141.066 | d48 = 1.50 | n27 = 1.88815 | ν27 = 40.5 |

-continued

| f = 6.7–180.9 | | Fno = 1.5–2.1 | | 2ω = 78.8°–3.5° | |
|---|---|---|---|---|---|
| r49 = 34.989 | d49 = 7.73 | n28 = 1.49915 | ν28 = 70.2 |
| r50 = −209.124 | d50 = 0.20 | | |
| r51 = 131.584 | d51 = 5.17 | n29 = 1.48915 | ν29 = 70.2 |
| r52 = −34.076 | d52 = 1.50 | n30 = 1.83932 | ν30 = 37.2 |
| r53 = −129.004 | d53 = 0.20 | | |
| r54 = 116.338 | d54 = 6.65 | n31 = 1.45915 | ν31 = 70.2 |
| r55 = −47.356 | d55 = 5.00 | | |
| r56 = ∞ | d56 = 30.00 | n32 = 1.60718 | ν32 = 38.0 |
| r57 = ∞ | d57 = 17.40 | n33 = 1.51825 | ν33 = 64.2 |

*Aspheric Surface

| Variable | Focal Length | | | | |
|---|---|---|---|---|---|
| Separation | 6.70 | 15.27 | 28.66 | 67.55 | 180.90 |
| d19 | 3.93 | 56.60 | 83.93 | 108.93 | 126.22 |
| d27 | 173.49 | 114.42 | 80.44 | 43.01 | 4.46 |
| d38 | 1.30 | 7.70 | 14.35 | 26.78 | 48.04 |

<Aspheric Surfaces in Numerical Example 4> r1 (aspheric surface AS1):

Reference spherical surface R=17634.271

Aspheric Coefficients:

K=1.685D+4

B=2.648D−8

C=−1.476D−12

D=8.970D−17

E=−3.307D−21

Amount of Asphericity

| r1 | h | Δ |
|---|---|---|
| 70 percent | 63.962 mm | −370.7 μm |
| 90 percent | 82.237 mm | −917.1 μm |
| 100 percent | 91.375 mm | −1323.8 μm |

Condition for Introducing Aspheric Surface AS1

| hw/ht = 2.169 | hw/hz = 1.384 |
|---|---| r18 (aspheric surface AS2):

Reference spherical surface R=200.940

Aspheric Coefficients:

K=−1.446D−1

B=−7.463D−9

C=−2.043D−13

D=1.709D−17
E=−3.753D−21
Amount of Asphericity

| r18 | h | Δ |
|---|---|---|
| 70 percent | 49.555 mm | 62.0 μm |
| 90 percent | 63.714 mm | 176.6 μm |
| 100 percent | 70.794 mm | 277.4 μm |

Condition for Introducing Aspheric Surface AS2
hw/ht=0.504
<Zoom Parameters of Numerical Example 4>
β2w=−206
f11/f1=−1.029
f13/f1=1.231
Δv11n−Δv11p=30.1
Δv13p−Δv13n=41.49

Next, other embodiments of the invention particularly adapted for the employment of the inner focusing method in which focusing is effected by moving a lens subunit that is a part of the first lens unit of a four-unit zoom lens will be described.

Figure 29:
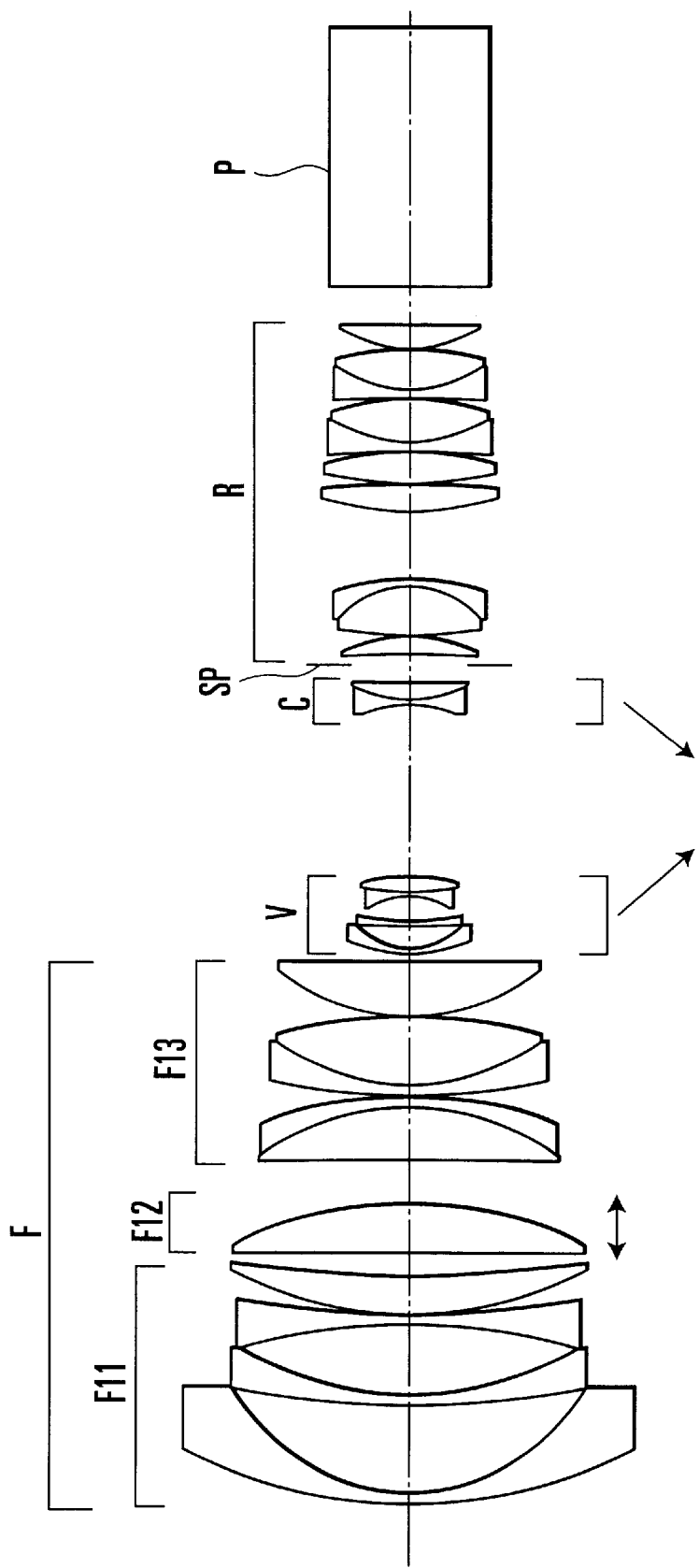
FIG. 29 is a lens sectional view showing a zoom lens in the wide-angle end according to a numerical example 5 of the invention.
Figure 30A:
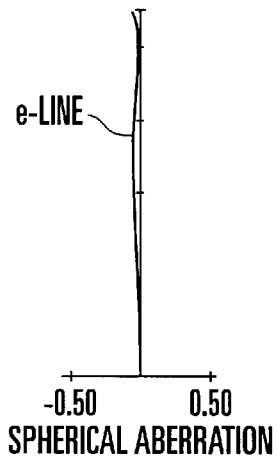
FIGS. 30A, 30B and 30C are aberration diagrams showing the various aberrations of the zoom lens when the focal length f is 5.72 mm during focusing on an infinitely distant object according to the numerical example 5 of the invention.
Figure 30B:
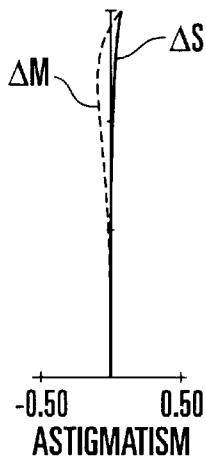
Figure 30C:
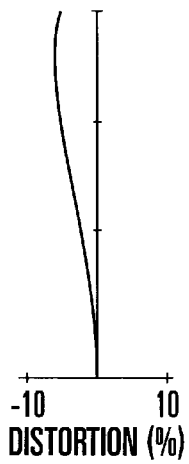
Figure 31A:
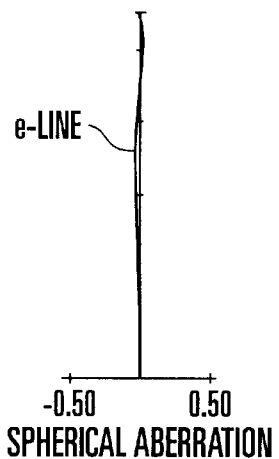
FIGS. 31A, 31B and 31C are aberration diagrams showing the various aberrations of the zoom lens when the focal length f is 22.88 mm during focusing on an infinitely distant object according to the numerical example 5 of the invention.
Figure 31B:
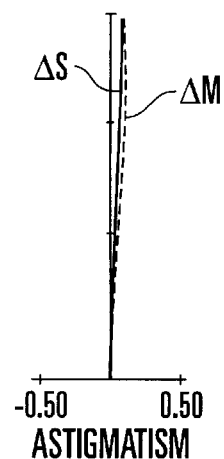
Figure 31C:
Figure 32A:
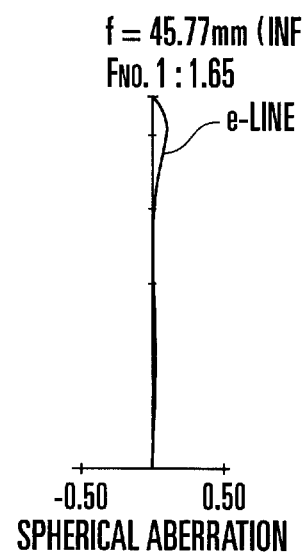
FIGS. 32A, 32B and 32C are aberration diagrams showing the various aberrations of the zoom lens when the focal length f is 45.77 mm during focusing on an infinitely distant object according to the numerical example 5 of the invention.
Figure 32B:
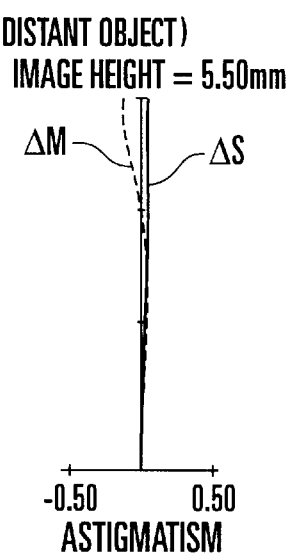
Figure 32C:
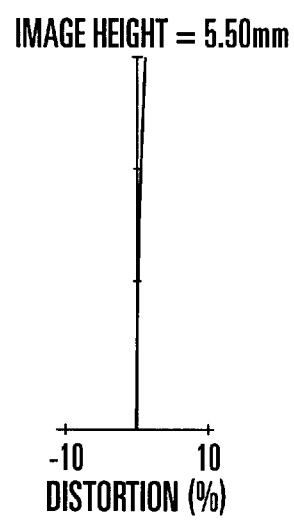
Figure 33A:
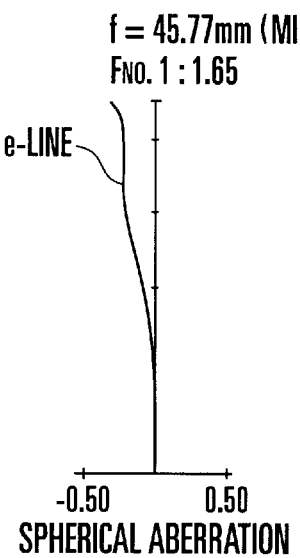
FIGS. 33A, 33B and 33C are aberration diagrams showing the various aberrations of the zoom lens when the focal length f is 45.77 mm during focusing on a minimum-distance object according to the numerical example 5 of the invention.
Figure 33B:
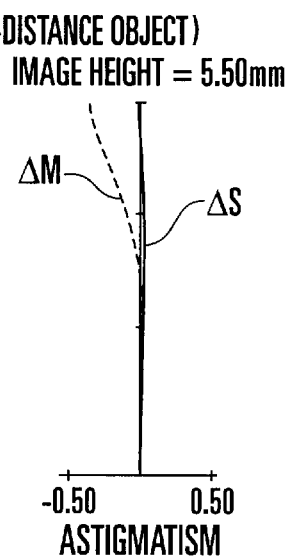
Figure 33C:
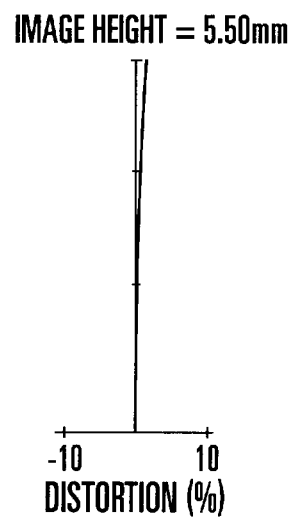
Figure 34:
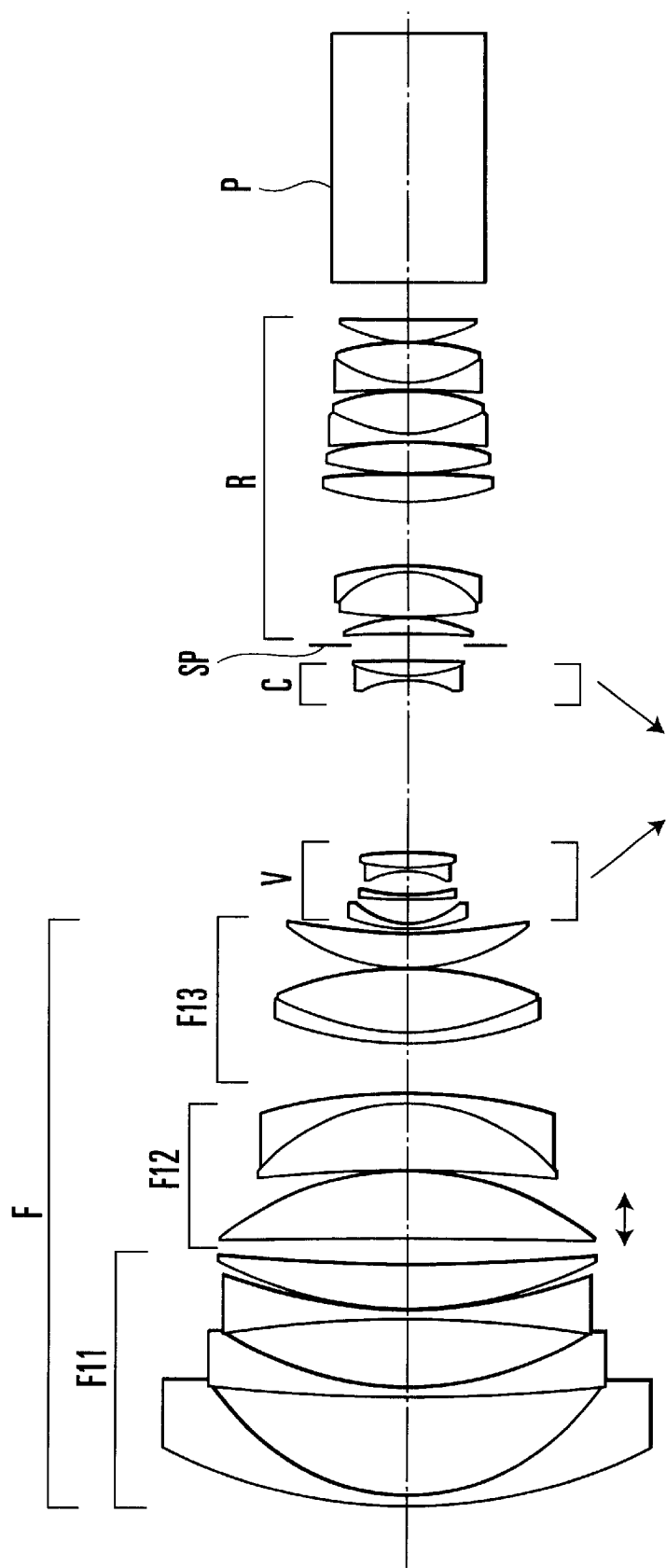
FIG. 34 is a lens sectional view showing a zoom lens in the wide-angle end according to a numerical example 6 of the invention.
Figure 35A:
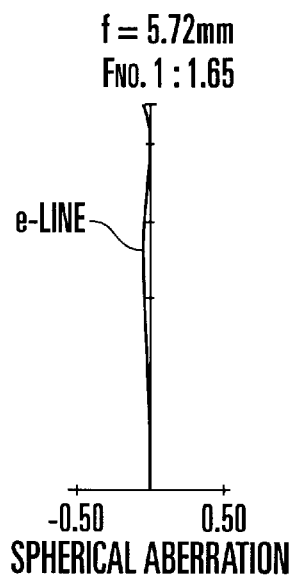
FIGS. 35A, 35B and 35C are aberration diagrams showing the various aberrations of the zoom lens when the focal length f is 5.72 mm during focusing on an infinitely distant object according to the numerical example 6 of the invention.
Figure 35B:
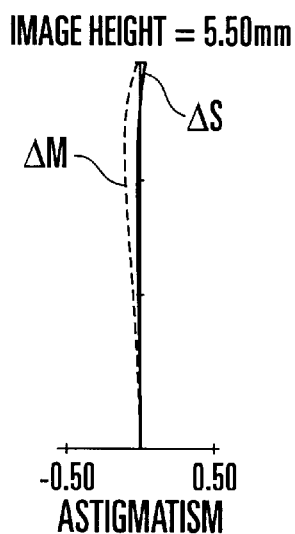
Figure 35C:
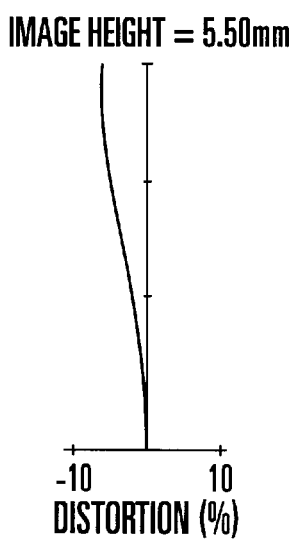
Figure 36A:
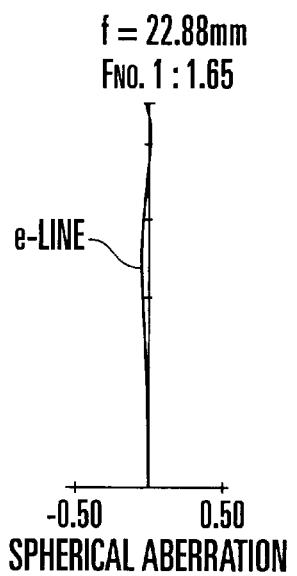
FIGS. 36A, 36B and 36C are aberration diagrams showing the various aberrations of the zoom lens when the focal length f is 22.88 mm during focusing on an infinitely distant object according to the numerical example 6 of the invention.
Figure 36B:
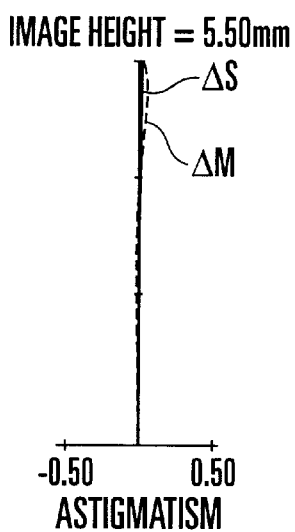
Figure 36C:
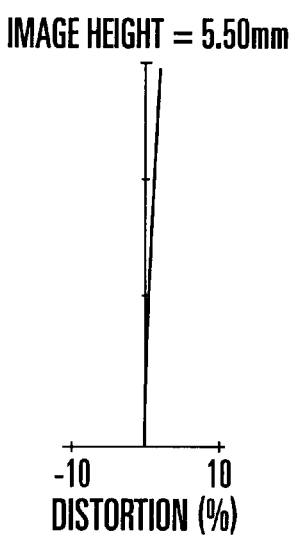
Figure 37A:
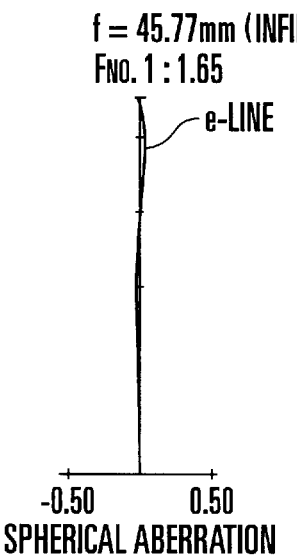
FIGS. 37A, 37B and 37C are aberration diagrams showing the various aberrations of the zoom lens when the focal length f is 45.77 mm during focusing on an infinitely distant object according to the numerical example 6 of the invention.
Figure 37B:
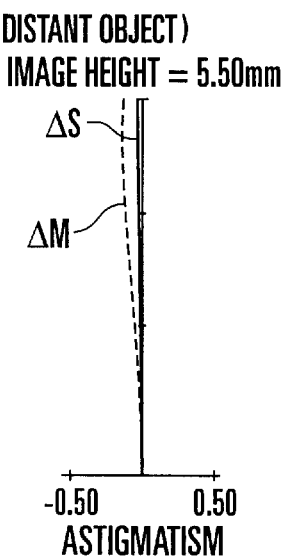
Figure 37C:
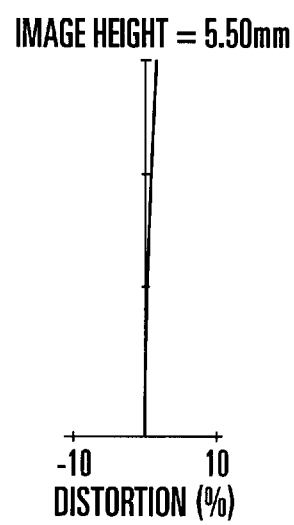
Figure 38A:
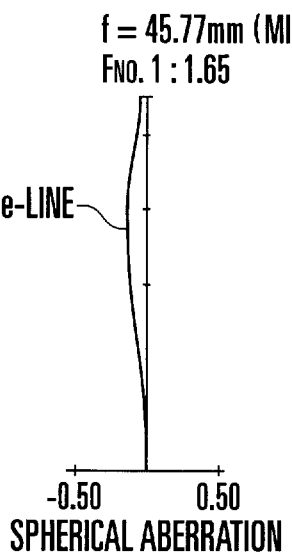
FIGS. 38A, 38B and 38C are aberration diagrams showing the various aberrations of the zoom lens when the focal length f is 45.77 mm during focusing on a minimum-distance object according to the numerical example 6 of the invention.
Figure 38B:
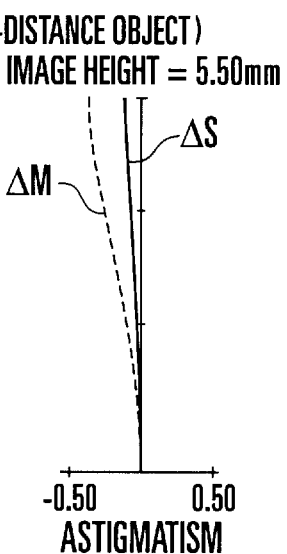
Figure 38C:
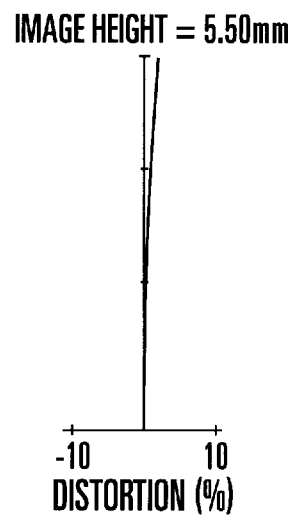
Figure 39:
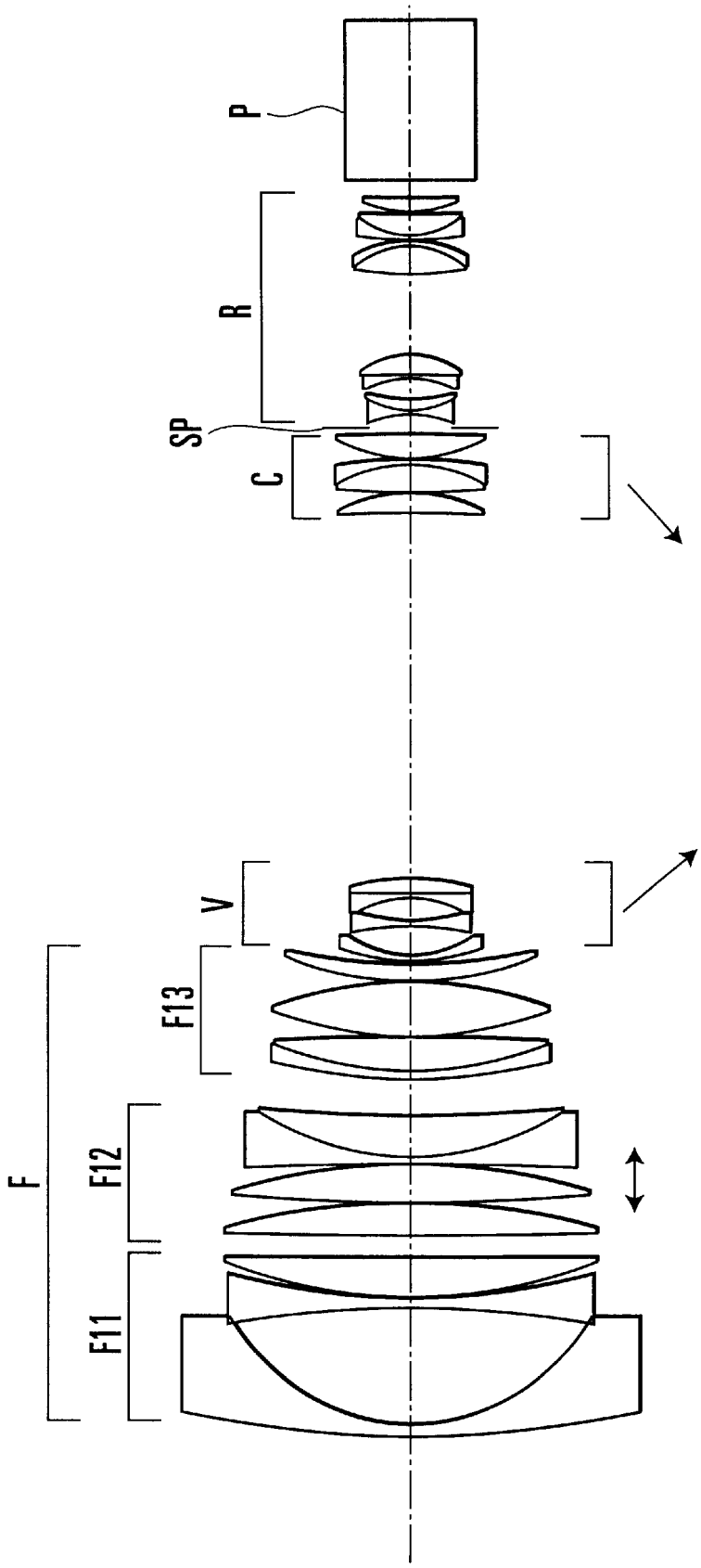
FIG. 39 is a lens sectional view showing a zoom lens in at the wide-angle end according to a numerical example 7 of the invention.
Figure 40A:
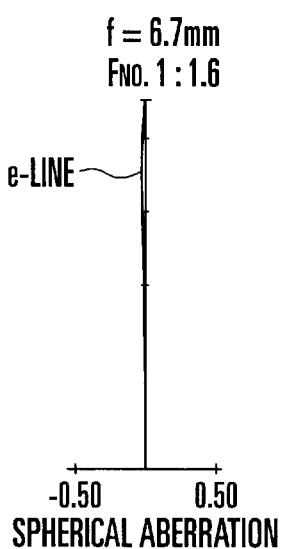
FIGS. 40A, 40B and 40C are aberration diagrams showing the various aberrations of the zoom lens when the focal length f is 6.7 mm during focusing on an infinitely distant object according to the numerical example 7 of the invention.
Figure 40B:
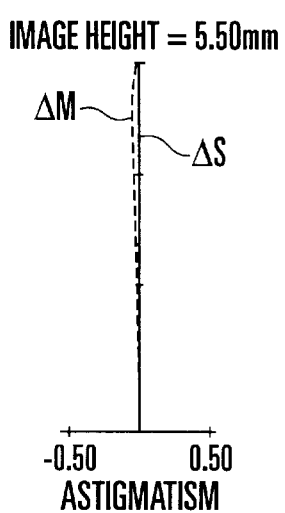
Figure 40C:
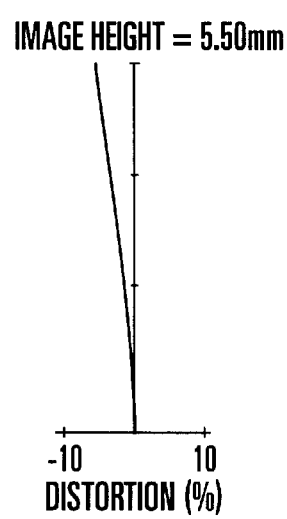
Figure 41A:
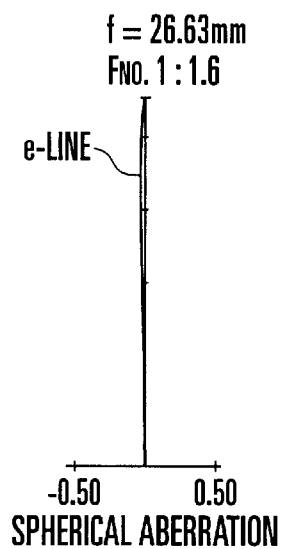
FIGS. 41A, 41B and 41C are aberration diagrams showing the various aberrations of the zoom lens when the focal length f is 26.63 mm during focusing on an infinitely distant object according to the numerical example 7 of the invention.
Figure 41B:
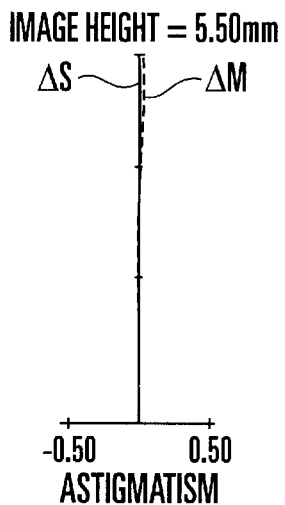
Figure 41C:
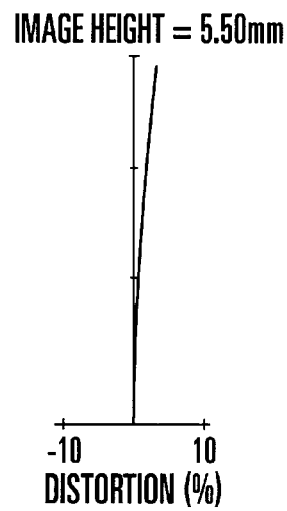
Figure 42A:
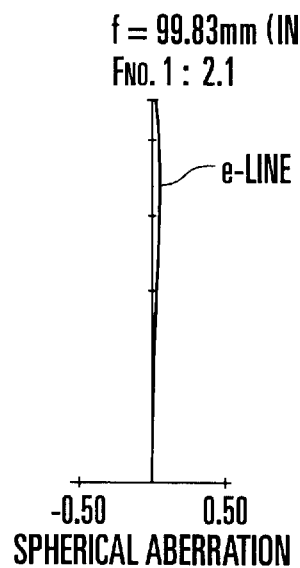
FIGS. 42A, 42B and 42C are aberration diagrams showing the various aberrations of the zoom lens when the focal length f is 99.83 mm during focusing on an infinitely distant object according to the numerical example 7 of the invention.
Figure 42B:
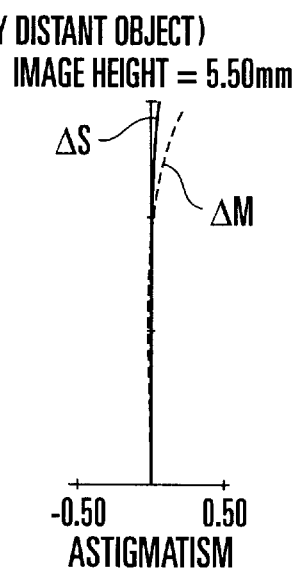
Figure 42C:
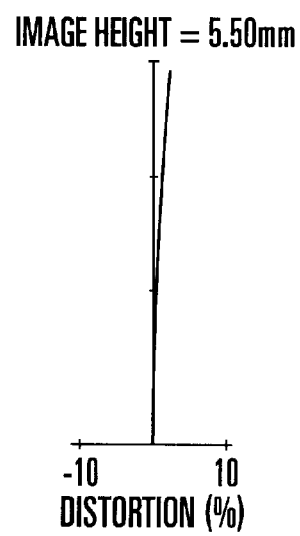
Figure 43A:
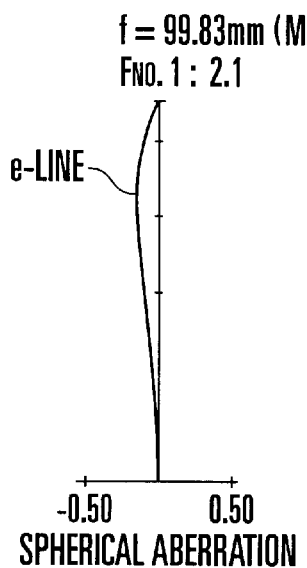
FIGS. 43A, 43B and 43C are aberration diagrams showing the various aberrations of the zoom lens when the focal length f is 99.83 mm during focusing on a minimum-distance object according to the numerical example 7 of the invention.
Figure 43B:
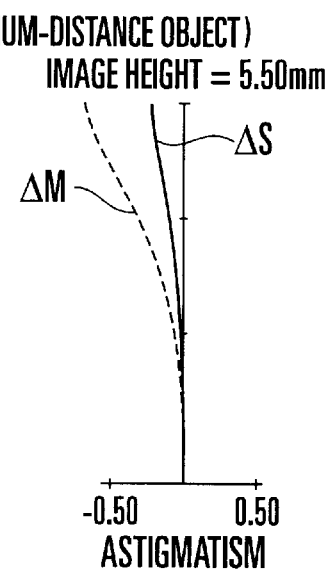
Figure 43C:
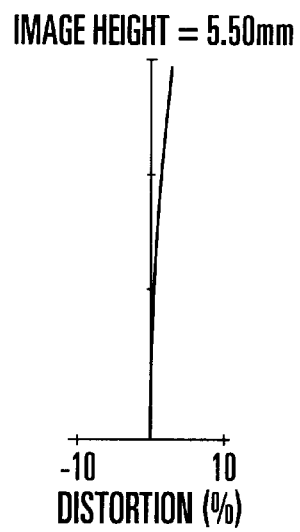

FIGS. 29, 34 and 39 are lens sectional views showing zoom lenses in the wide-angle end according to numerical examples 5, 6 and 7 of the invention, respectively.

FIGS. 30A, 30B and 30C, FIGS. 31A, 31B and 31C, FIGS. 32A, 32B and 32C, and FIGS. 33A, 33B and 33C are aberration diagrams showing the various aberrations of the zoom lens according to the numerical example 5 of the invention when the focal length f is 5.72 mm during focusing on an infinitely distant object, when the focal length f is 22.88 mm during focusing on an infinitely distant object, when the focal length f is 45.77 mm during focusing on an infinitely distant object, and when the focal length f is 45.77 mm during focusing on a minimum-distance object, respectively.

FIGS. 35A, 35B and 35C, FIGS. 36A, 36B and 36C, FIGS. 37A, 37B and 37C, and FIGS. 38A, 38B and 38C are aberration diagrams showing the various aberrations of the zoom lens according to the numerical example 6 of the invention when the focal length f is 5.72 mm during focusing on an infinitely distant object, when the focal length f is 22.88 mm during focusing on an infinitely distant object, when the focal length f is 45.77 mm during focusing on an infinitely distant object, and when the focal length f is 45.77 mm during focusing on a minimum-distance object, respectively.

FIGS. 40A, 40B and 40C, FIGS. 41A, 41B and 41C, FIGS. 42A, 42B and 42C, and FIGS. 43A, 43B and 43C are aberration diagrams showing the various aberrations of the zoom lens according to the numerical example 7 of the invention when the focal length f is 6.7 mm during focusing on an infinitely distant object, when the focal length f is 26.63 mm during focusing on an infinitely distant object, when the focal length f is 99.83 mm during focusing on an infinitely distant object, and when the focal length f is 99.83 mm during focusing on a minimum-distance object, respectively.

In the lens sectional views shown in FIGS. 29, 34 and 39, reference character F denotes a focusing lens unit (first lens unit) of positive refractive power, comprising a first lens subunit F11 of negative refractive power which is stationary during focusing, a second lens subunit F12 of positive refractive power which includes at least one positive lens 12p and is arranged to move along an optical axis to effect focusing, and a third lens subunit F13 of positive refractive power which is stationary during focusing and includes at least one negative lens 13n. The other reference characters respectively denote the same lens members as those shown in the foregoing embodiments.

Further, an image forming magnification of the second lens unit V varies within a range including −1× during the variation of magnification.

In a four-unit zoom lens as in the invention, the so-called front-lens focusing method in which focusing is effected by moving the whole first lens unit disposed on the most object side has such an advantage that, since the drawing amount of the first lens unit has a fixed relation with one and the same object distance irrespective of the focal length, the construction of a lens barrel can be made simple.

However, in the case of a zoom lens having a wide angle of view in which the first lens unit has a positive refractive power, when focusing is performed on a minimum-distance object at the wide-angle end, the first lens unit moves toward the object side. Therefore, the effective diameter of the first lens unit increases for the purpose of securing an off-axial light flux, and the driving torque for moving the first lens unit, which is relatively heavy, increases, so that it becomes difficult to effect rapid focusing.

Further, if a four-unit zoom lens is intended to have a large relative aperture, the effective diameter of the front lens unit (first lens unit) comes to remarkably increase. This is because the height of incidence of an on-axial light ray increases. Then, such a cause increases the amount of occurrence of the various aberrations including spherical aberration and chromatic aberration due to zooming and focusing. In general, it is difficult to correct such aberrations.

If, to cope with the above problem, the freedom of design is increased by increasing the number of lens elements, the size of the whole lens system would become large, thereby increasing weight and production cost.

Therefore, according to the numerical examples 5 to 7, a zoom lens is made to have the above-described lens construction and to satisfy the following conditions:

$$1.2 \leq |f11/f1| \leq 1.7 \quad (8)$$

$$4.0 \leq |f12/f1| < 7.0 \quad (9)$$

$$1.1 \leq |f13/f1| < 1.7 \quad (10)$$

where f11 is a focal length of the first lens subunit F11, f12 is a focal length of the second lens subunit F12, f13 is a focal length of the third lens subunit F13, and f1 is a focal length of the first lens unit F. Further, the zoom lens employs the inner focusing method in which focusing from an infinitely distant object to a minimum-distance object is effected by moving the second lens subunit F12 of the first lens unit F toward the image side. Accordingly, it is possible to prevent an increase in the effective lens diameter of the first lens unit F, to reduce the size of the whole lens system, and to reduce a shootable minimum object distance.

In particular, the respective ratios in focal length of the first lens subunit F11, the second lens subunit F12 and the third lens subunit F13, which constitute the first lens unit F, to the first lens unit F are set in such a way as to satisfy the above conditions (8), (9) and (10), so that it is possible to attain a reduction of the whole lens system and a wide angle of view at the same time.

Next, the technical significance of each of the above conditions (8), (9) and (10) is described. If the upper limit of the condition (8) is exceeded, although there is an advantage in reduction of the size of the lens system, distortion in the minus tendency increases at the wide-angle end, so that it becomes difficult to correct aberrations well even if an aspheric surface (to be described later) is introduced.

If the lower limit of the condition (9) is exceeded, the variation of spherical aberration occurring when the object distance varies increases at the telephoto end, so that it becomes necessary to increase the number of constituent lens elements of the movable lens subunit (the second lens subunit F12) for the purpose of correcting aberrations well.

If the lower limit of the condition (10) is exceeded, not only does it becomes difficult to correct aberrations well even if an aspheric surface (to be described later) is introduced, but also the variation of distortion (the change from the barrel type to the pincushion type) disadvantageously increases from the wide angle end to the middle zoom position.

In addition, if the upper limit of each of the conditions (8), (9) and (10) is exceeded, although there is an advantage in correction of aberrations, the diameter of the front lens unit increases and the amount of movement of the second lens subunit F12 during focusing increases, so that a large space becomes necessary, thereby making it difficult to reduce the size and weight of the whole lens system.

Further, according to the numerical examples 5 to 7, aspheric surfaces are respectively introduced to the second lens subunit F12 and the third lens subunit F13, so as to maintain good optical performance of the whole image plane over the entire variable magnification range while attaining a wide angle of view.

More specifically, the second lens subunit F12 has, on at least one lens surface satisfying hW>hT where hT is a maximum height of incidence of an on-axial light flux and hW is a maximum height of incidence of an off-axial light flux of a maximum angle of view at the wide-angle end, an aspheric surface having, when formed on a positive refractive surface, such a shape that a positive refractive power becomes progressively stronger toward a marginal lens portion thereof, or an aspheric surface having, when formed on a negative refractive surface, such a shape that a negative refractive power becomes progressively weaker toward a marginal lens portion thereof. This aspheric surface has the function of reducing distortion in the minus tendency, which increases at the wide-angle end.

Further, the third lens subunit F13 has at least one aspheric surface having, when formed on a positive refractive surface, such a shape that a positive refractive power becomes progressively weaker toward a marginal lens portion thereof, or at least one aspheric surface having, when formed on a negative refractive surface, such a shape that a negative refractive power becomes progressively stronger toward a marginal lens portion thereof. This aspheric surface has the function of correcting well spherical aberration at the telephoto end, and also has the function of preventing distortion from varying greatly from the minus tendency to the plus tendency when zooming advances from the wide-angle end to the middle zoom position.

While a zoom lens employing the inner focusing method according to each of the numerical examples 5 to 7 is attained by satisfying the above-mentioned conditions, it is preferred to further satisfy at least one of the following conditions in order to obtain better optical performance over the entire object distance range and over the entire variable magnification range.

(a-8) The second lens subunit F12 has one positive lens 12$p$, the third lens subunit F13 has one negative lens 13$n$, and the following conditions are satisfied:

$$N12p \leq 1.67 \tag{11}$$

$$1.76 \leq N13n \tag{12}$$

$$-0.4 \leq \beta VW \leq -0.2 \tag{13}$$

where N12$p$ is a refractive power of a material of the positive lens 12$p$, N13$n$ is a refractive power of a material of the negative lens 13$n$, and $\beta$VW is a lateral magnification of the second lens unit V at the wide-angle end.

If the refractive index of the material of the positive lens 12$p$ of the second lens subunit F12 becomes high beyond the upper limit of the condition (11), the curvature of the positive lens 12$p$ becomes small, so that it becomes difficult to correct distortion at the wide-angle end even if an aspheric surface is introduced, and, further, the positive Petzval sum decreases, so that it becomes difficult to correct the negative Petzval sum occurring in the second lens unit V.

The condition (12) is concerned with the correction of spherical aberration at the wide-angle end. If the refractive index of the material of the negative lens 13$n$ of the third lens subunit F13 becomes low beyond the lower limit of the condition (12), it becomes difficult to correct well spherical aberration.

The condition (13) is provided for defining powers of the second lens unit V and subsequent lens units. If the lower limit of the condition (13) is exceeded, although there is an advantage in correction of aberrations, it becomes difficult to attain a high variable magnification ratio. If the upper limit of the condition (13) is exceeded, although there is an advantage in reduction of size and attainment of a high variable magnification ratio, the difficulty in correcting aberrations increases disadvantageously.

(a-9) The first lens subunit F11 comprises, in order from the object side to the image side, at least one negative lens of meniscus form having a convex surface facing the object side, a negative lens of bi-concave form, and a positive lens having a convex surface facing the object side.

(a-10) The second lens subunit F12 comprises a positive lens having a convex surface facing the image side, comprises, in order from the object side to the image side, a positive lens having a convex surface facing the image side and a cemented lens composed of a positive lens and a negative lens, or comprises, in order from the object side to the image side, two positive lenses and a cemented lens composed of a negative lens and a positive lens.

(a-11) The third lens subunit F13 comprises, in order from the object side to the image side, a cemented lens composed of a positive lens and a negative lens, a cemented lens composed of a negative lens and a positive lens and a positive lens, comprises, in order from the object side to the image side, a cemented lens composed of a negative lens and a positive lens and a positive lens, or comprises, in order from the object side to the image side, a cemented lens composed of a negative lens and a positive lens, a positive lens and a positive lens.

(a-12) In addition to the aspheric surface in the second lens subunit F12 and the aspheric surface in the third lens subunit F13, an aspheric surface having, when formed on a positive refractive surface, such a shape that a positive refractive power becomes progressively stronger toward a marginal lens portion thereof, or an aspheric surface having, when formed on a negative refractive surface, such a shape that a negative refractive power becomes progressively weaker toward a marginal lens portion thereof, is preferably formed on a lens surface of the second lens unit V. This aspheric surface has the function of further reducing the variations of distortion in the minus tendency at the wide-angle end and spherical aberration at the telephoto end.

Next, characteristic features of the numerical examples 5 to 7 are described.

In the numerical example 5, the second lens subunit F12 is constructed with a positive single lens. Each of the second lens subunit F12 and the third lens subunit F13 has an aspheric surface formed on a lens surface of positive power (refractive power).

In the numerical example 6, the second lens subunit F12 is constructed with a positive single lens and a cemented lens composed of a positive lens and a negative lens. The second lens subunit F12 has an aspheric surface formed on a lens surface of negative power of the cemented lens. The third lens subunit F13 has an aspheric surface formed on a lens surface of negative power.

In the numerical example 7, the zoom lens has a wide angle of view and a high variable magnification ratio, such as having a zoom ratio of 10. Each of the second lens subunit F12 and the third lens subunit F13 has an aspheric surface formed on a lens surface of positive power.

Next, numerical data of the numerical examples 5 to 7 are shown. In the numerical data of the numerical examples 5 to 7, ri is the radius of curvature of the i-th lens surface, when counted from the object side, di is the i-th lens thickness or air separation, when counted from the object side, and ni and vi are respectively the refractive index and Abbe number of the glass of the i-th lens, when counted from the object side.

The shape of an aspheric surface is expressed in the coordinates with an X axis in the optical axis direction and a Y axis in the direction perpendicular to the optical axis, the direction in which light advances being taken as positive by the following equation:

$$X = \frac{(1/R)H^2}{1+\sqrt{1-(H/R)^2}} + AH^2 + BH^4 + CH^6 + DH^8 + EH^{10}$$

where R is the radius of osculating sphere, and A, B, C, D and E are aspheric coefficients.

Further, the values of the factors in the above-mentioned conditions (8) to (13) for the numerical examples 5 to 7 are listed in Table-1.

NUMERICAL EXAMPLE 5 f = 5.72–45.77   Fno = 1:1.65   Image Diagonal Length = 11.0

| | | | | | | |
|---|---|---|---|---|---|---|
| r1 = | 113.577 | d1 = | 2.40 | n1 = 1.77621 | v1 = 49.6 |
| r2 = | 44.363 | d2 = | 18.83 | | |
| r3 = | 231.652 | d3 = | 2.00 | n2 = 1.60548 | v2 = 60.7 |
| r4 = | 72.893 | d4 = | 14.97 | | |
| r5 = | −138.775 | d5 = | 2.00 | n3 = 1.62287 | v3 = 60.3 |
| r6 = | 201.067 | d6 = | 0.20 | | |
| r7 = | 86.927 | d7 = | 7.86 | n4 = 1.76168 | v4 = 27.5 |
| r8 = | 262.711 | d8 = | 4.13 | (∞) | |
| r9 = | −3701.675 | d9 = | 10.32 | n5 = 1.48915 | v5 = 70.2 |
| *r10 = | −88.912 | d10 = | 10.59 | (∞) | |
| r11 = | −13586.569 | d11 = | 11.14 | n6 = 1.48915 | v6 = 70.2 |
| r12 = | −58.018 | d12 = | 2.20 | n7 = 1.76168 | v7 = 27.5 |
| r13 = | −95.909 | d13 = | 0.20 | | |
| r14 = | 155.488 | d14 = | 2.20 | n8 = 1.83932 | v8 = 37.2 |
| r15 = | 50.866 | d15 = | 14.19 | n9 = 1.49845 | v9 = 81.6 |
| r16 = | −123.918 | d16 = | 0.20 | | |
| *r17 = | 45.871 | d17 = | 11.62 | n10 = 1.62287 | v10 = 60.3 |
| r18 = | −4289.933 | d18 = | Variable | | |
| r19 = | 34.542 | d19 = | 1.00 | n11 = 1.88814 | v11 = 40.8 |
| r20 = | 16.839 | d20 = | 5.15 | | |
| r21 = | −638.461 | d21 = | 0.80 | n12 = 1.80811 | v12 = 46.6 |
| r22 = | 61.953 | d22 = | 5.83 | | |
| r23 = | −16.556 | d23 = | 0.80 | n13 = 1.77621 | v13 = 49.6 |
| r24 = | 57.905 | d24 = | 3.36 | n14 = 1.93306 | v14 = 21.3 |
| r25 = | −44.899 | d25 = | Variable | | |
| r26 = | −26.199 | d26 = | 0.90 | n15 = 1.77621 | v15 = 49.6 |
| r27 = | 29.282 | d27 = | 3.70 | n16 = 1.81265 | v16 = 25.4 |
| r28 = | −786.130 | d28 = | Variable | | |
| r29 = | Stop | d29 = | 2.30 | | |
| r30 = | −369.120 | d30 = | 3.88 | n17 = 1.53532 | v17 = 45.9 |
| r31 = | −34.188 | d31 = | 0.15 | | |
| r32 = | 95.175 | d32 = | 10.11 | n18 = 1.57392 | v18 = 53.0 |
| r33 = | −22.019 | d33 = | 1.50 | n19 = 1.88814 | v19 = 40.8 |
| r34 = | −57.565 | d34 = | 14.00 | | |
| r35 = | 63.627 | d35 = | 6.20 | n20 = 1.50349 | v20 = 56.4 |
| r36 = | −241.890 | d36 = | 0.15 | | |
| r37 = | 88.509 | d37 = | 6.90 | n21 = 1.50349 | v21 = 56.4 |
| r38 = | −68.214 | d38 = | 0.15 | | |
| r39 = | −172.360 | d39 = | 1.75 | n22 = 1.88814 | v22 = 40.8 |
| r40 = | 34.188 | d40 = | 9.40 | n23 = 1.50229 | v23 = 66.0 |
| r41 = | −52.472 | d41 = | 0.15 | | |
| r42 = | −261.120 | d42 = | 1.60 | n24 = 1.83932 | v24 = 37.2 |
| r43 = | 28.109 | d43 = | 8.70 | n25 = 1.48915 | v25 = 70.2 |
| r44 = | −64.422 | d44 = | 0.15 | | |
| r45 = | 31.768 | d45 = | 5.00 | n26 = 1.51356 | v26 = 51.0 |
| r46 = | ∞ | d46 = | 8.27 | | |
| r47 = | ∞ | d47 = | 55.50 | n27 = 1.51825 | v27 = 64.2 |
| r48 = | ∞ | | | | |

*Aspheric Surface

| Variable Separation | Focal Length | | |
|---|---|---|---|
| | 5.72 | 22.88 | 45.77 |
| d18 | 1.77 | 29.65 | 37.14 |
| d25 | 37.46 | 6.40 | 2.09 |
| d28 | 3.76 | 6.94 | 3.76 |

| Variable Separation during focusing | Infinity Distance | Minimum Distance (−300 mm from vertex of r1) |
|---|---|---|
| d8 | 4.13 | 13.56 |
| d10 | 10.59 | 1.16 |

| No. | r10 | r17 |
|---|---|---|
| B | 1.56214 × 10⁻⁷ | −1.58587 × 10⁻⁷ |
| C | 3.05113 × 10⁻¹¹ | −6.6776 × 10⁻¹¹ |
| D | −3.74815 × 10⁻¹⁴ | −1.99034 × 10⁻¹³ |
| E | 2.32871 × 10 1 | 3.07794 × 10⁻¹⁷ |

NUMERICAL EXAMPLE 6 f = 5.72–45.77   Fno = 1:1.65   Image Diagonal Length = 11.0

| | | | | | | |
|---|---|---|---|---|---|---|
| r1 = | 125.853 | d1 = | 2.40 | n1 = 1.77621 | v1 = 49.6 |
| r2 = | 53.278 | d2 = | 21.45 | | |
| r3 = | 489.912 | d3 = | 2.00 | n2 = 1.60548 | v2 = 60.7 |
| r4 = | 74.729 | d4 = | 15.49 | | |
| r5 = | −283.348 | d5 = | 2.00 | n3 = 1.62287 | v3 = 60.3 |
| r6 = | 116.147 | d6 = | 0.20 | | |
| r7 = | 93.586 | d7 = | 10.18 | n4 = 1.81265 | v4 = 25.4 |
| r8 = | 420.585 | d8 = | 4.13 | (∞) | |
| r9 = | −1465.234 | d9 = | 14.78 | n5 = 1.51825 | v5 = 64.2 |
| r10 = | −70.278 | d10 = | 0.20 | | |

-continued f = 5.72–45.77    Fno = 1:1.65    Image Diagonal Length = 11.0

| | | | | | | |
|---|---|---|---|---|---|---|
| *r11 = | −297.369 | d11 = | 14.89 | n6 = 1.48915 | v6 = 70.2 |
| r12 = | −45.835 | d12 = | 2.20 | n7 = 1.80642 | v7 = 35.0 |
| r13 = | −126.754 | d13 = | 12.70 | (∞) | |
| r14 = | 87.235 | d14 = | 2.20 | n8 = 1.81265 | v8 = 25.4 |
| r15 = | 59.710 | d15 = | 14.41 | n9 = 1.49845 | v9 = 81.6 |
| r16 = | −84.486 | d16 = | 0.20 | | |
| r17 = | 46.680 | d17 = | 7.55 | n10 = 1.62287 | v10 = 60.3 |
| *r18 = | 142.070 | d18 = | Variable | | |
| r19 = | 38.267 | d19 = | 1.00 | n11 = 1.88814 | v11 = 40.8 |
| r20 = | 17.455 | d20 = | 5.81 | | |
| r21 = | 153.983 | d21 = | 0.80 | n12 = 1.80811 | v12 = 46.6 |
| r22 = | 49.447 | d22 = | 5.47 | | |
| r23 = | −18.171 | d23 = | 0.80 | n13 = 1.77621 | v13 = 49.6 |
| r24 = | 43.398 | d24 = | 3.41 | n14 = 1.93306 | v14 = 21.3 |
| r25 = | −62.995 | d25 = | Variable | | |
| r26 = | −26.199 | d26 = | 0.90 | n15 = 1.77621 | v15 = 49.6 |
| r27 = | 29.282 | d27 = | 3.70 | n16 = 1.81265 | v16 = 25.4 |
| r28 = | −786.130 | d28 = | Variable | | |
| r29 = | Stop | d29 = | 2.30 | | |
| r30 = | −369.120 | d30 = | 3.88 | n17 = 1.53532 | v17 = 45.9 |
| r31 = | −34.188 | d31 = | 0.15 | | |
| r32 = | 95.175 | d32 = | 10.11 | n18 = 1.57392 | v18 = 53.0 |
| r33 = | −22.019 | d33 = | 1.50 | n19 = 1.88814 | v19 = 40.8 |
| r34 = | −57.565 | d34 = | 14.00 | | |
| r35 = | 63.627 | d35 = | 6.20 | n20 = 1.50349 | v20 = 56.4 |
| r36 = | −241.890 | d36 = | 0.15 | | |
| r37 = | 88.509 | d37 = | 6.90 | n21 = 1.50349 | v21 = 56.4 |
| r38 = | −68.214 | d38 = | 0.15 | | |
| r39 = | −172.360 | d39 = | 1.75 | n22 = 1.88814 | v22 = 40.8 |
| r40 = | 34.188 | d40 = | 9.40 | n23 = 1.50229 | v23 = 66.0 |
| r41 = | −52.472 | d41 = | 0.15 | | |
| r42 = | −261.120 | d42 = | 1.60 | n24 = 1.83932 | v24 = 37.2 |
| r43 = | 28.109 | d43 = | 8.70 | n25 = 1.48915 | v25 = 70.2 |
| r44 = | −64.422 | d44 = | 0.15 | | |
| r45 = | 31.768 | d45 = | 5.00 | n26 = 1.51356 | v26 = 51.0 |
| r46 = | ∞ | d46 = | 3.27 | | |
| r47 = | ∞ | d47 = | 55.50 | n27 = 1.51825 | v27 = 64.2 |
| r48 = | ∞ | | | | |

*Aspheric Surface

| Variable | Focal Length | | |
|---|---|---|---|
| Separation | 5.72 | 22.88 | 45.77 |
| d18 | 1.04 | 28.92 | 36.41 |
| d25 | 37.87 | 6.81 | 2.49 |
| d28 | 3.76 | 6.94 | 3.76 |

| Variable Separation during focusing | Infinity Distance | Minimum Distance (−300 mm from vertex of r1) |
|---|---|---|
| d8 | 4.13 | 15.63 |
| d13 | 12.7 | 1.20 |

| No. | r11 | r18 |
|---|---|---|
| B | 2.20797 × 10⁻⁷ | 4.53343 × 10⁻⁷ |
| C | 4.03237 × 10⁻¹¹ | 1.04984 × 10⁻¹⁰ |
| D | −1.12248 × 10⁻¹³ | −1.46159 × 10⁻¹³ |
| E | 7.20739 × 10⁻¹⁷ | 1.14652 × 10⁻¹⁶ |

NUMERICAL EXAMPLE 7 f = 6.70–99.83    Fno = 1:1.6–2.1    Image Diagonal Length = 11.0

| | | | | | | |
|---|---|---|---|---|---|---|
| r1 = | 359.279 | d1 = | 3.50 | n1 = 1.69979 | v1 = 55.5 |
| r2 = | 64.222 | d2 = | 34.80 | | |
| r3 = | −311.272 | d3 = | 3.00 | n2 = 1.77621 | v2 = 49.6 |
| r4 = | 229.826 | d4 = | 0.1 | | |
| r5 = | 165.334 | d5 = | 12.11 | n3 = 1.81265 | v3 = 25.4 |
| r6 = | −32946.945 | d6 = | 1.24 | (∞) | |
| r7 = | 2079.461 | d7 = | 9.60 | n4 = 1.67279 | v4 = 57.3 |
| *r8 = | −231.37G | d8 = | 0.20 | | |
| r9 = | 783.531 | d9 = | 11.43 | n5 = 1.67279 | v5 = 57.3 |
| r10 = | −192.022 | d10 = | 0.20 | | |
| r11 = | −1063.799 | d11 = | 2.50 | n6 = 1.77621 | v6 = 49.6 |
| r12 = | 88.548 | d12 = | 12.33 | n7 = 1.49845 | v7 = 81.6 |
| r13 = | 505.152 | d13 = | 16.03 | (∞) | |
| r14 = | 177.316 | d14 = | 2.50 | n8 = 1.93306 | v8 = 21.3 |
| r15 = | 120.380 | d15 = | 10.00 | n9 = 1.49845 | v9 = 81.6 |
| r16 = | −909.289 | d16 = | 0.20 | | |
| r17 = | 121.736 | d17 = | 16.29 | n10 = 1.43496 | v10 = 95.1 |
| r18 = | −128.379 | d18 = | 0.20 | | |
| *r19 = | 101.219 | d19 = | 5.10 | n11 = 1.49845 | v11 = 81.6 |
| r20 = | 191.150 | d20 = | Variable | | |
| r21 = | 66.911 | d21 = | 1.65 | n12 = 1.77621 | v12 = 49.6 |
| r22 = | 34.526 | d22 = | 8.98 | | |
| r23 = | −92.615 | d23 = | 1.51 | n13 = 1.77621 | v13 = 49.6 |
| r24 = | 58.670 | d24 = | 6.94 | | |
| r25 = | −37.964 | d25 = | 1.51 | n14 = 1.77621 | v14 = 49.6 |
| r26 = | 936.997 | d26 = | 4.51 | n15 = 1.93306 | v15 = 21.3 |
| r27 = | −66.329 | d27 = | Variable | | |
| r28 = | −535.129 | d28 = | 6.13 | n16 = 1.48915 | v16 = 70.2 |
| r29 = | −50.925 | d29 = | 0.21 | | |
| r30 = | 263.617 | d30 = | 8.55 | n17 = 1.64254 | v17 = 60.1 |
| r31 = | −47.422 | d31 = | 1.65 | n18 = 1.81265 | v18 = 25.4 |
| r32 = | −147.421 | d32 = | 0.21 | | |
| r33 = | 53.950 | d33 = | 7.03 | n19 = 1.48915 | v19 = 70.2 |
| r34 = | −646.250 | d34 = | Variable | | |
| r35 = | Stop | d35 = | 4.10 | | |
| r36 = | −34.543 | d36 = | 0.96 | n20 = 1.65425 | v20 = 58.5 |
| r37 = | 24.781 | d37 = | 3.36 | n21 = 1.70443 | v21 = 30.1 |
| r38 = | 49.325 | d38 = | 6.58 | | |
| r39 = | −29.978 | d39 = | 1.03 | n22 = 1.64254 | v22 = 60.1 |
| r40 = | −2416.741 | d40 = | 6.00 | n23 = 1.69417 | v23 = 31.1 |
| r41 = | −27.453 | d41 = | 23.38 | | |
| r42 = | 99.050 | d42 = | 8.48 | n24 = 1.48915 | v24 = 70.2 |
| r43 = | −29.816 | d43 = | 1.51 | n25 = 1.76168 | v25 = 27.5 |
| r44 = | −39.221 | d44 = | 0.14 | | |
| r45 = | 107.374 | d45 = | 1.31 | n26 = 1.76168 | v26 = 27.5 |
| r46 = | 26.079 | d46 = | 6.72 | n27 = 1.51678 | v27 = 54.7 |
| r47 = | −5370.786 | d47 = | 0.76 | | |
| r48 = | 46.949 | d48 = | 3.99 | n28 = 1.48915 | v28 = 70.2 |
| r49 = | ∞ | d49 = | 5.70 | | |
| r50 = | ∞ | d50 = | 47.57 | n29 = 1.51825 | v29 = 64.2 |
| r51 = | ∞ | | | | |

*Aspheric Surface

| Variable | Focal Length | | |
|---|---|---|---|
| Separation | 6.70 | 26.63 | 99.83 |
| d20 | 0.99 | 48.99 | 70.65 |
| d27 | 110.87 | 48.60 | 3.00 |
| d34 | 2.05 | 16.32 | 40.25 |

-continued

| Variable Separation during focusing | Infinity Distance | Minimum Distance (−300 mm from vertex of r1) |
|---|---|---|
| d6 | 1.24 | 15.27 |
| d13 | 16.03 | 2.00 |

| No. | r8 | r19 |
|---|---|---|
| B | $5.80597 \times 10^{-10}$ | $-4.73826 \times 10^{-8}$ |
| C | $-3.01423 \times 10^{-12}$ | $-2.70381 \times 10^{-11}$ |
| D | $2.30853 \times 10^{-15}$ | $5.63344 \times 10^{-15}$ |
| E | $-1.03673 \times 10^{-18}$ | $-5.94302 \times 10^{-18}$ |

TABLE-1

| | Numerical Example | | |
|---|---|---|---|
| Condition | 5 | 6 | 7 |
| (8) \|f11/f1\| | 1.052 | 1.699 | 1.259 |
| (9) f12/f1 | 5.571 | 6.166 | 4.451 |
| (10) f13/f1 | 1.551 | 1.605 | 1.147 |
| hT | 24.47 | 24.7 | 35.18 |
| hW | 34.72 | 31.57 | 50.11 |
| (11) N12p | 1.489 | 1.518 | 1.673 |
| | | 1.489 | 1.498 |
| (12) N13n | 1.762 | 1.812 | 1.933 |
| | 1.839 | | |
| (13) βVW | −0.353 | −0.353 | −0.282 |

Figure 44:
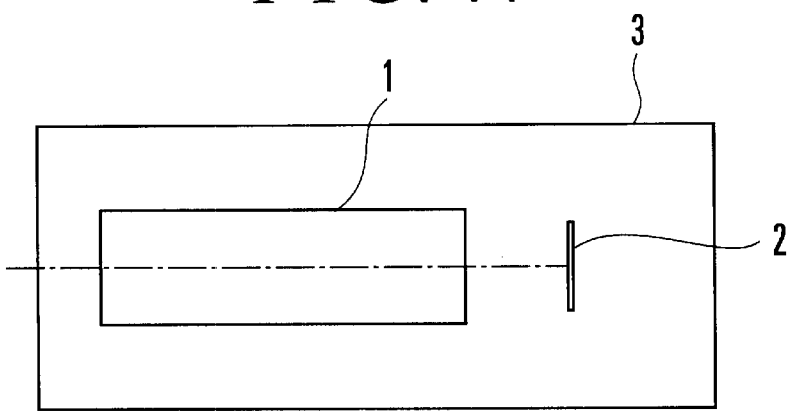
FIG. 44 is a schematic diagram showing a television camera system having a zoom lens according to the invention.
Figure 45:
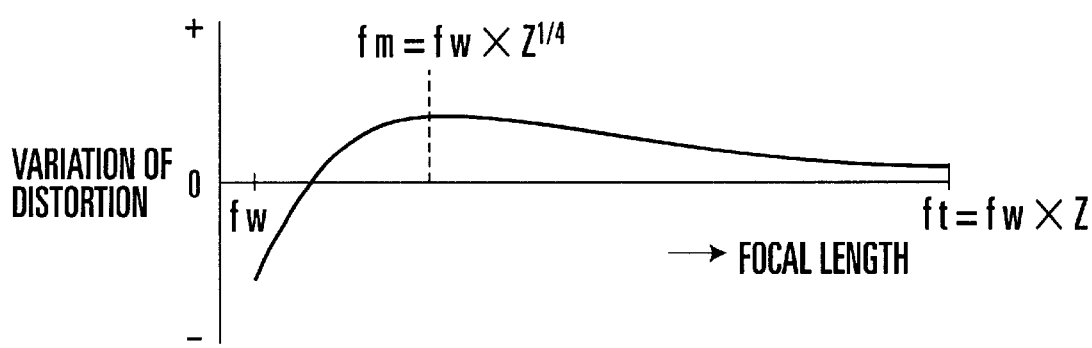
FIG. 45 is a graph for explaining the variation of distortion due to the variation of magnification of a zoom lens.
Figure 46:
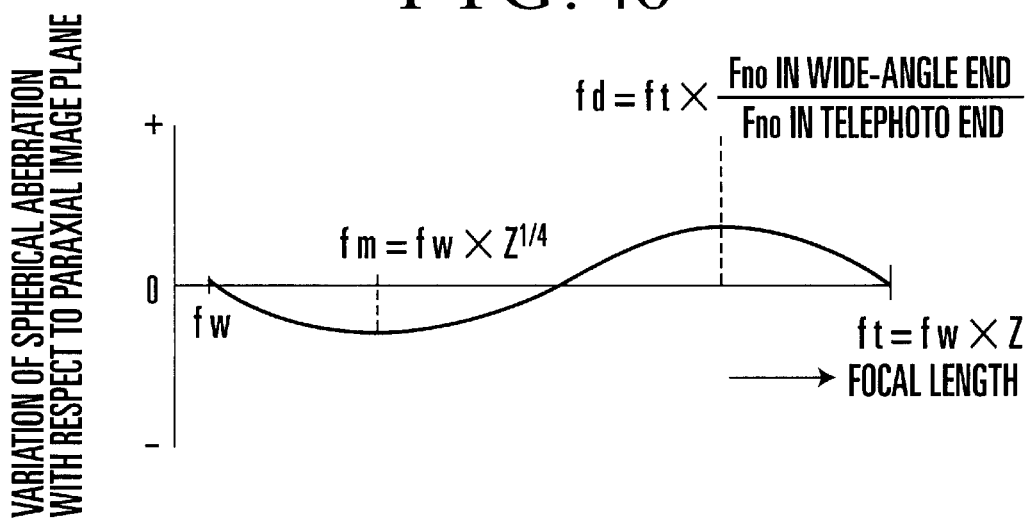
FIG. 46 is a graph for explaining the variation of spherical aberration due to the variation of magnification of the zoom lens.

While the detailed description of each of zoom lenses according to the invention has been made in the foregoing, it is also possible to provide a high-accuracy camera system by mounting a zoom lens 1 according to the invention in a television camera casing 3 having an image pickup means 2, etc., as shown in FIG. 44.

As has been described above, according to the invention, there can be attained a zoom lens having high optical performance over the entire variable magnification range with the variation of various aberrations due to the variation of magnification lessened, in particular, with distortion on the wide-angle side and spherical aberration on the telephoto side corrected well, by, in the so-called four-unit zoom lens, appropriately setting the refractive power of each lens unit, the F-number, etc., and applying aspheric surfaces to at least two lens surfaces.

Further, according to the invention, there can be attained a zoom lens having a large relative aperture and a high variable magnification ratio, such as having an F-number of 1.5–1.8 or thereabout, an ultra-wide angle of view (angle of view at the wide-angle end 2ω=78°–950 or thereabout) and a variable magnification ratio of 10-27 or thereabout.

Furthermore, according to the invention, there can be attained a zoom lens employing the inner focusing method in which focusing is effected by moving a lens subunit for focusing that is a part of a first lens unit of the four-unit zoom lens, and having high optical performance with distortion in the minus tendency at the wide-angle end corrected well while attaining a wide angle of view, a reduction in minimum object distance, and a high variable magnification ratio and attaining the reduction in size of the whole lens system.

What is claimed is:

1. A zoom lens comprising, in order from an object side to an image side:

a first lens unit of positive refractive power;

a second lens unit of negative refractive power for variation of magnification;

a third lens unit for compensating for shift of an image plane caused by the variation of magnification; and a fixed fourth lens unit of positive refractive power, wherein said first lens unit comprises a first lens subunit of negative refractive power fixed during focusing, a second lens subunit having a focusing function, and a third lens subunit of positive refractive power fixed during focusing, and wherein said second lens subunit and said third lens subunit respectively have an aspheric lens.

2. A zoom lens according to claim 1, wherein said second lens subunit has, on at least one lens surface thereof satisfying hW>hT where hT is a maximum height of incidence of an on-axial light flux and hW is a maximum height of incidence of an off-axial light flux of a maximum angle of view at a wide-angle end, an aspheric surface having, when formed on a positive refractive surface, such a shape that a positive refractive power becomes progressively stronger toward a marginal lens portion thereof, or an aspheric surface having, when formed on a negative refractive surface, such a shape that a negative refractive power becomes progressively weaker toward a marginal lens portion thereof.

3. A zoom lens according to claim 1, wherein said third lens subunit has at least one aspheric surface having, when formed on a positive refractive surface, such a shape that a positive refractive power becomes progressively weaker toward a marginal lens portion thereof, or at least one aspheric surface having, when formed on a negative refractive surface, such a shape that a negative refractive power becomes progressively stronger toward a marginal lens portion thereof.

4. A zoom lens according to claim 1, wherein said second lens subunit has one positive lens (12p), said third lens subunit has one negative lens (13n), and the following conditions are satisfied:

$N12p \leq 1.67$ $1.76 \leq N13n$ $-0.4 \leq \beta VW \leq -0.2$ where N12p is a refractive index of a material of said positive lens (12p), N13n is a refractive index of a material of said negative lens (13n), and βVW is a lateral magnification of said second lens unit at a wide-angle end.

5. A zoom lens according to claim 1, wherein said first lens subunit comprises, in order from the object side to the image side, at least one negative lens of meniscus form having a convex surface facing the object side, a negative lens of bi-concave form, and a positive lens having a convex surface facing the object side.

6. A zoom lens according to claim 1, wherein said second lens subunit comprises a positive lens having a convex surface facing the image side; a positive lens having a convex surface facing the image side and a cemented lens composed of a positive lens and a negative lens in order from the object side to the image side; or two positive lenses and a cemented lens composed of a negative lens and a positive lens in order from the object side to the image side.

7. A zoom lens according to claim 1, wherein said third lens subunit comprises: a cemented lens composed of a positive lens and a negative lens in order from the object side to the image side; a cemented lens composed of a negative lens and a positive lens and a positive lens; or a cemented lens composed of a negative lens and a positive lens, a positive lens and a positive lens, in order from the object side to the image side.

8. A camera system comprising a zoom lens according to claim 1.

9. A zoom lens according to claim 1, wherein said second lens subunit moves along an optical axis during focusing, an image forming magnification of said second lens unit varies within a range including −1× during the variation of magnification, and the following condition are satisfied:

$$1.2 \leq |f11/f1| \leq 1.7$$

where f11 is a focal length of said first lens subunit, and f1 is a focal length of said first lens unit.

10. A zoom lens comprising, in order from an object side to an image side:

a first lens unit of positive refractive power;

a second lens unit of negative refractive power for variation of magnification;

a third lens unit for compensating for shift of an image plane caused by the variation of magnification; and a fixed fourth lens unit of positive refractive power, wherein said first lens unit comprises a first lens subunit of negative refractive power fixed during focusing, a second lens subunit having a focusing function, and a third lens subunit of positive refractive power fixed during focusing, wherein said second lens subunit and said third lens subunit respectively have an aspheric lens; and wherein said second lens subunit moves along an optical axis during focusing, an image forming magnification of said second lens unit varies within a range including −1× during the variation of magnification, and the following conditions are satisfied:

$$1.2 \leq |f11/f1| \leq 1.7$$

$$4.0 \leq |f12/f1| \leq 7.0$$

$$1.1 \leq |f13/f1| \leq 1.7$$

where f11 is a focal length of said first lens subunit, f12 is a focal length of said second lens subunit, f13 is a focal length of said third lens subunit, and f1 is a focal length of said first lens unit.

11. A camera system comprising a zoom lens according to claim 10.

* * * * *

UNITED STATES PATENT AND TRADEMARK OFFICE
CERTIFICATE OF CORRECTION

PATENT NO. : 6,545,818 B2
DATED : April 8, 2003
INVENTOR(S) : Fumiaki Usui et al.

It is certified that error appears in the above-identified patent and that said Letters Patent is hereby corrected as shown below:

Column 5,
Line 19, "one." should read -- one --.

Column 6,
Line 10, "⊕" should read -- | --.

Column 10,
Line 11, "in" should read -- at --.
Line 33, "lens in" should read -- lens --.

Column 12,
Line 12, "$Z^{1/14}$" should read -- $Z^{1/4}$ --.

Column 25,
Line 45, "r1" should read -- ri --.
Line 55, "th" should read -- the --.

Column 28,
Line 27, -- r49 = ∞ -- should be inserted.

Column 30,
Line 8, "*r44" should read -- r44 -- and "1.0" should read -- 1.80 --.

Column 32,
Line 7, "5.17" should read -- 8.17 --.
Line 8, "1.50" should read -- 1.80 --.
Line 10, "1.4595" should read -- 1.48915 --.
Line 14, -- r58 = ∞ -- should be inserted.

Column 35,
Line 12, "becomes" should read -- become --.

Column 37,
Line 27, "r1" should read -- ri --.

UNITED STATES PATENT AND TRADEMARK OFFICE
CERTIFICATE OF CORRECTION

PATENT NO. : 6,545,818 B2
DATED : April 8, 2003
INVENTOR(S) : Fumiaki Usui et al.

It is certified that error appears in the above-identified patent and that said Letters Patent is hereby corrected as shown below:

Column 40,
Line 9, "d4 = 0.1" should read -- d4 = 0.15 --.
Line 13, "-231.37G" should read -- 231.370 --.

Column 41,
Line 49, "950" should read -- 95° --.

Column 43,
Line 7, "condition are" should read -- condition is --.

Signed and Sealed this

Sixth Day of January, 2004

JAMES E. ROGAN
*Director of the United States Patent and Trademark Office*